(12) United States Patent
Magariyachi et al.

(10) Patent No.: US 10,595,148 B2
(45) Date of Patent: Mar. 17, 2020

(54) SOUND PROCESSING APPARATUS AND METHOD, AND PROGRAM

(71) Applicant: Sony Corporation, Tokyo (JP)

(72) Inventors: Tetsu Magariyachi, Kanagawa (JP); Yuhki Mitsufuji, Tokyo (JP); Yu Maeno, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/066,756

(22) PCT Filed: Dec. 22, 2016

(86) PCT No.: PCT/JP2016/088382
§ 371 (c)(1),
(2) Date: Jun. 28, 2018

(87) PCT Pub. No.: WO2017/119321
PCT Pub. Date: Jul. 13, 2017

(65) Prior Publication Data
US 2019/0069118 A1 Feb. 28, 2019

(30) Foreign Application Priority Data
Jan. 8, 2016 (JP) .................................. 2016-002169

(51) Int. Cl.
*H04S 7/00* (2006.01)
*H04R 5/033* (2006.01)
(Continued)

(52) U.S. Cl.
CPC .............. *H04S 7/304* (2013.01); *G06F 3/012* (2013.01); *H04R 5/033* (2013.01); *H04R 5/04* (2013.01);
(Continued)

(58) Field of Classification Search
CPC .. H04S 7/304; H04S 2420/01; H04S 2420/11; G06F 3/012; H04R 5/033; H04R 5/04
(Continued)

(56) References Cited

U.S. PATENT DOCUMENTS 6,021,206 A 2/2000 McGrath
6,259,795 B1 7/2001 McGrath
(Continued)

FOREIGN PATENT DOCUMENTS

CN 1735922 A 2/2006
CN 102823277 A 12/2012
(Continued)

OTHER PUBLICATIONS

Extended European Search Report dated Dec. 5, 2018 in connection with European Application No. 16883820.9.
(Continued)

*Primary Examiner* — William A Jerez Lora
(74) *Attorney, Agent, or Firm* — Wolf, Greenfield & Sacks, P.C.

(57) ABSTRACT

The present technique relates to sound processing apparatus and method, and a program that can more efficiently reproduce sound;
A sound processing apparatus includes: a head direction acquisition unit that acquires a head direction of a user listening to sound; a rotation matrix generation unit that selects two first rotation matrices on the basis of the head direction from a plurality of first rotation matrices for rotation in a first direction held in advance, selects one second rotation matrix on the basis of the head direction from a plurality of second rotation matrices for rotation in a second direction held in advance, and generates a third rotation matrix on the basis of the selected two first rotation matrices and the selected one second rotation matrix; and a
(Continued)

head-related transfer function composition unit that composes an input signal in a spherical harmonic domain, a head-related transfer function in the spherical harmonic domain, and the third rotation matrix to generate a headphone drive signal in a time-frequency domain; The present technique can be applied to a sound processing apparatus.

10 Claims, 35 Drawing Sheets

(51) Int. Cl.
G06F 3/01 (2006.01)
H04R 5/04 (2006.01)

(52) U.S. Cl.
CPC ....... H04S 2420/01 (2013.01); H04S 2420/11 (2013.01)

(58) Field of Classification Search
USPC ................................ 381/1, 2, 124, 309, 310
See application file for complete search history.

(56) References Cited

U.S. PATENT DOCUMENTS

| | | | |
|---|---|---|---|
| 2006/0045275 A1 | 3/2006 | Daniel | |
| 2008/0056517 A1* | 3/2008 | Algazi | H04S 7/304 381/310 |
| 2010/0329466 A1 | 12/2010 | Berge | |
| 2012/0162362 A1* | 6/2012 | Garden | H04N 13/366 348/42 |
| 2015/0294672 A1 | 10/2015 | Batke et al. | |
| 2015/0326966 A1* | 11/2015 | Mehra | H04S 7/304 367/138 |
| 2016/0044430 A1* | 2/2016 | McGrath | H04S 1/005 381/17 |
| 2016/0241980 A1* | 8/2016 | Najaf-Zadeh | H04S 7/303 |
| 2019/0014433 A1 | 1/2019 | Magariyachi et al. | |
| 2019/0069110 A1* | 2/2019 | Gorzel | H04S 3/00 |
| 2019/0313200 A1* | 10/2019 | Stein | G06F 3/04845 |

FOREIGN PATENT DOCUMENTS

| | | |
|---|---|---|
| EP | 1563485 B1 | 11/2003 |
| EP | 2268064 A1 | 12/2010 |
| EP | 2285139 A2 | 2/2011 |
| EP | 2553947 B | 5/2014 |
| FR | 2847376 A1 | 11/2002 |
| JP | 2006-506918 A | 2/2006 |
| JP | 2015-159598 A | 9/2015 |
| KR | 10-2005-0083928 A | 8/2005 |
| KR | 10-2013-0031823 A | 3/2013 |
| WO | WO 2004/049299 A1 | 6/2004 |
| WO | WO 2011/117399 A1 | 9/2011 |

OTHER PUBLICATIONS

International Search Report and English translation thereof dated Mar. 14, 2017 in connection with International Application No. PCT/JP2016/088382.
Daniel et al., Further Investigations of High Order Ambisonics and Wavefield Synthesis for Holophonic Sound Imaging, Audio Engineering Society, Convention Paper 5788, 114$^{th}$ Convention, Mar. 22-25, 2003, Amsterdam, The Netherlands, 18 pages.
U.S. Appl. No. 16/066,772, filed Jun. 28, 2018, Magariyachi et al.
Written Opinion and English translation thereof dated Mar. 14, 2017 in connection with International Application No. PCT/JP2016/088382.
International Preliminary Report on Patentability and English translation thereof dated Jul. 19, 2018 in connection with International Application No. PCT/JP2016/088382.
Communication pursuant to Article 94(3) issued Oct. 2, 2019 in connection with European Application No. 16883820.9.
Diebel, J., Representing Attitude: Euler Angles, Unit Quaternions, and Rotation Vectors, Oct. 20, 2006, http://www.astro.rug.nl/software/kapteyn-beta/_download/attitude.pdf, retrieved on Sep. 25, 2019, 9 pages.
Vennerod J., Binaural Reproduction of Higher Order Ambisonics, A Real-Time Implementation and Perceptual Improvements, Norweigan University, http://www.researchgate.net/publication/278404811_Binaural_Reproduction_of_Higher_Order_Ambisonics_A_Real-Time_Implementation_and_Perceptual_Improvements/links/5580323408ae87edac4c9091/Binaural-Reproduction-of-Higher-Order-Ambisonics-A-Real-Time-Implementation-and-Perceptual, Stanford University, retrieved on Feb. 23, 2018, pp. 1-97.

* cited by examiner

FIG. 23

| | | | | | | |
|---|---|---|---|---|---|---|
| ORDER J OF SPHERICAL HARMONIC FUNCTION | 0 | 1 | 2 | 3 | 4 | 5 |
| REQUIRED NUMBER OF VIRTUAL SPEAKERS (K, L) | 1 | 4 | 9 | 16 | 25 | 36 |
| AMOUNT OF OPERATION (GENERAL METHOD) | 3 | 24 | 99 | 288 | 675 | 1368 |
| AMOUNT OF OPERATION (FIRST PROPOSED METHOD) | 2 | 8 | 18 | 32 | 50 | 72 |
| AMOUNT OF OPERATION (SECOND PROPOSED METHOD) | 3 | 18 | 53 | 116 | 215 | 358 |
| AMOUNT OF OPERATION (THIRD PROPOSED METHOD) | 3 | 18.2 | 53.7 | 117.7 | 218.3 | 363.7 |
| AMOUNT OF OPERATION (THIRD PROPOSED METHOD, REDUCTION (-2) OF ORDERS) | 3 ** | 3.2 ** | 3.7 | 19.7 | 56.3 | 121.7 |
| MEMORY (GENERAL METHOD) | 200001 | 800016 | 1800081 | 3200256 | 5000625 | 7201296 |
| MEMORY (FIRST PROPOSED METHOD) | 200000 | 800000 | 1800000 | 3200000 | 5000000 | 7200000 |
| MEMORY (SECOND PROPOSED METHOD) | 1200 | 10800 | 36800 | 87200 | 170000 | 293200 |
| MEMORY (THIRD PROPOSED METHOD) | 220 | 940 | 2240 | 4200 | 6900 | 10420 |

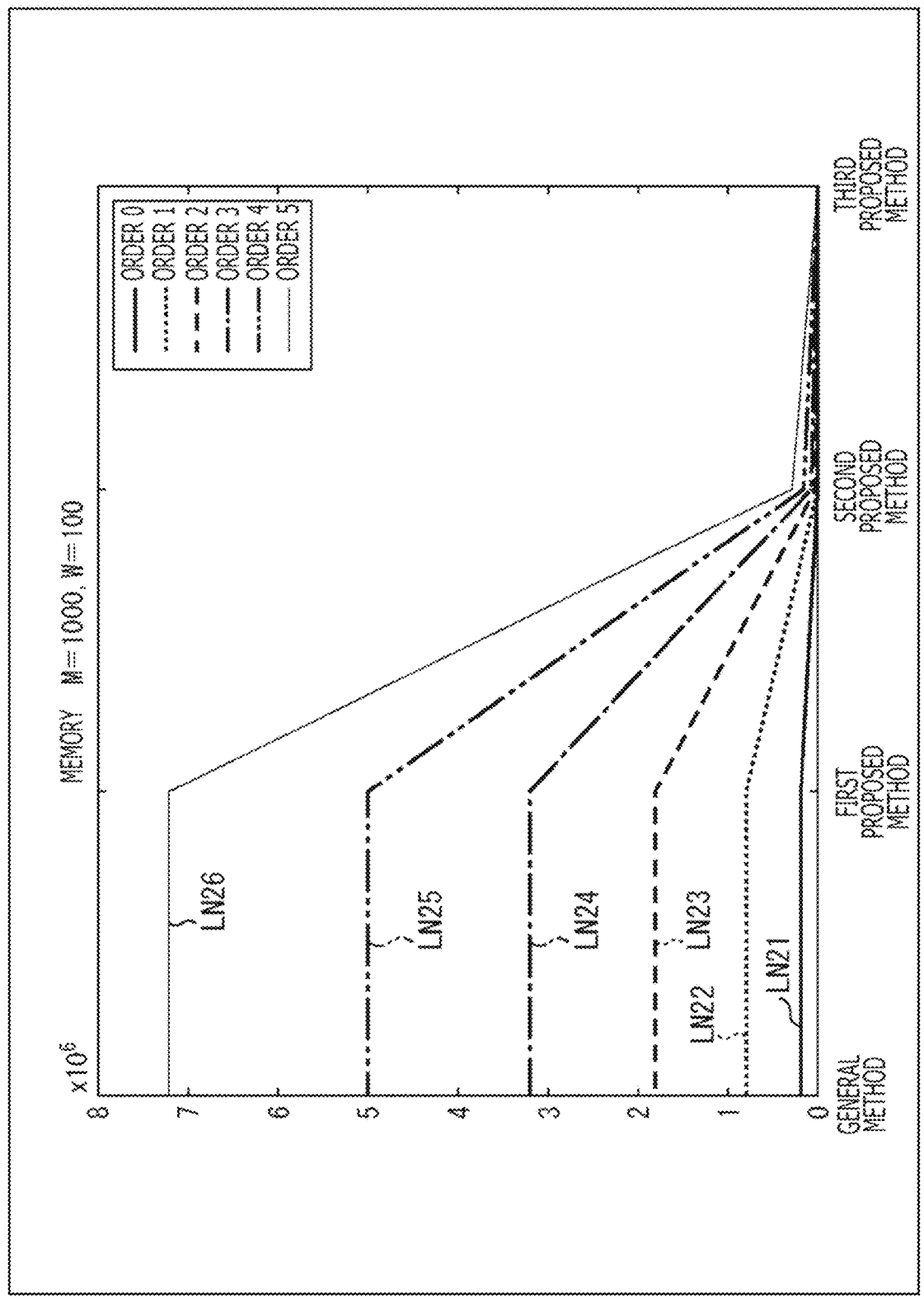
F I G. 2 5

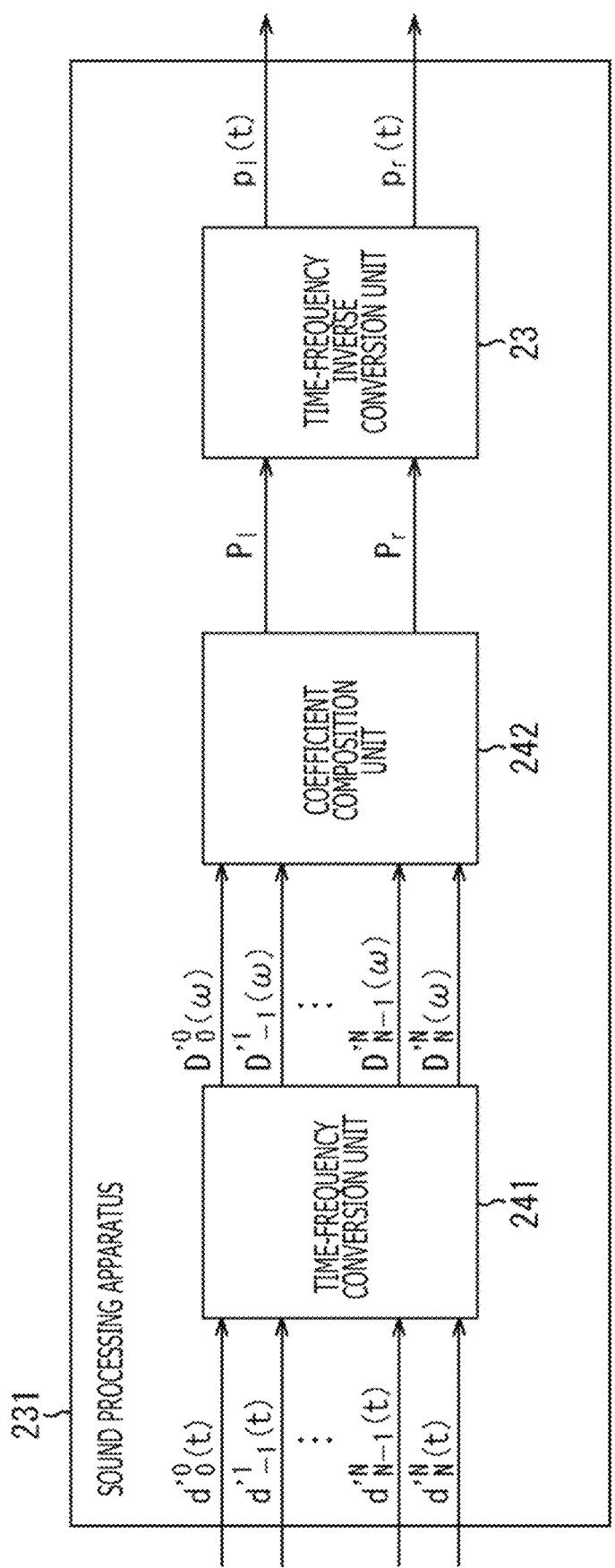

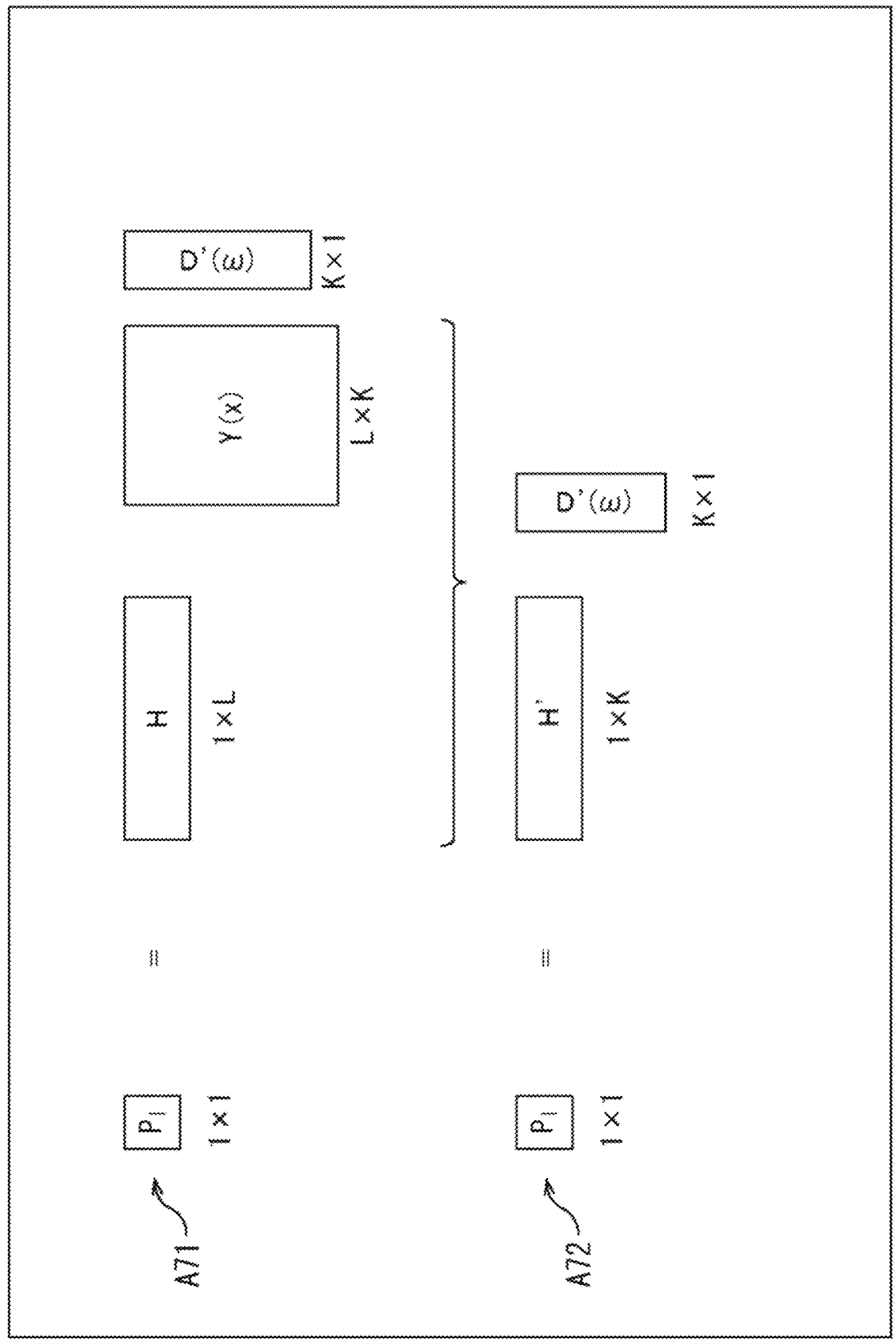

SOUND PROCESSING APPARATUS AND METHOD, AND PROGRAM

CROSS-REFERENCE TO RELATED APPLICATIONS

This is a U.S. National Stage Application under 35 U.S.C. § 371, based on International Application No. PCT/JP2016/088382, filed Dec. 22, 2016, which claims priority to Japanese Patent Application JP 2016-002169, filed Jan. 8, 2016, each of which is hereby incorporated by reference in its entirety.

TECHNICAL FIELD

The present technique relates to sound processing apparatus and method, and a program, and particularly, to sound processing apparatus and method, and a program that can more efficiently reproduce sound.

BACKGROUND ART

In recent years, systems that record, transmit, and reproduce spatial information from the entire circumference have been developed and popularized in the field of sound. For example, broadcasting with three-dimensional multi-channel sound of 22.2 channels is planned in Super Hi-Vision.

Furthermore, systems that reproduce signals of sound surrounding the entire circumference in addition to video surrounding the entire circumference are also started to be distributed in the field of virtual reality.

Among these, there is so-called Ambisonics that is an expression method of three-dimensional sound information which can flexibly correspond to an arbitrary recording and reproduction system, and Ambisonics is drawing attention. Particularly, Ambisonics with second or higher order is called higher order Ambisonics (HOA) (for example, see NPL 1).

In the three-dimensional multi-channel sound, the information of the sound spreads to the spatial axis in addition to the temporal axis. In Ambisonics, frequency conversion, that is, spherical harmonic function conversion, is applied to the angle direction of the three-dimensional polar coordinates, and the information is held. The spherical harmonic function conversion can be considered to be equivalent to time-frequency conversion of the temporal axis of the sound signal.

An advantage of the method is that information can be encoded and decoded from an arbitrary microphone array to an arbitrary speaker array without limiting the number of microphones or the number of speakers.

On the other hand, factors that prevent popularization of Ambisonics include that a speaker array including a large number of speakers is necessary in the reproduction environment and that the reproduction range (sweet spot) of the sound space is narrow.

For example, although a speaker array including a larger number of speakers is necessary to increase the spatial resolution of sound, it is unrealistic to create such a system at home or the like. Furthermore, the area that can reproduce the sound space is narrow in a space such as a movie theater, and it is difficult to provide a desired effect to the entire audience.

CITATION LIST

Non Patent Literature

[NPL 1]
Jerome Daniel, Rozenn Nicol, Sebastien Moreau, "Further Investigations of High Order Ambisonics and Wavefield Synthesis for Holophonic Sound Imaging," AES 114th Convention, Amsterdam, Netherlands, 2003.

SUMMARY

Technical Problem

Therefore, Ambisonics and a binaural reproduction technique can be combined. The binaural reproduction technique is generally called a virtual auditory display (VAD), and a head-related transfer function (HRTF) is used to realize the binaural reproduction technique.

Here, the head-related transfer function is a function of the frequency and the direction of arrival expressing information regarding the transmission of sound from the entire direction surrounding the head of a human to the eardrums of both ears.

In a case where the target sound and the head-related transfer function from a certain direction are composed and presented to a headphone, the listener perceives as if the sound comes from the direction of the used head-related transfer function, instead of from the headphone. The VAD is a system using such a principle.

If the VAD is used to reproduce a plurality of virtual speakers, the same effect as Ambisonics in a speaker array system including a large number of speakers difficult in reality can be realized by the headphone presentation.

However, the system cannot attain sufficiently effective reproduction of sound. For example, in the case where Ambisonics and the binaural reproduction technique are combined, not only the amount of operation, such as convolution of head-related transfer functions, becomes large, but also the used amount of memory used for the operation and the like becomes large.

The present technique has been made in view of the circumstances, and the present technique enables to more efficiently reproduce sound.

Solution to Problem

An aspect of the present technique provides a sound processing apparatus including a head direction acquisition unit, a rotation matrix generation unit, and a head-related transfer function composition unit. The head direction acquisition unit acquires a head direction of a user listening to sound. The rotation matrix generation unit selects two first rotation matrices on a basis of the head direction from a plurality of first rotation matrices for rotation in a first direction held in advance, selects one second rotation matrix on a basis of the head direction from a plurality of second rotation matrices for rotation in a second direction held in advance, and generates a third rotation matrix on a basis of the selected two first rotation matrices and the selected one second rotation matrix. The head-related transfer function composition unit composes an input signal in a spherical harmonic domain, a head-related transfer function in the spherical harmonic domain, and the third rotation matrix to generate a headphone drive signal in a time-frequency domain.

The second rotation matrix can be a rotation matrix for rotation in an elevation angle direction, and on the basis of the rotation of the head of the user in the elevation angle direction indicated by the head direction, the rotation matrix generation unit can select the second rotation matrix for rotation equivalent to the rotation in the elevation angle direction.

The rotation matrix generation unit can select the second rotation matrix by determining that the rotation in the elevation angle direction is zero degrees in a case where an absolute value of the rotation of the head of the user in the elevation angle direction is equal to or smaller than a predetermined threshold.

The rotation matrix generation unit can generate the third rotation matrix only from the two first rotation matrices in a case where an absolute value of the rotation of the head of the user in the elevation angle direction is equal to or smaller than a predetermined threshold.

The head-related transfer function composition unit can obtain a product of the third rotation matrix and the input signal and obtain a sum of products of the product and the head-related transfer function to generate the headphone drive signal.

The head-related transfer function composition unit can obtain a product of the third rotation matrix and the head-related transfer function and obtain a sum of products of the product and the input signal to generate the headphone drive signal.

The sound processing apparatus can further include a head direction sensor unit that detects the rotation of the head of the user, and the head direction acquisition unit can acquire a detection result of the head direction sensor unit to acquire the head direction of the user.

The sound processing apparatus can further include a time-frequency inverse conversion unit that performs time-frequency inverse conversion of the headphone drive signal.

An aspect of the present technique provides a sound processing method or a program including the steps of acquiring a head direction of a user listening to sound, selecting two first rotation matrices on a basis of the head direction from a plurality of first rotation matrices for rotation in a first direction held in advance, selecting one second rotation matrix on a basis of the head direction from a plurality of second rotation matrices for rotation in a second direction held in advance, and generating a third rotation matrix on a basis of the selected two first rotation matrices and the selected one second rotation matrix, and composing an input signal in a spherical harmonic domain, a head-related transfer function in the spherical harmonic domain, and the third rotation matrix to generate a headphone drive signal in a time-frequency domain.

In the aspects of the present technique, the head direction of the user listening to sound is acquired, the two first rotation matrices are selected on the basis of the head direction from the plurality of first rotation matrices for rotation in the first direction held in advance, the one second rotation matrix is selected on the basis of the head direction from the plurality of second rotation matrices for rotation in the second direction held in advance, the third rotation matrix is generated on the basis of the selected two first rotation matrices and the selected one second rotation matrix, and the input signal in the spherical harmonic domain, the head-related transfer function in the spherical harmonic domain, and the third rotation matrix are composed to generate the headphone drive signal in the time-frequency domain.

Advantageous Effect of Invention

According to the aspects of the present technique, sound can be more efficiently reproduced.

Note that the advantageous effect described here may not be limited, and the advantageous effect can be any of the advantageous effects described in the present disclosure.

BRIEF DESCRIPTION OF DRAWINGS

FIG. 23 is a diagram describing the amount of operation and the required amount of memory in each proposed method and the general method.

FIG. 25 is a diagram describing the amount of operation and the required amount of memory in each proposed method and the general method.

FIG. 26 depicts a configuration of a general sound processing apparatus based on an MPEG 3D standard.

FIG. 27 is a diagram describing computation of drive signals by the general sound processing apparatus.

DESCRIPTION OF EMBODIMENTS

Figure 1:
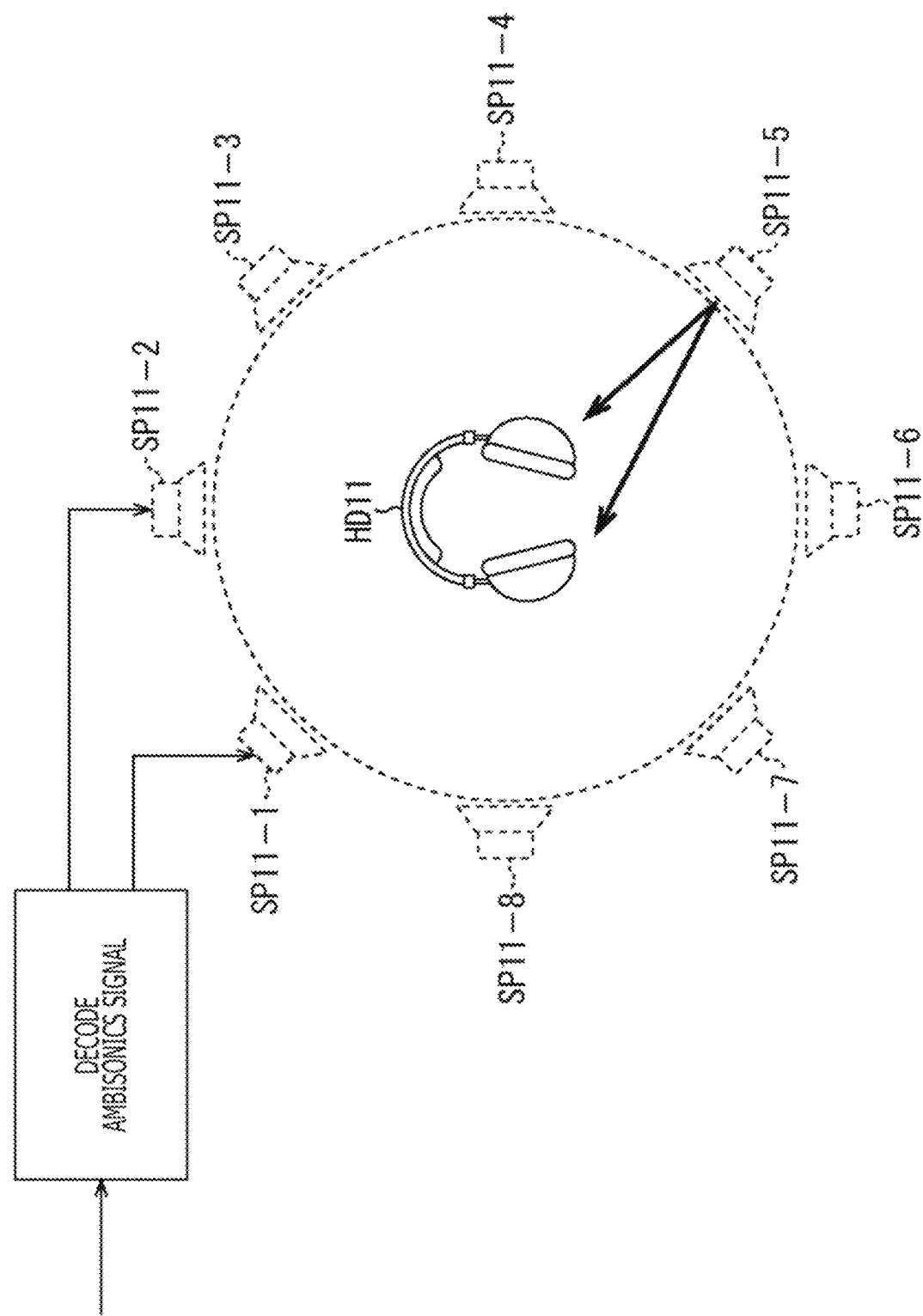
FIG. 1 is a diagram describing simulation of stereophonic sound using head-related transfer functions.

Hereinafter, embodiments of the present technique will be described with reference to the drawings.

First Embodiment

<Present Technique>

In the present technique, a head-related transfer function is handled as a function of spherical coordinates, and spherical harmonic function conversion is similarly performed to compose an input signal that is a sound signal and the head-related transfer function in a spherical harmonic domain without decoding the input signal into a speaker array signal. In this way, the present technique realizes a reproduction system more efficient in terms of an amount of operation and a used amount of memory.

For example, the spherical harmonic function conversion for a function $f(\theta, \phi)$ on the spherical coordinates is expressed by the following Formula (1).

[Math. 1]

$$F_n^m = \int_0^\pi \int_0^{2\pi} f(\theta,\phi) \overline{Y_n^m(\theta,\phi)} d\theta s\phi \qquad (1)$$

In Formula (1), $\theta$ and $\phi$ indicate an angle of elevation and a horizontal angle in the spherical coordinates, respectively, and $Y_n^m(\theta, \phi)$ indicates a spherical harmonic function. Furthermore, the description of "-" above the spherical harmonic function $Y_n^m(\theta, \phi)$ represents a complex conjugate of the spherical harmonic function $Y_n^m(\theta, \phi)$.

Here, the spherical harmonic function $Y_n^m(\theta, \phi)$ is represented by the following Formula (2).

[Math. 2]

$$Y_n^m(\theta, \phi) = (-1)^m \sqrt{\frac{2n+1(n-m)!}{4\pi(n+m)!}} P_n^m(\cos\theta) e^{jm\phi} \qquad (2)$$

In Formula (2), n and m indicate an order and a degree of the spherical harmonic function $Y_n^m(\theta, \phi)$ where $-n \leq m \leq n$. In addition, j indicates a pure imaginary number, and $P_n^m(x)$ is an associated Legendre function.

The associated Legendre function $P_n^m(x)$ is represented by the following Formula (3) or Formula (4) when $n \geq 0$ and $0 \leq m \leq n$. Note that Formula (3) is a case where m=0.

[Math. 3]

$$P_n^0(x) = \frac{1}{2^n n!} \frac{d^n}{dx^n}(x^2-1)^n \qquad (3)$$

[Math. 4]

$$P_n^m(x) = (1-x^2)^{m/2} \frac{d^n}{dx^n} P_m^0(x) \qquad (4)$$

Furthermore, the associated Legendre function $P_n^m(x)$ is represented by the following Formula (5) in a case where $-n \leq m \leq 0$.

[Math. 5]

$$P_n^m(x) = (-1)^m \frac{(n+m)!}{(n-m)!} P_n^{-m}(x) \qquad (5)$$

Furthermore, inverse conversion, into the function $f(\theta, \phi)$ on the spherical coordinates, from the function $F_n^m$ after the spherical harmonic function conversion is as indicated in the following Formula (6).

[Math. 6]

$$f(\theta, \phi) = \sum_{n=0}^{\infty} \sum_{m=-n}^{n} F_n^m Y_n^m(\theta, \phi) \qquad (6)$$

In this way, conversion from an input signal $D'^m_n(\omega)$ of sound after correction of the radial direction held in the spherical harmonic domain into a speaker drive signal $S(x_i, \omega)$ of each of L speakers arranged on the sphere with a radius R is as indicated in the following Formula (7).

[Math. 7]

$$S(x_j, \omega) = \sum_{n=0}^{N} \sum_{m=-n}^{n} D'^m_n(\omega) Y_n^m(\beta_i, \alpha_i) \qquad (7)$$

Note that in Formula (7), $x_i$ indicates the position of the speaker, and $\omega$ indicates the time frequency of the sound signal. The input signal $D'^m_n(\omega)$ is a sound signal corresponding to each order n and degree m of the spherical harmonic function with respect to a predetermined time frequency $\omega$.

Furthermore, $x_i$ equals to (R $\sin \beta_i \cos \alpha_i$, R $\sin \beta_i \sin \alpha_i$, R $\cos \beta_i$), and i indicates a speaker index specifying the speaker. Here, i equals to 1, 2, . . . , and L, and $\beta_i$ and $\alpha_i$ represent an angle of elevation and a horizontal angle indicating the position of an ith speaker, respectively.

The conversion indicated by Formula (7) is spherical harmonic inverse conversion corresponding to Formula (6). Furthermore, in the case of using Formula (7) to obtain the speaker drive signal $S(x_i, \omega)$, the number of speakers L that is the number of reproduction speakers and an order N of the spherical harmonic function, that is, a maximum value N of the order n, need to satisfy the relationship indicated in the following Formula (8).

[Math. 8]

$$L > (N+1)^2 \quad (8)$$

Incidentally, an example of a general method of simulating stereophonic sound at the ears through headphone presentation includes a method using a head-related transfer function as illustrated in FIG. 1.

In the example illustrated in FIG. 1, an input Ambisonics signal is decoded to generate respective speaker drive signals of virtual speakers SP11-1 to SP11-8 that are a plurality of virtual speakers. The signal decoded in this case corresponds to, for example, the input signal $D'_n{}^m(\omega)$ described above.

Here, the virtual speakers SP11-1 to SP11-8 are annularly lined up and virtually arranged, and the speaker drive signal of each virtual speaker is obtained by the calculation of Formula (7) described above. Note that the virtual speakers SP11-1 to SP11-8 may also be simply referred to as virtual speakers SP11 in a case where the distinction is not particularly necessary.

When the speaker drive signal of each virtual speaker SP11 is obtained in this way, left and right drive signals (binaural signals) of a headphone HD11 that actually reproduces the sound are generated for each virtual speaker SP11 by convolution using the head-related transfer function. A sum of the drive signals of the headphone HD11 obtained for the virtual speakers SP11 is then handled as an ultimate drive signal.

Note that the method is described in detail in, for example, "ADVANCED SYSTEM OPTIONS FOR BINAURAL RENDERING OF AMBISONIC FORMAT (Gerald Enzner et. al. ICASSP 2013)" and the like.

A head-related transfer function $H(x, \omega)$ used to generate the left and right drive signals of the headphone HD11 is obtained by normalizing a transfer characteristic $H_1(x, \omega)$ from a sound source position x to an eardrum position of the user as a listener, with the head of the user existing in a free space, by using a transfer characteristic $H_0(x, \omega)$ from the sound source position x to a center O of the head, with the head not existing in the free space. Therefore, the head-related transfer function $H(x, \omega)$ for the sound source position x is obtained by the following Formula (9).

[Math. 9]

$$H(x, \omega) = \frac{H_1(x, \omega)}{H_0(x, \omega)} \quad (9)$$

Here, the head-related transfer function $H(x, \omega)$ can be convolved with an arbitrary sound signal and presented to the headphone or the like to create an illusion that the listener can feel as if the sound comes from the direction of the convolved head-related transfer function $H(x, \omega)$, that is, from the direction of the sound source position x.

In the example illustrated in FIG. 1, such a principle is used to generate the left and right drive signals of the headphone HD11.

Specifically, the position of each virtual speaker SP11 will be defined as position $x_i$, and the speaker drive signals of the virtual speakers SP11 will be defined as $S(x_i, \omega)$.

Furthermore, the number of virtual speakers SP11 will be defined as L (here, L=8), and the ultimate left and right drive signals of the headphone HD11 will be defined as $P_l$ and $P_r$ individually.

In this case, when the speaker drive signals $S(x_i, \omega)$ are simulated by the presentation of the headphone HD11, the left and right drive signals $P_l$ and $P_r$ of the headphone HD11 can be obtained by calculating the following formula (10).

[Math. 10]

$$P_l = \sum_{i=1}^{L} S(x_i, \omega) H_l(x_i, \omega)$$

$$P_r = \sum_{i=1}^{L} S(x_i, \omega) H_r(x_i, \omega) \quad (10)$$

Note that in Formula (10), $H_l(x_i, \omega)$ and $H_r(x_i, \omega)$ indicate the normalized head-related transfer functions from the position $x_i$ of the virtual speaker SP11 to the left and right eardrum positions of the listener individually.

The operation makes it possible to reproduce the input signals $D'_n{}^m(\omega)$ in the spherical harmonic domain through the headphone presentation ultimately. That is, the same effect as in Ambisonics can be realized by the headphone presentation.

Figure 2:
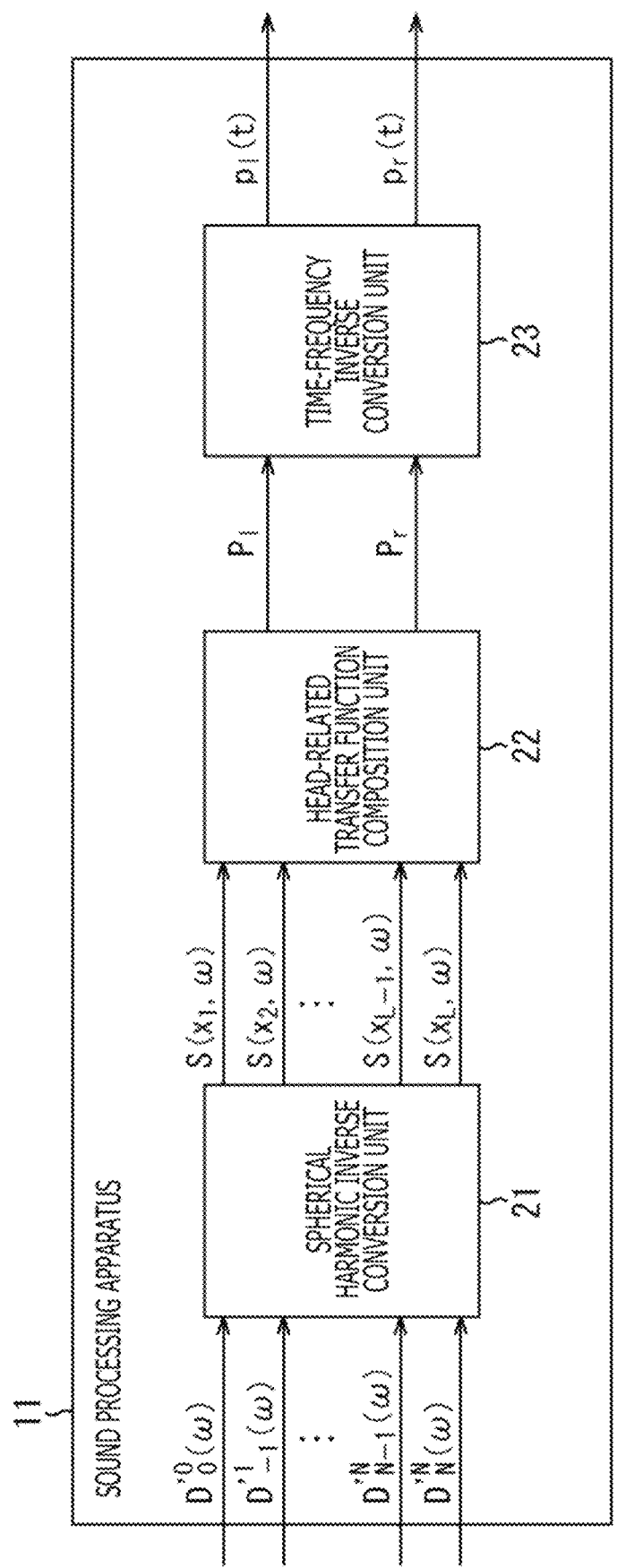
FIG. 2 depicts a configuration of a general sound processing apparatus.

A sound processing apparatus that uses a method in general (hereinafter, also referred to as general method) combining the Ambisonics and the binaural reproduction technique in this way to generate the left and right drive signals of the headphone from the input signals is configured as illustrated in FIG. 2.

That is, a sound processing apparatus 11 illustrated in FIG. 2 includes a spherical harmonic inverse conversion unit 21, a head-related transfer function composition unit 22, and a time-frequency inverse conversion unit 23.

The spherical harmonic inverse conversion unit 21 calculates Formula (7) to perform the spherical harmonic inverse conversion of the input signals $D'_n{}^m(\omega)$ and supplies the speaker drive signals $S(x_i, \omega)$ of the virtual speakers SP11 obtained as a result of the spherical harmonic inverse conversion to the head-related transfer function composition unit 22.

The head-related transfer function composition unit 22 uses Formula (10) to generate the left and right drive signals $P_l$ and $P_r$ of the headphone HD11 on the basis of the speaker drive signals $S(x_i, \omega)$ from the spherical harmonic inverse conversion unit 21 and on the basis of head-related transfer functions $H_l(x_i, \omega)$ and head-related transfer functions $H_r(x_j, \omega)$ prepared in advance and outputs the left and right drive signals $P_l$ and $P_r$.

The time-frequency inverse conversion unit 23 further performs time-frequency inverse conversion of the drive signal $P_l$ and the drive signal $P_r$ that are signals in the time-frequency domain output from the head-related transfer function composition unit 22. The time-frequency inverse conversion unit 23 supplies a drive signal $p_l(t)$ and a drive signal $p_r(t)$ that are signals in the time domain obtained as a result of the time-frequency inverse conversion to the headphone HD11 to cause the headphone HD11 to reproduce the sound.

Note that hereinafter, the drive signal $P_l$ and the drive signal $P_r$ regarding the time frequency $\omega$ will also be simply referred to as drive signals $P(\omega)$ in a case where the distinction is not particularly necessary, and the drive signal $p_l(t)$ and the drive signal $p_r(t)$ will also be simply referred to as drive signals $p(t)$ in a case where the distinction is not particularly necessary. Furthermore, the head-related transfer functions $H_l(x_i, \omega)$ and the head-related transfer functions $H_r(x_i, \omega)$ will also be simply referred to as head-related transfer functions $H(x_i, \omega)$ in a case where the distinction is not particularly necessary.

Figure 3:
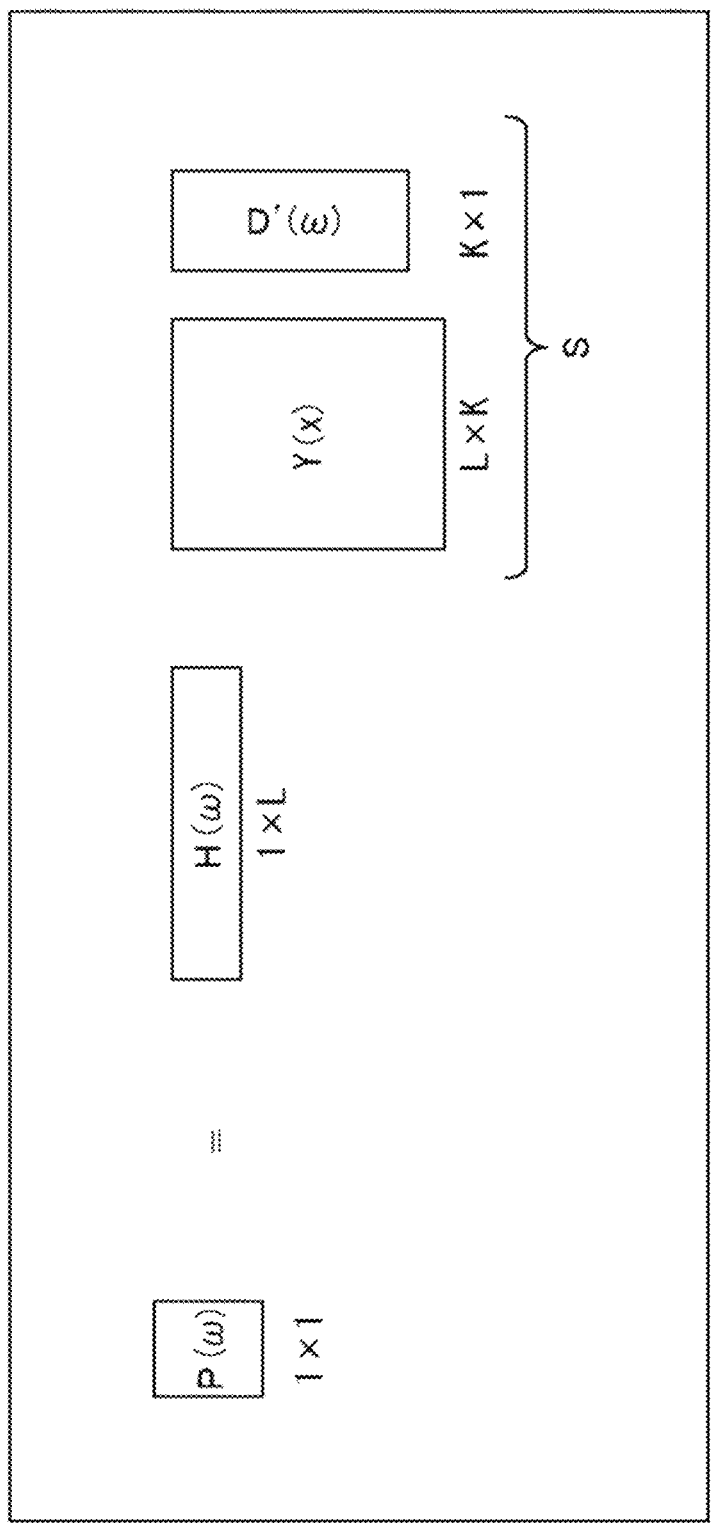
FIG. 3 is a diagram describing computation of drive signals based on a general method.

The sound processing apparatus 11 performs an operation as illustrated for example in FIG. 3 to obtain a 1×1 drive signal $P(\omega)$, that is one row and one column.

In FIG. 3, $H(\omega)$ represents a vector (matrix) of 1×L including L head-related transfer functions $H(x_i, \omega)$. In addition, $D'(\omega)$ represents a vector including the input signals $D'_n{}^m(\omega)$, and the vector $D'(\omega)$ is K×1 when the number of input signals $D'_n{}^m(\omega)$ of bins at the same time frequency $\omega$ is defined as K. Furthermore, Y(x) represents a matrix including the spherical harmonic functions $Y_n{}^m(\beta_i, \alpha_i)$ of each order, and the matrix Y(x) is a matrix of L×K.

Therefore, the sound processing apparatus 11 obtains a matrix (vector) S obtained from a matrix operation of the matrix Y(x) of L×K and the vector $D'(\omega)$ of K×1. The sound processing apparatus 11 further performs a matrix operation of the matrix S and the vector (matrix) $H(\omega)$ of 1×L and obtains one drive signal $P(\omega)$.

In addition, in a case where the head of the listener wearing the headphone HD11 rotates in a predetermined direction represented by a rotation matrix $g_j$(hereinafter, also referred to as direction $g_j$), the drive signal $P_l(g_j, \omega)$ of the left headphone of the headphone HD11 is as illustrated for example in the following Formula (11).

[Math. 11]

$$P_l(g_j, \omega) = \sum_{i=1}^{L} S(x_i, \omega) H_l(g_j^{-1} x_i, \omega) \quad (11)$$

Note that the rotation matrix $g_j$ is a rotation matrix of three dimensions, that is, 3×3, represented by $\phi$, $\theta$, and $\psi$ that are rotation angles of Euler angles. Furthermore, the drive signal $P_l(g_j, \omega)$ in Formula (11) indicates the drive signal $P_l$, and it is written as drive signal $P_l(g_j, \omega)$ here to clarify the position, that is, direction $g_j$ and time frequency $\omega$.

Figure 4:
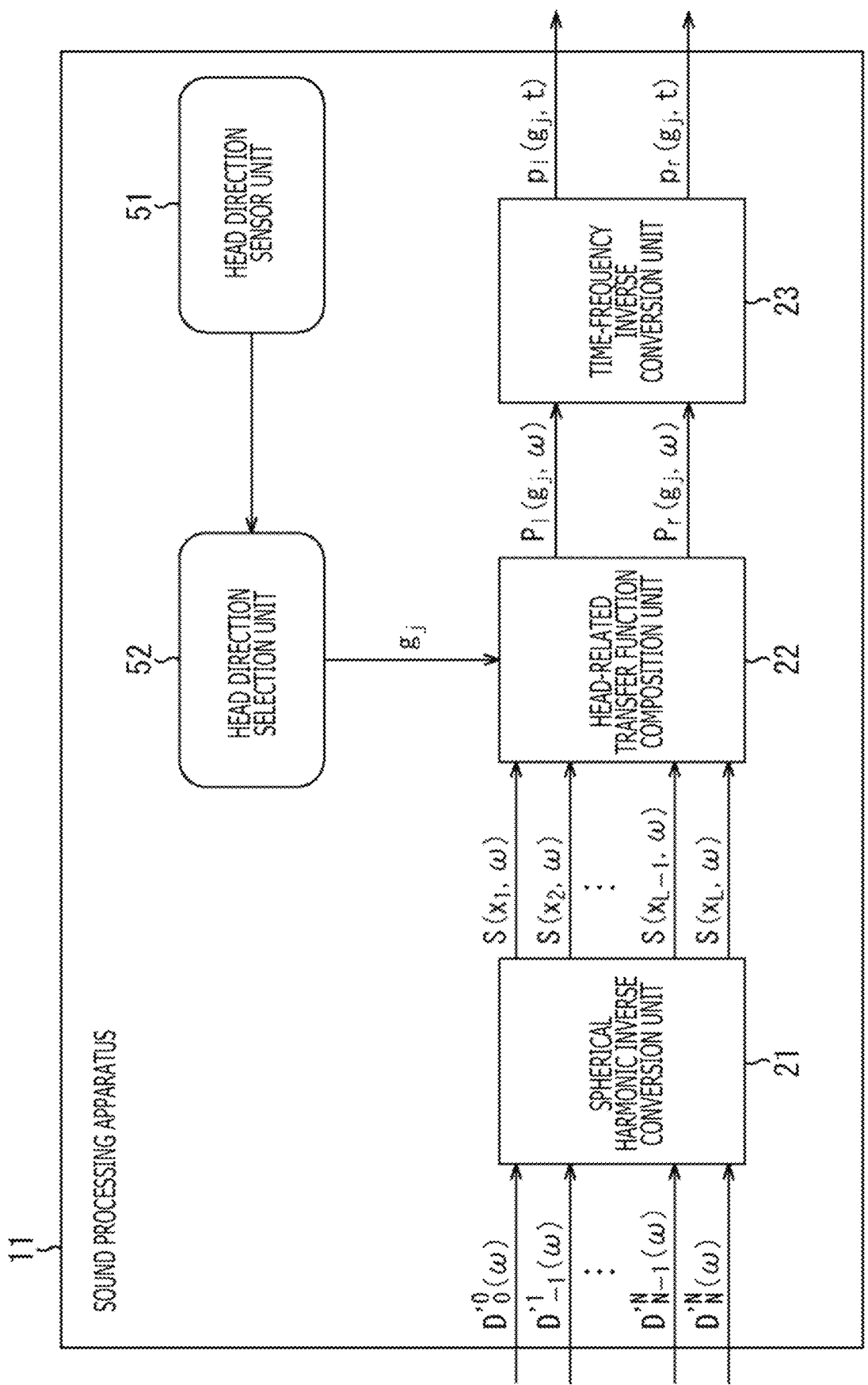
FIG. 4 depicts a configuration of the sound processing apparatus further provided with a head tracking function.

Components for specifying the rotation direction of the head of the listener, that is, components of a head tracking function, can be further provided to the general sound processing apparatus 11 as illustrated for example in FIG. 4 to fix, in the space, the stereo image position as viewed from the listener. Note that in FIG. 4, the same reference signs are provided to the parts corresponding to the case of FIG. 2, and the description will be appropriately omitted.

In the sound processing apparatus 11 illustrated in FIG. 4, a head direction sensor unit 51 and a head direction selection unit 52 are further provided to the configuration illustrated in FIG. 2.

The head direction sensor unit 51 detects the rotation of the head of the user as a listener and supplies the detection result to the head direction selection unit 52. The head direction selection unit 52 obtains, as the direction $g_j$, the rotation direction of the head of the listener, that is, the direction of the head of the listener after the rotation, on the basis of the detection result from the head direction sensor unit 51, and supplies the direction $g_j$ to the head-related transfer function composition unit 22.

In this case, on the basis of the direction $g_j$ supplied from the head direction selection unit 52, the head-related transfer function composition unit 22 uses head-related transfer functions of relative directions $g_j^{-1} x_i$ of the virtual speakers SP11 as viewed from the head of the listener among the plurality of head-related transfer functions prepared in advance to compute the left and right drive signals of the headphone HD11. As a result, the stereo image position as viewed from the listener can also be fixed in the space in the case of reproducing the sound by the headphone HD11 as in a case of using a real speaker.

Using the general method and the method further including the head tracking function added to the general method described above to generate the drive signals of the headphone can obtain the same advantageous effect as in Ambisonics without using a speaker array or without limiting the range that can reproduce the sound space. However, not only the amount of operation, such as convolution of head-related transfer functions, becomes large in the methods, but also the used amount of memory used in the operation and the like becomes large.

Therefore, the convolution of the head-related transfer functions performed in the time-frequency domain in the general method is performed in the spherical harmonic domain in the present technique. This can reduce the amount of operation of the convolution and the required amount of memory and can more efficiently reproduce the sound.

A method according to the present technique will now be described.

For example, focusing on the left headphone, the vector $P_l(\omega)$ including each drive signal $P_l(g_j, \omega)$ of the left headphone with respect to the entire rotation direction of the head of the user as a listener is represented as illustrated in the following Formula (12).

[Math. 12]

$$P_l(\omega) = H(\omega) S(\omega) \quad (12)$$
$$= H(\omega) Y(x) D'(\omega)$$

Note that in Formula (12), $S(\omega)$ is a vector including the speaker drive signals $S(x_i, \omega)$ where $S(\omega) = Y(x) D'(\omega)$. Furthermore, Y(x) in Formula (12) represents a matrix including spherical harmonic functions $Y_n{}^m(x_i)$ of the positions $x_i$ of each order and each virtual speaker indicated by the following Formula (13). Here, i equals to 1, 2, . . . , L, and the maximum value (maximum order) of the order n is N.

$D'(\omega)$ represents a vector (matrix) including the input signals $D'_n{}^m(\omega)$ of the sound corresponding to each order indicated by the following Formula (14). Each input signal $D'_n{}^m(\omega)$ is a signal in the spherical harmonic domain.

Furthermore, $H(\omega)$ in Formula (12) represents a matrix including head-related transfer functions $H(g_j^{-1} x_i, \omega)$ of the relative directions $g_j^{-1} x_i$ of each virtual speaker as viewed from the head of the listener in the case where the direction of the head of the listener is the direction $g_j$ indicated by the following Formula (15). In the example, the head-related transfer functions $H(g_j^{-1} x_i, \omega)$ of each virtual speaker are prepared for each of a total of M directions from a direction $g_l$ to a direction $g_m$.

[Math. 13]

$$Y(x) = \begin{pmatrix} Y_0^0(x_1) & \cdots & Y_N^N(x_1) \\ \vdots & \ddots & \vdots \\ Y_0^0(x_L) & \cdots & Y_N^N(x_L) \end{pmatrix} \quad (13)$$

[Math. 14]

$$D'(\omega) = \begin{pmatrix} D'^0_0(\omega) \\ \vdots \\ D'^N_N(\omega) \end{pmatrix} \quad (14)$$

[Math. 15]

$$H(\omega) = \begin{pmatrix} H(g_1^{-1}x_1, \omega) & \cdots & H(g_1^{-1}x_L, \omega) \\ \vdots & \ddots & \vdots \\ H(g_M^{-1}x_1, \omega) & \cdots & H(g_M^{-1}x_L, \omega) \end{pmatrix} \quad (15)$$

In the computation of the drive signals $P_l(g_j, \omega)$ of the left headphone when the head of the listener faces the direction $g_j$, a row corresponding to the direction $g_j$ that is the orientation of the head of the listener, that is, a row including the head-related transfer functions $H(g_j^{-1}x_i, \omega)$ regarding the direction $g_j$, in the matrix $H(\omega)$ of the head-related transfer functions can be selected to perform the calculation of Formula (12).

Figure 5:
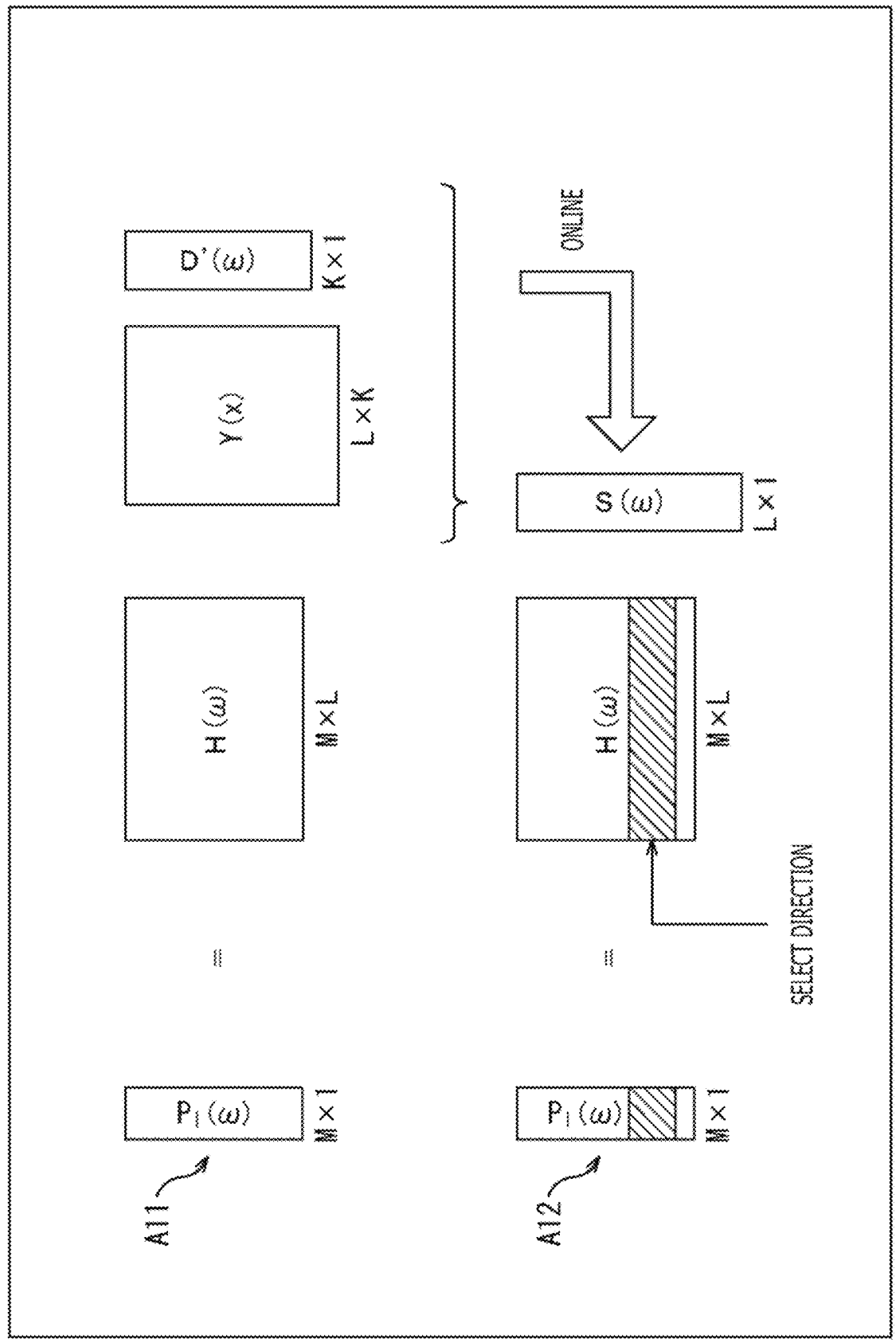
FIG. 5 is a diagram describing computation of drive signals in the case where the head tracking function is further provided.

In this case, only the necessary row is calculated as illustrated for example in FIG. 5.

In the example, the head-related transfer function is prepared for each of M directions, and the matrix calculation indicated in Formula (12) is as indicated by an arrow A11.

More specifically, when the number of input signals $D'^m_n(\omega)$ of the time frequency $\omega$ is defined as K, the vector $D'(\omega)$ is a matrix of K×1, that is, K rows and one column. Furthermore, the matrix $Y(x)$ of the spherical harmonic functions is L×K, and the matrix $H(\omega)$ is M×L. Therefore, the vector $P_l(\omega)$ is M×1 in the calculation of Formula (12).

Here, when a matrix operation (product-sum operation) of the matrix $Y(x)$ and the vector $D'(\omega)$ is performed first to obtain the vector $S(\omega)$ in an online operation, the row corresponding to the direction $g_j$ of the head of the listener can be selected from the matrix $H(\omega)$ as indicated by an arrow A12 in the computation of the drive signals $P_l(g_j, \omega)$, and the amount of operation can be reduced. In FIG. 5, the part provided with oblique lines in the matrix $H(\omega)$ represents the row corresponding to the direction $g_j$, and an operation of the row and the vector $S(\omega)$ is performed to compute desired drive signals $P_l(g_j, \omega)$ of the left headphone.

Here, when the matrix $H'(\omega)$ is defined as indicated by Formula (16), the vector $P_l(\omega)$ indicated in Formula (12) can be expressed by the following Formula (17).

[Math. 16]

$$H'(\omega) = H(\omega)Y(x) \quad (16)$$

[Math. 17]

$$P_l(\omega) = H'(\omega)D'(\omega) \quad (17)$$

In Formula (16), the spherical harmonic functions are used to perform the spherical harmonic function conversion to convert the head-related transfer functions, more specifically, the matrix $H(\omega)$ including the head-related transfer functions in the time-frequency domain, into the matrix $H'(\omega)$ including the head-related transfer functions in the spherical harmonic domain.

Therefore, convolution of the speaker drive signals and the head-related transfer functions is performed in the spherical harmonic domain in the calculation of Formula (17). In other words, a product-sum operation of the head-related transfer functions and the input signals is performed in the spherical harmonic domain. Note that the matrix $H'(\omega)$ can be calculated in advance and held.

In this case, in the calculation of the drive signals $P_l(g_j, \omega)$ of the left headphone when the head of the listener faces the direction $g_j$, the row corresponding to the direction $g_j$ of the head of the listener can be selected from the matrix $H'(\omega)$ held in advance to perform the calculation of Formula (17).

In such a case, the calculation of Formula (17) is calculation illustrated in the following Formula (18). This can significantly reduce the amount of operation and the required amount of memory.

[Math. 18]

$$P_l(g_j, \omega) = \sum_{n=0}^{N} \sum_{m=-n}^{n} H'^m_n(g_j, \omega) D'^m_n(\omega) \quad (18)$$

In Formula (18), $H'^m_n(g_j, \omega)$ indicates one element of the matrix $H'(\omega)$, that is, the head-related transfer function in the spherical harmonic domain as a component (element) corresponding to the direction $g_j$ of the head in the matrix $H'(\omega)$. In the head-related transfer function $H'^m_n(g_j, \omega)$, n and m indicate the order n and the degree m of the spherical harmonic function.

Figure 6:
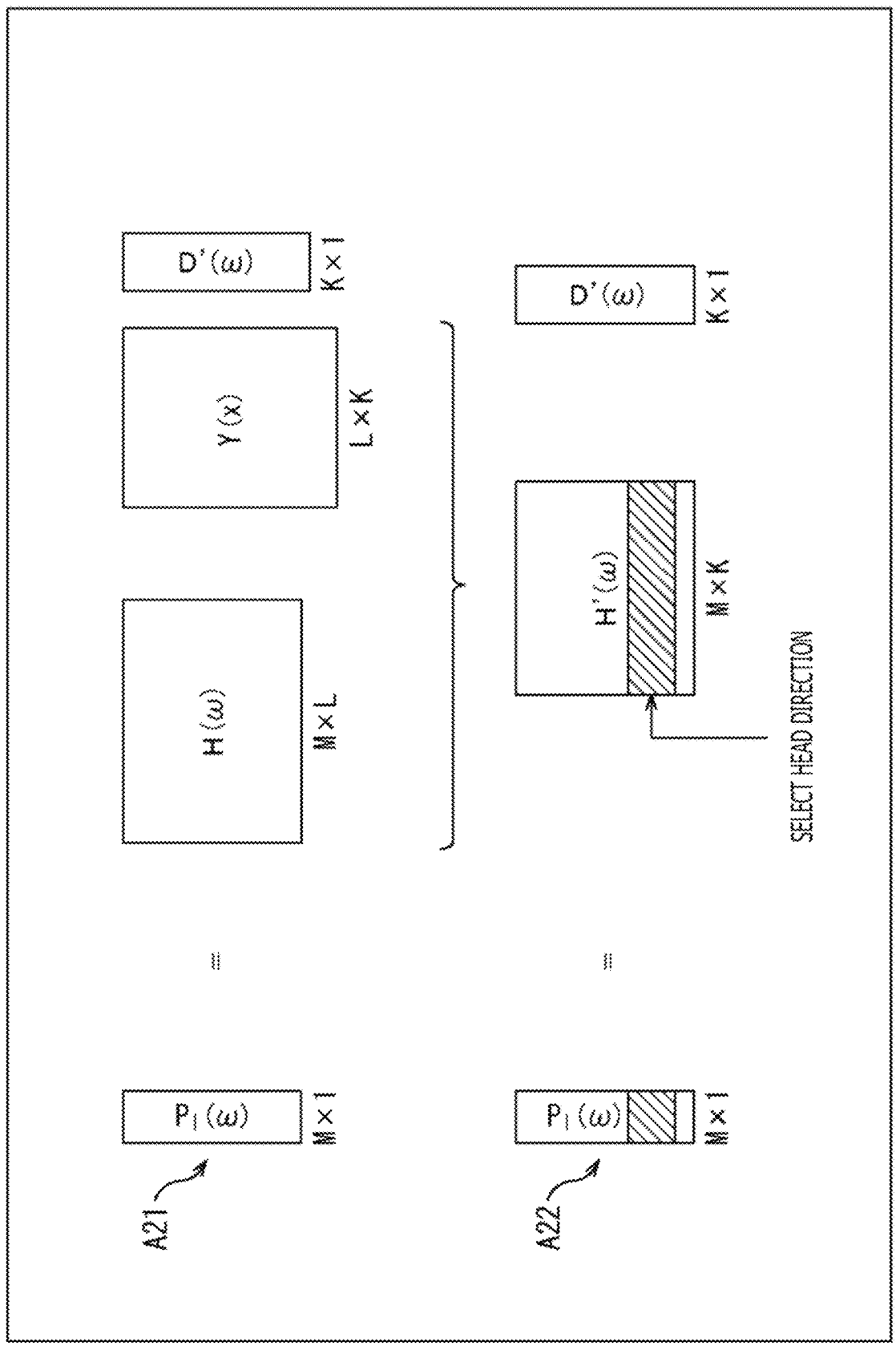
FIG. 6 is a diagram describing computation of drive signals based on a first proposed method.

In the operation indicated in Formula (18), the amount of operation is reduced as illustrated in FIG. 6. That is, the calculation indicated in Formula (12) is calculation of obtaining the product of the matrix $H(\omega)$ of M×L, the matrix $Y(x)$ of L×K, and the vector $D'(\omega)$ of K×1 as indicated by an arrow A21 of FIG. 6.

Here, $H(\omega)Y(x)$ is the matrix $H'(\omega)$ as defined in Formula (16), and the calculation indicated by the arrow A21 is eventually as illustrated by an arrow A22. Particularly, the calculation of obtaining the matrix $H'(\omega)$ can be performed offline, that is, in advance. Therefore, the matrix $H'(\omega)$ can be obtained and held in advance, and this can reduce the amount of operation in obtaining the drive signals of the headphone online.

When the matrix $H'(\omega)$ is obtained in advance in this way, the calculation indicated by the arrow A22, that is, the calculation of Formula (18) described above, is performed to actually obtain the drive signals of the headphone.

More specifically, the row corresponding to the direction $g_j$ of the head of the listener is selected from the matrix $H'(\omega)$ as indicated by the arrow A22, and the matrix operation of the selected row and the vector $D'(\omega)$ including the input signals $D'^m_n(\omega)$ is performed to compute the drive signals $P_l(g_j, \omega)$ of the left headphone. In FIG. 6, the part provided with the oblique lines in the matrix $H'(\omega)$ represents the row corresponding to the direction $g_j$, and the element included in the row is the head-related transfer function $H'^m_n(g_j, \omega)$ indicated in Formula (18).

<Reduction of Amount of Operation and the Like According to the Present Technique>

Here, with reference to FIG. 7, the amounts of operation of the sum of products and the required amounts of memory in the method according to the present technique described above (hereinafter, also referred to as first proposed method) and the general method will be compared.

For example, when the length of the vector $D'(\omega)$ is defined as K, and the matrix $H(\omega)$ of the head-related transfer functions is defined as M×L, the matrix $Y(x)$ of the spherical harmonic functions is L×K, and the matrix H'(ω) is M×K. In addition, the number of time-frequency bins ω will be defined as W.

Here, in the general method, a product-sum operation of L×K is performed for the bin of each time frequency ω (hereinafter, also referred to as time-frequency bin ω) as indicated by an arrow A31 of FIG. 7 in the course of the conversion of the vector D'(ω) into the time-frequency domain, and a product-sum operation of 2 L is performed in the convolution with the left and right head-related transfer functions.

Therefore, the total number of product-sum operations calc/W per time-frequency bin ω in the general method is calc/W=(L×K+2 L).

Figure 7:
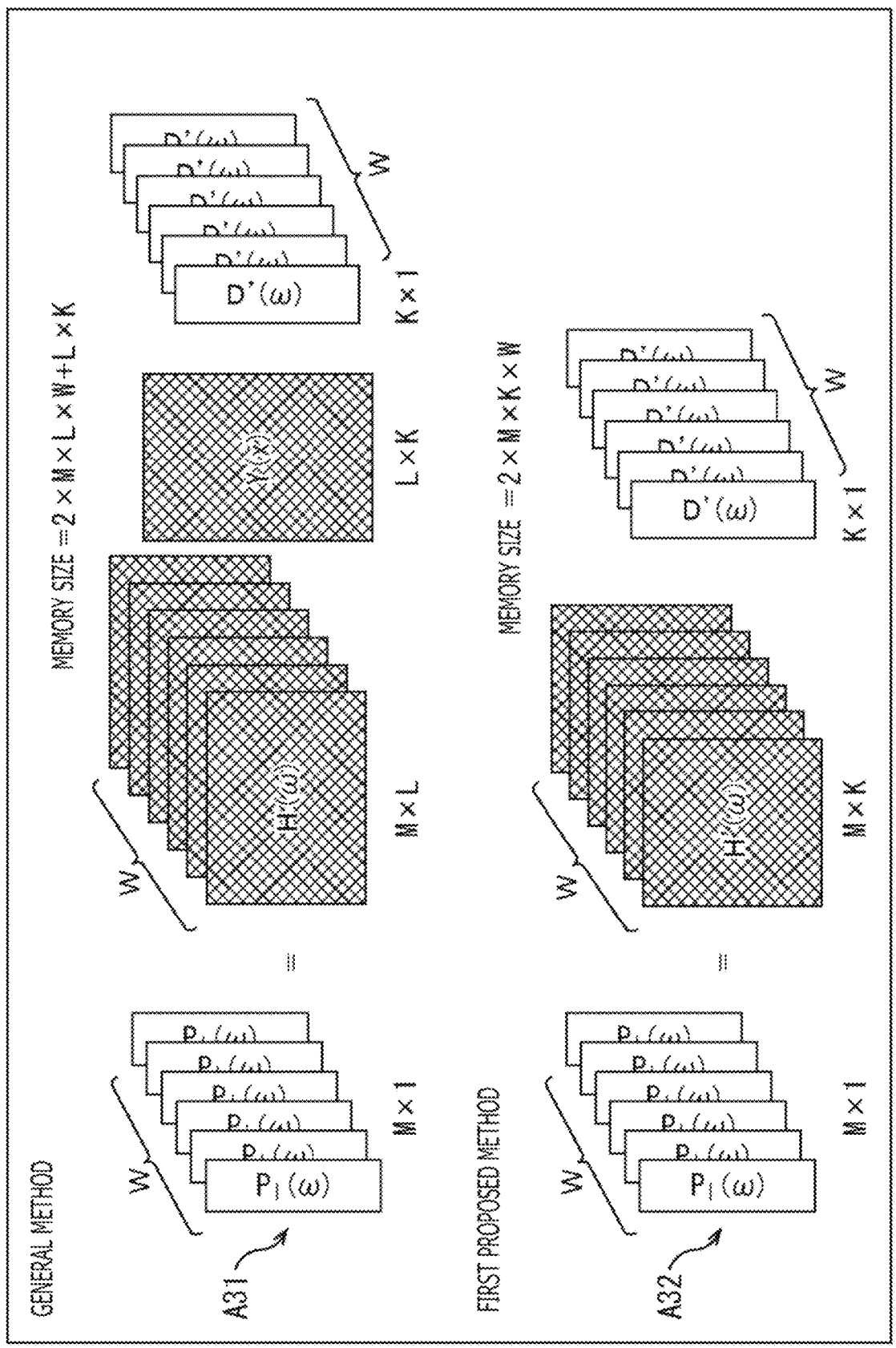
FIG. 7 is a diagram describing operations in the computation of the drive signals in the first proposed method and the general method.

In addition, when each coefficient of the product-sum operation is 1 byte, the amount of memory required for the operation in the general method is (the number of directions of the head-related transfer functions held)×2 bytes for each time-frequency bin ω, and the number of directions of the head-related transfer functions held is M×L as indicated by an arrow A31 in FIG. 7. Furthermore, a memory of L×K bytes is required for the matrix Y(x) of the spherical harmonic functions common to all time-frequency bins ω.

Therefore, when the number of time-frequency bins ω is defined as W, the required amount of memory "memory" in the general method is memory=(2×M×L×W+L×K) bytes in total.

On the other hand, an operation indicated by an arrow A32 of FIG. 7 is performed for each time-frequency bin ω in the first proposed method.

More specifically, in the first proposed method, a product-sum operation of K is performed for the sum of products of the vector D'(ω) and the matrix H'(ω) of the head-related transfer functions in the spherical harmonic domain of one ear for each time-frequency bin ω.

Therefore, the total number of product-sum operations calc/W in the first proposed method is calc/W=2K.

Furthermore, as for the amount of memory required for the operation in the first proposed method, the matrix H'(ω) of the head-related transfer functions needs to be held for each time-frequency bin ω, and a memory of M×K bytes is necessary for the matrix H'(ω).

Therefore, when the number of time-frequency bins ω is defined as W, the required amount of memory "memory" in the first proposed method is memory=(2 MKW) bytes in total.

Now, if the maximum order of the spherical harmonic function is 4, then $K=(4+1)^2=25$. It is also assumed that the number of virtual speakers L is L=32 because L needs to be larger than K.

In such a case, the amount of operation of the sum of products in the general method is calc/W=(32×25+2×32)=864, while the amount of operation of the sum of products in the first proposed method is just calc/W=2×25=50. Therefore, it can be recognized that the amount of operation is significantly reduced.

Furthermore, the amount of memory required for the operation is memory=(2×1000×32×100+32×25)=6400800 in the general method where W=100 and M=1000, for example. On the other hand, the amount of memory required for the operation in the first proposed method is memory=(2 MKW)=2×1000×25×100=5000000, and it can be recognized that the required amount of memory is significantly reduced.

<Configuration Example of Sound Processing Apparatus>

Figure 8:
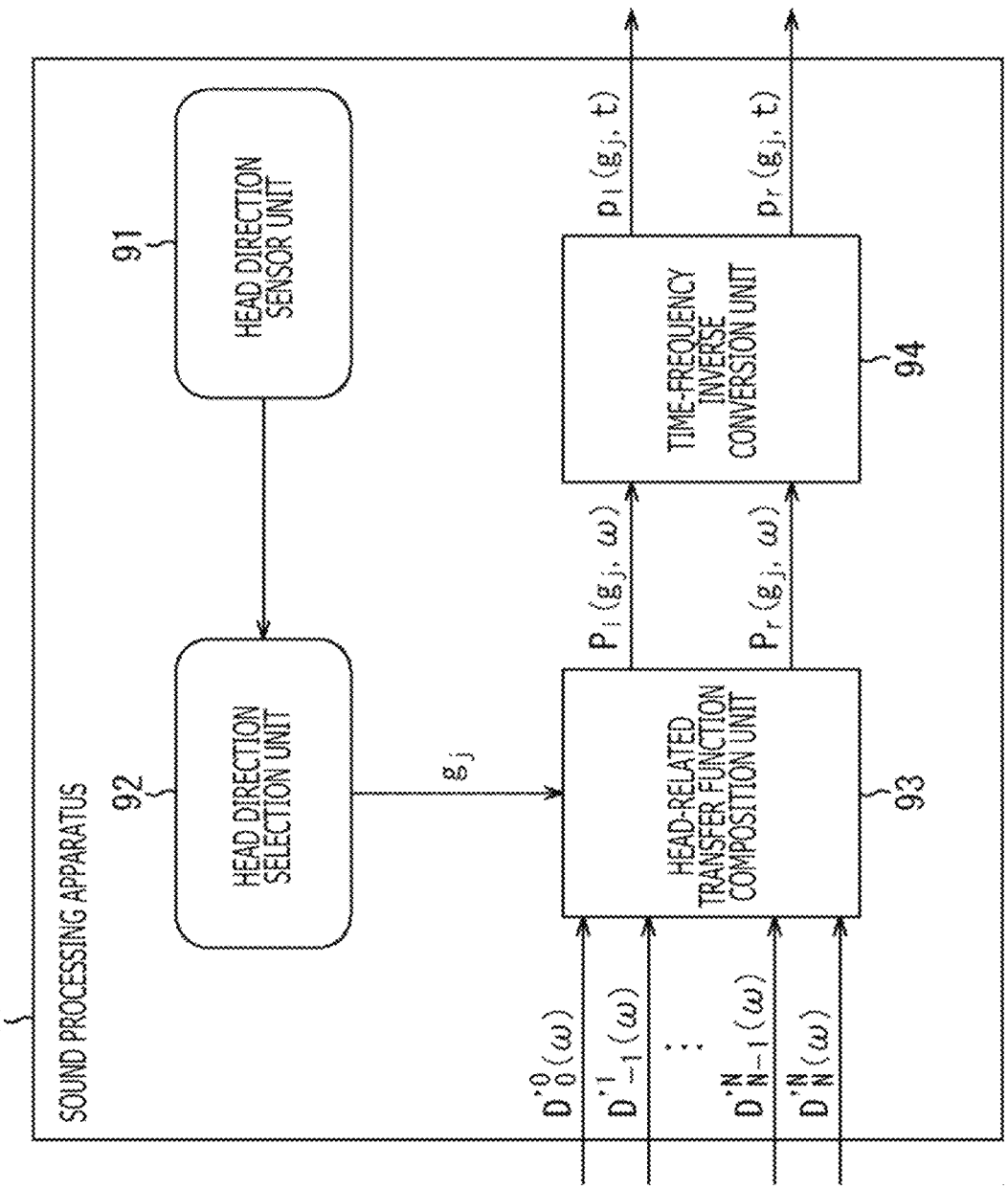
FIG. 8 depicts a configuration example of a sound processing apparatus according to the present technique.

Next, a sound processing apparatus according to the present technique described above will be described. FIG. 8 depicts a configuration example of an embodiment of the sound processing apparatus according to the present technique.

A sound processing apparatus 81 illustrated in FIG. 8 includes a head direction sensor unit 91, a head direction selection unit 92, a head-related transfer function composition unit 93, and a time-frequency inverse conversion unit 94. Note that the sound processing apparatus 81 may be built in the headphone or may be an apparatus different from the headphone.

The head direction sensor unit 91 includes an acceleration sensor, an image sensor, and the like attached to, for example, the head of the user as necessary. The head direction sensor unit 91 detects the rotation (movement) of the head of the user as a listener and supplies the detection result to the head direction selection unit 92. Note that the user here is a user wearing the headphone, that is, a user that listens to the sound reproduced by the headphone on the basis of the drive signals of the left and right headphones obtained by the time-frequency inverse conversion unit 94.

The head direction selection unit 92 obtains the rotation direction of the head of the listener, that is, the direction $g_j$ of the head of the listener after the rotation, on the basis of the detection result from the head direction sensor unit 91, and supplies the direction $g_j$ to the head-related transfer function composition unit 93. In other words, the head direction selection unit 92 acquires the detection result from the head direction sensor unit 91 to acquire the direction $g_j$ of the head of the user.

The input signals $D'^m_n(\omega)$ of each order of the spherical harmonic functions for each time-frequency bin ω that are sound signals in the spherical harmonic domain are supplied from the outside to the head-related transfer function composition unit 93. The head-related transfer function composition unit 93 also holds the matrix H'(ω) including the head-related transfer functions obtained in advance by calculation.

The head-related transfer function composition unit 93 performs convolution of the supplied input signals $D'^m_n(\omega)$ and the held matrix H'(ω) for each of the left and right headphones to compose the input signals $D'^m_n(\omega)$ and the head-related transfer functions in the spherical harmonic domain and calculates drive signal $P_l(g_j, \omega)$ and the drive signal $P_r(g_j, \omega)$ of the left and right headphones. In this case, the head-related transfer function composition unit 93 selects the row corresponding to the direction $g_j$ supplied from the head direction selection unit 92 from the matrix H'(ω), that is, the row including the head-related transfer function $H'^m_n(g_j, \omega)$ of Formula (18) described above for example, and performs the convolution with the input signals $D'^m_n(\omega)$.

As a result of the operation, the head-related transfer function composition unit 93 obtains the drive signal $P_l(g_j, \omega)$ of the left headphone in the time-frequency domain and the drive signal $P_r(g_j, \omega)$ of the right headphone in the time-frequency domain for each time-frequency bin ω.

The head-related transfer function composition unit 93 supplies the obtained drive signals $P_l(g_j, \omega)$ and $P_r(g_j, \omega)$ of the left and right headphones to the time-frequency inverse conversion unit 94.

The time-frequency inverse conversion unit 94 performs time-frequency inverse conversion of the drive signals in the time-frequency domain supplied from the head-related transfer function composition unit 93 for each of the left and right headphones to obtain a drive signal $P_l(g_j, t)$ of the left headphone in the time domain and a drive signal $P_r(g_j, t)$ of the right headphone in the time domain and outputs the drive signals to a later stage. A reproduction apparatus in the later stage that reproduces sound in 2 channels, such as a headphone, more specifically, a headphone including earphones, reproduces the sound on the basis of the drive signals output from the time-frequency inverse conversion unit 94.

<Description of Drive Signal Generation Process>

Subsequently, a drive signal generation process executed by the sound processing apparatus 81 will be described with reference to a flow chart of FIG. 9. The drive signal generation process is started when the input signals $D'^m_n(\omega)$ are supplied from the outside.

In step S11, the head direction sensor unit 91 detects the rotation of the head of the user as a listener and supplies the detection result to the head direction selection unit 92.

In step S12, the head direction selection unit 92 obtains the direction $g_j$ of the head of the listener on the basis of the detection result from the head direction sensor unit 91, and supplies the direction $g_j$ to the head-related transfer function composition unit 93.

In step S13, the head-related transfer function composition unit 93 convolves the supplied input signals $D'^m_n(\omega)$ with the head-related transfer functions $H'^m_n(g_j, \omega)$ included in the matrix $H'(\omega)$ held in advance on the basis of the direction $g_j$ supplied from the head direction selection unit 92.

More specifically, the head-related transfer function composition unit 93 selects the row corresponding to the direction $g_j$ from the matrix $H'(\omega)$ held in advance and calculates Formula (18) on the basis of the head-related transfer functions $H'^m_n(g_j, \omega)$ included in the selected row and the input signals $D'^m_n(\omega)$ to compute the drive signal $P_l(g_j, \omega)$ of the left headphone. The head-related transfer function composition unit 93 also performs an operation for the right headphone as in the case of the left headphone to compute the drive signal $P_r(g_j, \omega)$ of the right headphone.

The head-related transfer function composition unit 93 supplies the drive signal $P_l(g_j, \omega)$ and the drive signal $P_r(g_j, \omega)$ of the left and right headphones obtained in this way to the time-frequency inverse conversion unit 94.

In step S14, for each of the left and right headphones, the time-frequency inverse conversion unit 94 performs the time-frequency inverse conversion of the drive signals in the time-frequency domain supplied from the head-related transfer function composition unit 93 to compute the drive signal $P_l(g_j, t)$ of the left headphone and the drive signal $P_r(g_j, t)$ of the right headphone. For example, inverse discrete Fourier transform is performed as the time-frequency inverse conversion.

The time-frequency inverse conversion unit 94 outputs the drive signal $P_l(g_j, t)$ and the drive signal $P_r(g_j, t)$ in the time domain obtained in this way to the left and right headphones, and the drive signal generation process ends.

As described, the sound processing apparatus 81 convolves the input signals with the head-related transfer functions in the spherical harmonic domain and computes the drive signals of the left and right headphones.

In this way, the convolution of the head-related transfer functions in the spherical harmonic domain can significantly reduce the amount of operation in generating the drive signals of the headphone and can also significantly reduce the amount of memory required for the operation. In other words, the sound can be more efficiently reproduced.

Second Embodiment

<Direction of Head>

Incidentally, while the amount of operation and the required amount of memory can be significantly reduced in the first proposed method described above, the rows corresponding to all rotation directions of the head of the listener, that is, each direction $g_j$, need to be provided in the matrix $H'(\omega)$ of the head-related transfer functions and held in the memory.

Therefore, a matrix (vector) including the head-related transfer functions in the spherical harmonic domain regarding one direction $g_j$ may be defined as $H_S(\omega)=H'(g_j)$, and only the matrix $H_S(\omega)$ of the row corresponding to one direction $g_j$ in the matrix $H'(\omega)$ may be held. Rotation matrices $R'(g_j)$ for rotation corresponding to the head rotation of the listener in the spherical harmonic domain may be held, and the number of a plurality of rotation matrices $R'(g_j)$ may be equal to the number of directions $g_j$. Hereinafter, the method will be referred to as a second proposed method of the present technique.

Unlike the matrix $H'(\omega)$, the rotation matrix $R'(g_j)$ of each direction $g_j$ is not dependent on the time frequency. Therefore, the amount of memory can be significantly reduced compared to when the component of the direction $g_j$ of the rotation of the head is included in the matrix $H'(\omega)$.

First, a product $H'(g_j^{-1}, \omega)$ of the row $H(g_j^{-1}x, \omega)$ corresponding to a predetermined direction $g_j$ of the matrix $H(\omega)$ and the matrix $Y(x)$ of the spherical harmonic functions will be considered as illustrated in the following Formula (19).

[Math. 19]

$$H'(g_j^{-1},\omega)=H(g_j^{-1},\omega)Y(x) \qquad (19)$$

Although the coordinates of the head-related transfer function used for the direction $g_j$ of the rotation of the head of the listener is rotated from x to $g_j^{-1}x$ in the first proposed method, the same result can be obtained by rotating the coordinates of the spherical harmonic function from x to $g_jx$ without changing the coordinates of the position x of the head-related transfer function. That is, the following Formula (20) is satisfied.

[Math. 20]

$$H'(g_j^{-1},\omega)=H(g_j^{-1}x,\omega)Y(x)=H(x,\omega)Y(g_jx) \qquad (20)$$

Furthermore, a matrix $Y(g_jx)$ of the spherical harmonic function is a product of the matrix $Y(x)$ and a rotation matrix $R'(g_j^{-1})$ and is as illustrated in the following Formula (21). Note that the rotation matrix $R'(g_j^{-1})$ is a matrix for rotating the coordinates by $g_j$ in the spherical harmonic domain.

[Math. 21]

$$Y(g_jx)=Y(x)R'(g_j^{-1}) \qquad (21)$$

Here, as for k and m belonging to a set Q illustrated in the following Formula (22), elements other than the element in row k, column m in the rotation matrix $R'(g_j)$ are zero.

[Math. 22]

$$Q=[q|n^2+1\leq q\leq(n+1)^2, q,n\in\{0,1,2\ldots\}] \qquad (22)$$

Therefore, a spherical harmonic function $Y^m_n(g_jx)$ as an element of the matrix $Y(g_jx)$ can be expressed as in the following Formula (23) using an element $R'^{(n)}_{k,m}(g_j)$ of row k, column m of the rotation matrix $R'(g_j)$.

[Math. 23]

$$Y_n^m(g_j x) = \sum_{k=-n}^{n} Y_n^k(x) R'^{(n)}_{k,m}(g_j^{-1})$$  (23)

Here, the element $R'^{(n)}_{k,m}(g_j)$ is represented by the following Formula (24).

[Math. 24]

$$R'^{(n)}_{k,m}(g_j) = e^{-jm\phi} r^{(n)}_{k,m}(\theta) e^{-jk\psi}$$  (24)

Note that in Formula (24), θ, φ, and ψ indicate rotation angles of the Euler angles of the rotation matrix, and $r^{(n)}_{k,m}(\theta)$ is indicated by the following Formula (25).

[Math. 25]

$$r^{(n)}_{k,m}(\theta) = \sqrt{\frac{(n+k)!(n-k)!}{(n+m)!(n-m)!}}$$

$$\sum_{\sigma} \binom{n+m}{n-k-\sigma} \binom{n-m}{\sigma} (-1)^{n-k-\sigma} \left(\cos\frac{\theta}{2}\right)^{2\sigma+k+m} \left(\sin\frac{\theta}{2}\right)^{2n-2\sigma-k-m}$$  (25)

Therefore, a binaural reproduction signal reflecting the rotation of the head of the listener by using the rotation matrix $R'(g_j^{-1})$, such as a drive signal $P_l(g_j, \omega)$ of the left headphone, can be obtained by calculating the following Formula (26). Furthermore, in a case where the left and right head-related transfer functions can be regarded as being symmetrical, a matrix $R_{ref}$ can be used to invert the left or right of one of the input signal $D'(\omega)$ and the matrix $H_S(\omega)$ of the left head-related transfer function in preprocessing of Formula (26), and the right headphone drive signal can be obtained just by holding only the matrix $H_S(\omega)$ of the left head-related transfer function. However, a case where separate left and right head-related transfer functions are necessary will be basically described below.

[Math. 26]

$$P_l(g_j, \omega) = H(g_j^{-1} x, \omega) Y(x) D'(\omega)$$  (26)
$$= H(x, \omega) Y(x) R'(g_j^{-1}) D'(\omega)$$
$$= H_s(\omega) R'(g_j^{-1}) D'(\omega)$$

In Formula (26), the matrix $H_S(\omega)$ as a vector, the rotation matrix $R'(g_j^{-1})$, and the vector $D'(\omega)$ are composed to obtain the drive signal $P_l(g_j, \omega)$.

Figure 10:
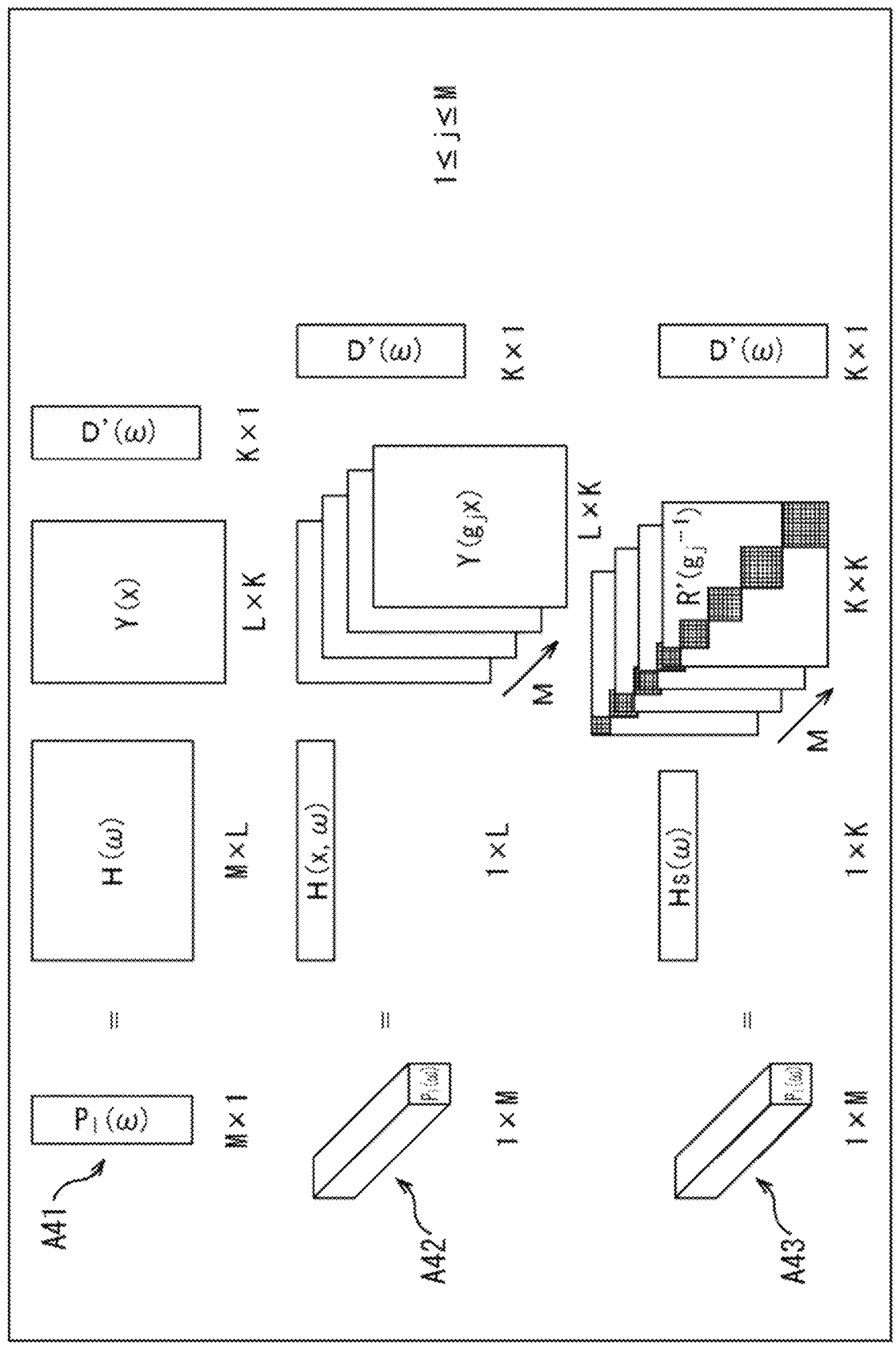
FIG. 10 is a diagram describing computation of drive signals based on a second proposed method.

The calculation described above is, for example, calculation illustrated in FIG. 10. That is, the vector $P_l(\omega)$ including the drive signal $P_l(g_j, \omega)$ of the left headphone is obtained by the product of the matrix H(ω) of M×L, the matrix Y(x) of L×K, and the vector D'(ω) of K×1 as indicated by an arrow A41 of FIG. 10. The matrix operation is as indicated in Formula (12) described above.

The operation is as indicated by an arrow A42 when the operation is expressed by using the matrix $Y(g_j, \omega)$ of the spherical harmonic functions prepared for each of M directions $g_j$. That is, the vector $P_l(\omega)$ including the drive signal $P_l(g_j, \omega)$ corresponding to each of the M directions $g_j$ is obtained by the product of the predetermined matrix H(x, ω) of the matrix H(ω), the matrix $Y(g_j x)$, and the vector D'(ω) on the basis of the relationship illustrated in Formula (20).

Here, the row H(x, ω) as a vector is 1×L, the matrix $Y(g_j x)$ is L×K, and the vector D'(ω) is K×1. This is further modified by using the relationships illustrated in Formula (17) and Formula (21), and the operation is as indicated by an arrow A43. That is, as indicated in Formula (26), the vector $P_l(\omega)$ is obtained by the product of the matrix $H_S(\omega)$ of 1×K, the rotation matrix $R'(g_j^{-1})$ of K×K of each of the M directions $g_j$, and the vector D'(ω) of K×1.

Note that in FIG. 10, the parts provided with oblique lines in the rotation matrices $R'(g_j^{-1})$ represent the elements of the rotation matrices $R'(g_j^{-1})$ that are not zero.

Figure 11:
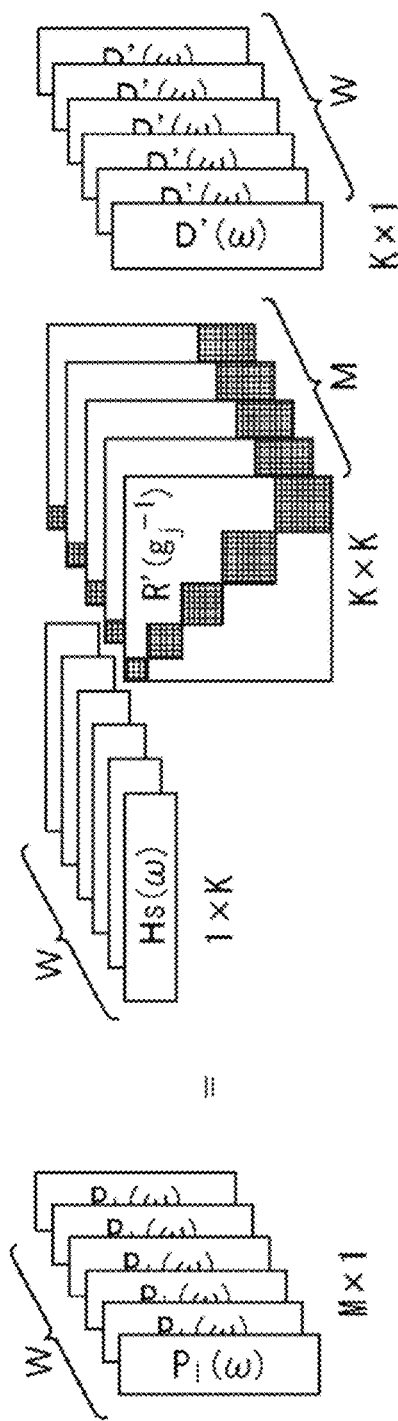
FIG. 11 is a diagram describing an amount of operation and a required amount of memory in the second proposed method.

Furthermore, the amount of operation and the required amount of memory in the second proposed method are as illustrated in FIG. 11.

That is, as illustrated in FIG. 11, it is assumed that the matrix $H_S(\omega)$ of 1×K is prepared for each time-frequency bin ω, the rotation matrices $R'(g_j^{-1})$ of K×K are prepared for the M directions $g_j$, and the vector D'(ω) is K×1. It is also assumed that the number of time-frequency bins ω is W, and the maximum value of the order n, that is, the maximum order, of the spherical harmonic function is J.

In this case, the number of elements of the rotation matrices $R'(g_j^{-1})$ that are not zero is (J+1)(2J+1)(2J+3)/3, and the total number of product-sum operations calc/W per time-frequency bin ω in the second proposed method is as indicated in the following Formula (27).

[Math. 27]

$$calc/W = \frac{(J+1)(2J+1)(2J+3)}{3} + 2K$$  (27)

Furthermore, the matrix $H_S(\omega)$ of 1×K for each time-frequency bin ω needs to be held for the left and right ears in the operation of the second proposed method, and the elements of the rotation matrix $R'(g_j^{-1})$ that are not zero also need to be held for each of the M directions. Therefore, the amount of memory "memory" required for the operation in the second proposed method is as indicated in the following Formula (28).

[Math. 28]

$$memory = M \times \frac{(J+1)(2J+1)(2J+3)}{3} + 2 \times K \times W$$  (28)

Here, $K=(J+1)^2=25$ is obtained when, for example, the maximum order of the spherical harmonic function is J=4. Furthermore, it is assumed that W=100 and M=1000.

In this case, the amount of operation of the sum of products in the second proposed method is calc/W=(4+1)(8+1)(8+3)/3+2×25=215. Furthermore, the amount of memory "memory" required for the operation is 1000×(4+1)(8+1)(8+3)/3+2×25×100=170000.

On the other hand, in the first proposed method, the amount of operation of the sum of products under the same conditions is calc/W=50, and the amount of memory is memory=5000000.

Therefore, according to the second proposed method, it can be recognized that the required amount of memory can be significantly reduced compared to the first proposed method, although the amount of operation increases a little.

<Configuration Example of Sound Processing Apparatus>

Next, a configuration example of a sound processing apparatus that uses the second proposed method to compute the drive signals of the headphone will be described. In such a case, the sound processing apparatus is configured as illustrated for example in FIG. 12. Note that in FIG. 12, the parts corresponding to the case of FIG. 8 are provided with the same reference signs, and the description will be appropriately omitted.

Figure 12:
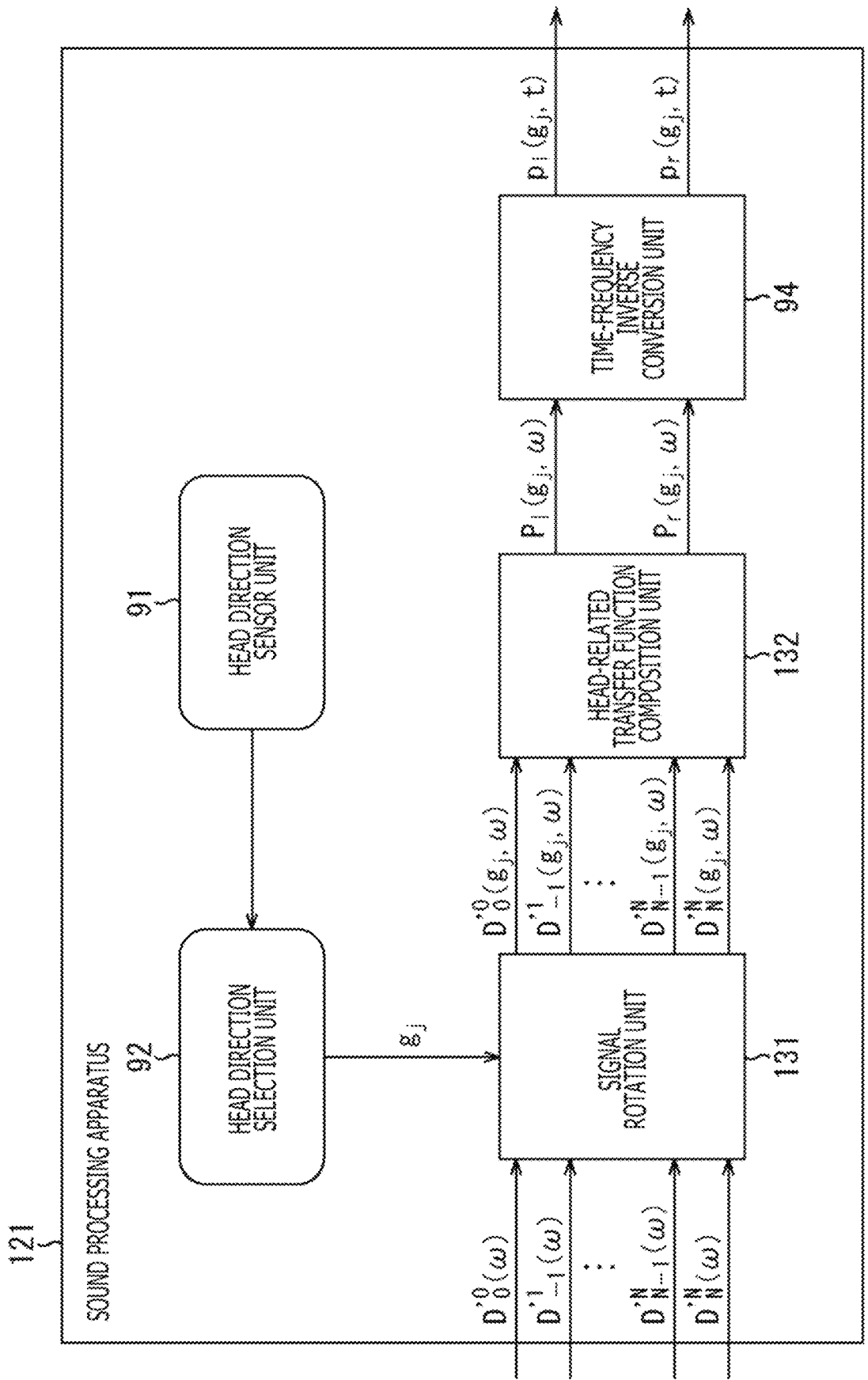
FIG. 12 depicts a configuration example of a sound processing apparatus according to the present technique.

A sound processing apparatus 121 illustrated in FIG. 12 includes the head direction sensor unit 91, the head direction selection unit 92, a signal rotation unit 131, a head-related transfer function composition unit 132, and the time-frequency inverse conversion unit 94.

The configuration of the sound processing apparatus 121 is different from the sound processing apparatus 81 illustrated in FIG. 8 in that the signal rotation unit 131 and the head-related transfer function composition unit 132 are provided in place of the head-related transfer function composition unit 93, and the configuration of the other part is similar to the sound processing apparatus 81.

The signal rotation unit 131 holds in advance the rotation matrices $R'(g_j^{-1})$ for the plurality of directions and selects, from the rotation matrices $R'(g_j^{-1})$, the rotation matrix $R'(g_j^{-1})$ corresponding to the direction $g_j$ supplied from the head direction selection unit 92.

The signal rotation unit 131 further uses the selected rotation matrix $R'(g_j^{-1})$ to rotate the input signal $D'_n{}^m(\omega)$ supplied from the outside by $g_j$ that is the amount of rotation of the head of the listener and supplies the input signal $D'_n{}^m(g_j, \omega)$ obtained as a result of the rotation to the head-related transfer function composition unit 132. That is, the signal rotation unit 131 calculates the product of the rotation matrix $R'(g_j^{-1})$ and the vector $D'(\omega)$ in Formula (26) described above and sets the calculation result as the input signal $D'_n{}^m(g_j, \omega)$.

The head-related transfer function composition unit 132 obtains, for each of the left and right headphones, the product of the input signal $D'_n{}^m(g_j, \omega)$ supplied from the signal rotation unit 131 and the matrix $H_S(\omega)$ of the head-related transfer function in the spherical harmonic domain held in advance to compute the drive signals of the left and right headphones. That is, the head-related transfer function composition unit 132 performs an operation of obtaining the product of $H_S(\omega)$ and $R'(g_j^{-1})D'(\omega)$ in Formula (26) in the computation of, for example, the drive signal of the left headphone.

The head-related transfer function composition unit 132 supplies the drive signal $P_l(g_j, \omega)$ and the drive signal $P_r(g_j, \omega)$ of the left and right headphones obtained in this way to the time-frequency inverse conversion unit 94.

Here, the input signal $D'_n{}^m(g_j, \omega)$ is commonly used for the left and right headphones, and the matrix $H_S(\omega)$ is prepared for each of the left and right headphones. Therefore, the amount of operation can be reduced by first obtaining the input signal $D'_n{}^m(g_j, \omega)$ common to the left and right headphones and then performing the convolution of the head-related transfer function of the matrix $H_S(\omega)$ as in the sound processing apparatus 121. Note that in a case where the left and right coefficients can be regarded as being symmetrical, the matrix $H_S(\omega)$ may be held in advance only for the left. An inverted matrix for inverting the left and right may be used for the result of the calculation of the input signal $D'_n{}^m(g_j, \omega)$ for the left to obtain an input signal $D'_{ref n}{}^m(g_j, \omega)$ for the right, and the drive signal of the right headphone may be computed from $H_S(\omega)D'_{ref n}{}^m(g_j, \omega)$.

In the sound processing apparatus 121 illustrated in FIG. 12, blocks including the signal rotation unit 131 and the head-related transfer function composition unit 132 correspond to the head-related transfer function composition unit 93 of FIG. 8 and function as a head-related transfer function composition unit that composes the input signal, the head-related transfer function, and the rotation matrix to generate the drive signals of the headphone.

<Description of Drive Signal Generation Process>

Figure 13:
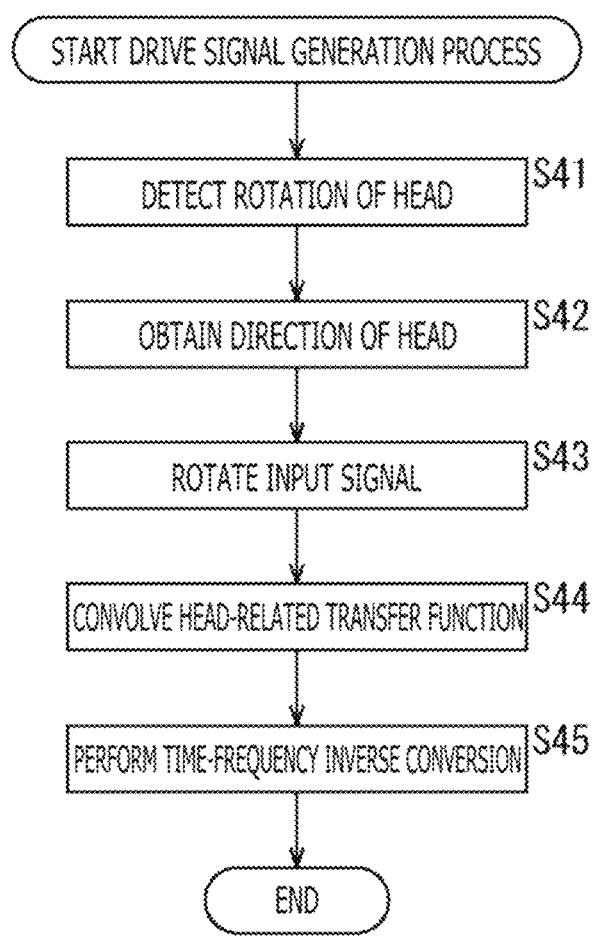
FIG. 13 is a flow chart describing a drive signal generation process.

Subsequently, a drive signal generation process executed by the sound processing apparatus 121 will be described with reference to a flow chart of FIG. 13. Note that the processes of step S41 and step S42 are similar to the processes of step S11 and step S12 in FIG. 9, and the description will not be repeated.

In step S43, on the basis of the rotation matrix $R'(g_j^{-1})$ corresponding to the direction $g_j$ supplied from the head direction selection unit 92, the signal rotation unit 131 rotates the input signal $D'_n{}^m(\omega)$ supplied from the outside by $g_j$ and supplies the input signal $D'_n{}^m(g_j, \omega)$ obtained as a result of the rotation to the head-related transfer function composition unit 132.

In step S44, the head-related transfer function composition unit 132 obtains, for each of the left and right headphones, the product (sum of products) of the input signal $D'_n{}^m(g_j, \omega)$ supplied from the signal rotation unit 131 and the matrix $H_S(\omega)$ held in advance to convolve the input signal with the head-related transfer function in the spherical harmonic domain. The head-related transfer function composition unit 132 then supplies the drive signal $P_l(g_j, \omega)$ and the drive signal $P_r(g_j, \omega)$ of the left and right headphones obtained by the convolution of the head-related transfer function to the time-frequency inverse conversion unit 94.

When the drive signals of the left and right headphones in the time-frequency domain are obtained, the process of step S45 is then executed, and the drive signal generation process ends. The process of step S45 is similar to the process of step S14 in FIG. 9, and the description will not be repeated.

In this way, the sound processing apparatus 121 convolves the input signals with the head-related transfer functions in the spherical harmonic domain to calculate the drive signals of the left and right headphones. This can significantly reduce the amount of operation in generating the drive signals of the headphone and can also significantly reduce the amount of memory required for the operation.

Modification 1 of Second Embodiment

<Configuration Example of Sound Processing Apparatus>

In addition, although the example of calculating $R'(g_j^{-1})D'(\omega)$ first in the calculation of Formula (26) is described in the second embodiment, $H_S(\omega)R'(g_j^{-1})$ may be calculated first in the calculation of Formula (26). In such a case, the sound processing apparatus is configured as illustrated for example in FIG. 14. Note that in FIG. 14, the same reference signs are provided to the parts corresponding to the case in FIG. 8, and the description will be appropriately omitted.

Figure 14:
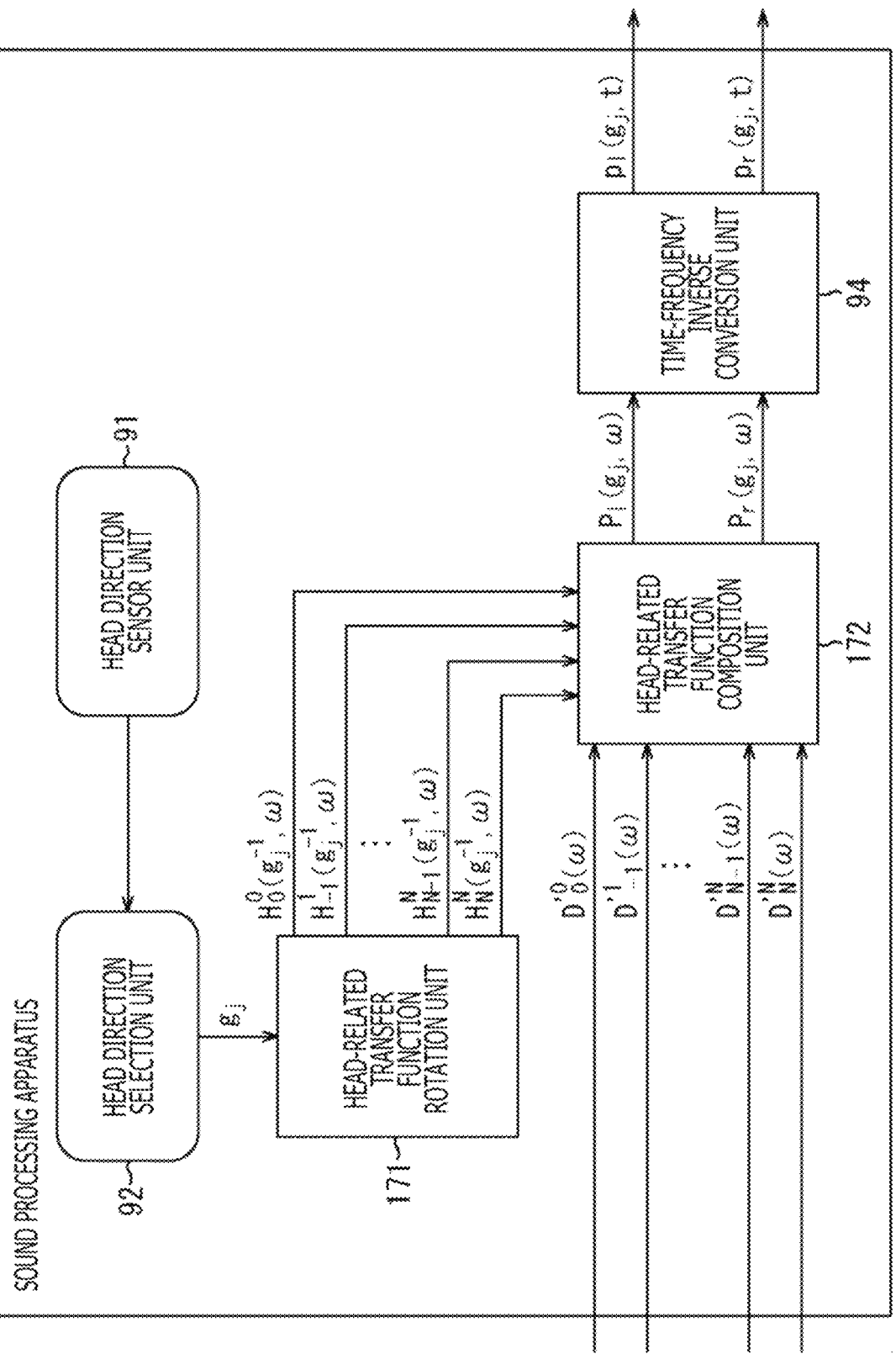
FIG. 14 depicts a configuration example of a sound processing apparatus according to the present technique.

A sound processing apparatus 161 illustrated in FIG. 14 includes the head direction sensor unit 91, the head direction selection unit 92, a head-related transfer function rotation unit 171, a head-related transfer function composition unit 172, and the time-frequency inverse conversion unit 94.

The configuration of the sound processing apparatus 161 is different from the sound processing apparatus 81 illustrated in FIG. 8 in that the head-related transfer function rotation unit 171 and the head-related transfer function composition unit 172 are provided in place of the head-related transfer function composition unit 93, and the configuration of the other part is similar to the sound processing apparatus 81.

The head-related transfer function rotation unit 171 holds in advance the rotation matrices $R'(g_j^{-1})$ for a plurality of directions and selects, from the rotation matrices $R'(g_j^{-1})$, the rotation matrix $R'(g_j^{-1})$ corresponding to the direction $g_j$ supplied from the head direction selection unit 92.

The head-related transfer function rotation unit 171 further obtains a product of the selected rotation matrix $R'(g_j^{-1})$ and the matrix $H_S(\omega)$ of the head-related transfer function in the spherical harmonic domain held in advance and supplies the product to the head-related transfer function composition unit 172. That is, the head-related transfer function rotation unit 171 performs the calculation corresponding to $H_S(\omega)R'(g_j^{-1})$ in Formula (26) for each of the left and right headphones, and as a result, the head-related transfer function as an element of the matrix $H_S(\omega)$ is rotated by $g_j$ equivalent to the rotation of the head of the listener. Note that in a case where the left and right coefficients can be regarded as being symmetrical, the matrix $H_S(\omega)$ may be held in advance only for the left. An inverted matrix for inverting the left and right may be used for the result of the calculation for the left to perform the calculation corresponding to $H_S(\omega)R'(g_j^{-1})$ for the right.

Note that the head-related transfer function rotation unit 171 may acquire the matrix $H_S(\omega)$ of the head-related transfer function from the outside.

The head-related transfer function composition unit 172 convolves the input signal $D'_n{}^m(\omega)$ supplied from the outside with the head-related transfer function supplied from the head-related transfer function rotation unit 171 for each of the left and right headphones to compute the drive signals of the left and right headphones. For example, in the computation of the drive signal of the left headphone, the head-related transfer function composition unit 172 performs calculation of obtaining the product of $H_S(\omega)R'(g_j^{-1})$ and $D'(\omega)$ in Formula (26).

The head-related transfer function composition unit 172 supplies the drive signal $P_l(g_j, \omega)$ and the drive signal $P_r(g_j, \omega)$ of the left and right headphones obtained in this way to the time-frequency inverse conversion unit 94.

In the sound processing apparatus 161 illustrated in FIG. 14, blocks including the head-related transfer function rotation unit 171 and the head-related transfer function composition unit 172 correspond to the head-related transfer function composition unit 93 of FIG. 8 and function as a head-related transfer function composition unit that composes the input signal, the head-related transfer function, and the rotation matrix to generate the drive signal of the headphone.

<Description of Drive Signal Generation Process>

Figure 15:
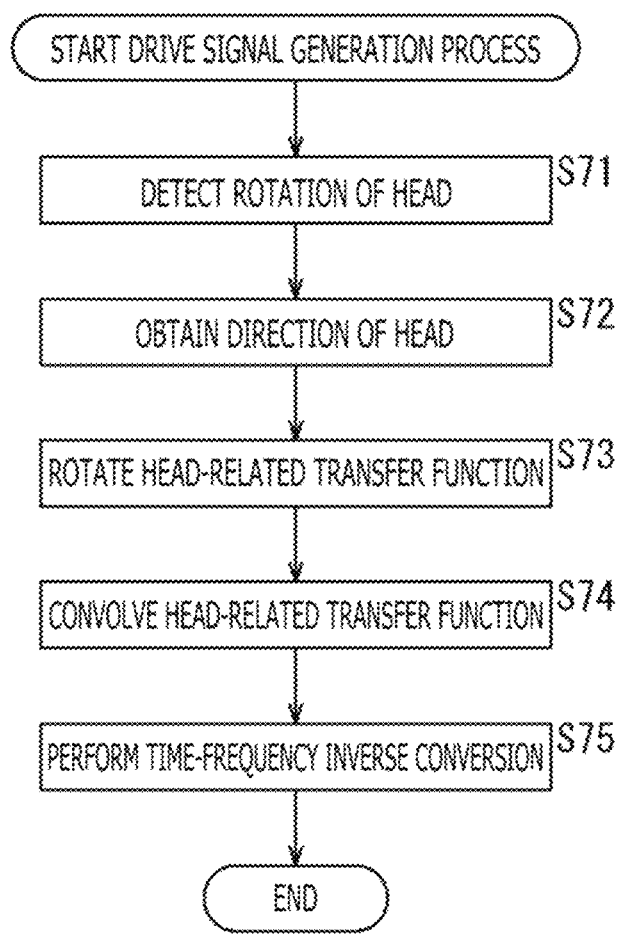
FIG. 15 is a flow chart describing a drive signal generation process.

Subsequently, a drive signal generation process executed by the sound processing apparatus 161 will be described with reference to a flow chart of FIG. 15. Note that the processes of step S71 and step S72 are similar to the processes of step S11 and step S12 of FIG. 9, and the description will not be repeated.

In step S73, the head-related transfer function rotation unit 171 rotates the head-related transfer function as an element of the matrix $H_S(\omega)$ on the basis of the rotation matrix $R'(g_j^{-1})$ corresponding to the direction $g_j$ supplied from the head direction selection unit 92 and supplies the matrix including the rotated head-related transfer function obtained as a result of the rotation to the head-related transfer function composition unit 172. That is, in step S73, the calculation corresponding to $H_S(\omega)R'(g_j^{-1})$ in Formula (26) is performed for each of the left and right headphones.

In step S74, the head-related transfer function composition unit 172 convolves the input signal $D'_n{}^m(\omega)$ supplied from the outside with the head-related transfer function supplied from the head-related transfer function rotation unit 171 for each of the left and right headphones to compute the drive signals of the left and right headphones. That is, in step S74, the calculation (product-sum operation) of obtaining the product of $H_S(\omega)R'(g_j^{-1})$ and $D'(\omega)$ in Formula (26) is performed for the left headphone, and similar calculation is also performed for the right headphone.

The head-related transfer function composition unit 172 supplies the drive signal $P_l(g_j, \omega)$ and the drive signal $P_r(g_j, \omega)$ of the left and right headphones obtained in this way to the time-frequency inverse conversion unit 94.

When the drive signals of the left and right headphones in the time-frequency domain are obtained in this way, the process of step S75 is then executed, and the drive signal generation process ends. The process of step S75 is similar to the process of step S14 of FIG. 9, and the description will not be repeated.

As described, the sound processing apparatus 161 convolves the input signals with the head-related transfer functions in the spherical harmonic domain to compute the drive signals of the left and right headphones. This can significantly reduce the amount of operation in generating the drive signals of the headphone and can also significantly reduce the amount of memory required for the operation.

Third Embodiment

<Rotation Matrix>

Incidentally, the rotation matrices $R'(g_j^{-1})$ need to be held for the rotations of three axes of the head of the listener, that is, for each of arbitrary M directions $g_j$, in the second proposed method. A certain amount of memory is required to hold the rotation matrices $R'(g_j^{-1})$ although the required amount of memory is smaller than in the case of holding the matrices $H'(\omega)$ with time-frequency dependence.

Therefore, the rotation matrices $R'(g_j^{-1})$ may be obtained one by one in the operation. Here, the rotation matrix $R'(g)$ can be expressed as in the following Formula (29).

[Math. 29]

$$R'(g)=R'(u(\phi)a(\theta)u(\psi))=R'(u(\phi))R'(a(\theta))R'(u(\psi)) \qquad (29)$$

Note that in Formula (29), $u(\phi)$ and $u(\omega)$ are matrices for rotating the coordinates by an angle $\phi$ and an angle $\psi$ with a predetermined axis of coordinates as the axis of rotation.

For example, assuming that there is a rectangular coordinate system including an x-axis, a y-axis, and a z-axis as axes, the matrix $u(\phi)$ is a rotation matrix for rotating the coordinate system by the angle $\phi$ in the direction of the horizontal angle (azimuth) as viewed from the coordinate system with the z-axis as the axis of rotation. Similarly, the matrix $u(\psi)$ is a matrix for rotating the coordinate system by the angle $\psi$ in the horizontal angle direction as viewed from the coordinate system with the z-axis as the axis of rotation.

Furthermore, $a(\theta)$ is a matrix for rotating the coordinate system by an angle $\theta$ in the direction of the angle of elevation as viewed from the coordinate system, in which the axis of rotation is another axis of coordinates different from the z-axis as the axis of coordinates that is the axis of rotation for $u(\phi)$ and $u(\psi)$. The each of rotation angles of the matrix $u(\phi)$, the matrix $(\theta)$, and the matrix $(\psi)$ is an Euler angle.

$R'(g)=R'(u(\phi)a(\theta)u(\psi))$ is a rotation matrix for rotating the coordinate system by the angle $\phi$ in the horizontal angle direction in the spherical harmonic domain, rotating the coordinate system after the rotation with the angle $\phi$ by the angle $\theta$ in the elevation angle direction as viewed from the coordinate system, and further rotating the coordinate system after the rotation with the angle $\theta$ by the angle $\psi$ in the horizontal angle direction as viewed from the coordinate system.

Furthermore, $R'(u(\phi))$, $R'(a(\theta))$, and $R'(u(\psi))$ in Formula (29) indicate rotation matrices $R'(g)$ for rotating the coordinates corresponding to the rotations based on the matrix $u(\phi)$, the matrix $a(\theta)$, and the matrix $u(\psi)$, respectively.

In other words, the rotation matrix $R'(u(\phi))$ is a rotation matrix for rotating the coordinates by the angle $\phi$ in the horizontal angle direction in the spherical harmonic domain, and the rotation matrix $R'(a(\theta))$ is a rotation matrix for rotating the coordinates by the angle $\theta$ in the elevation angle direction in the spherical harmonic domain. Furthermore, the rotation matrix $R'(u(\psi))$ is a rotation matrix for rotating the coordinates by the angle $\psi$ in the horizontal angle direction in the spherical harmonic domain.

Figure 16:
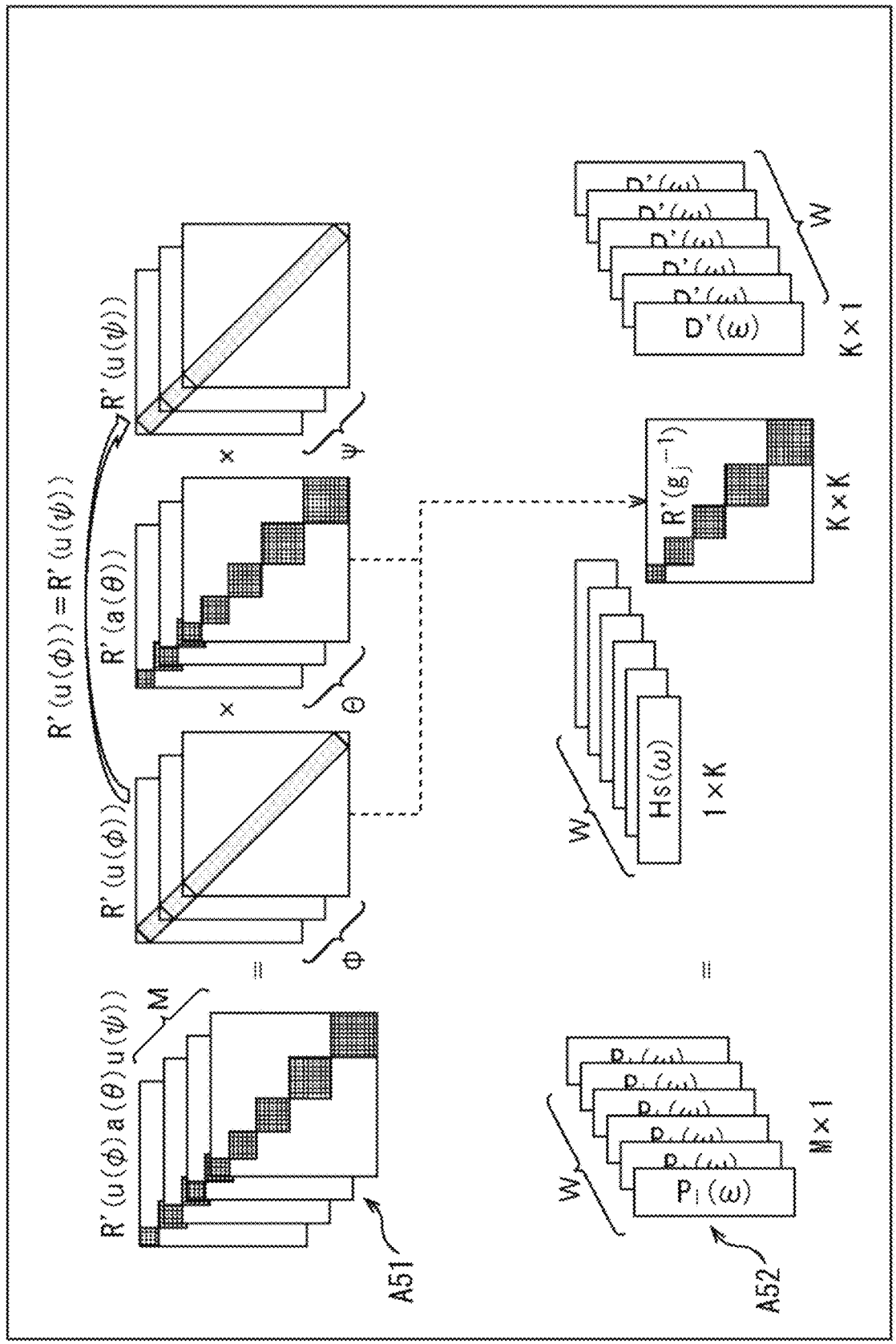
FIG. 16 is a diagram describing computation of drive signals based on a third proposed method.

Therefore, the rotation matrix $R'(g)=R'(u(\phi)a(\theta)u(\psi))$ for rotating the coordinates three times with the angle $\phi$, the angle $\theta$, and the angle $\psi$ as the rotation angles can be expressed by, for example, the product of three rotation matrices $R'(u(\phi))$, $R'(a(\theta))$, and $R'(u(\psi))$ as indicated by an arrow A51 in FIG. 16.

In this case, tables of the rotation matrix $R'(u(\phi))$, the rotation matrix $R'(a(\theta))$, and the rotation matrix $R'(u(\psi))$ of the values of the rotation angles $\phi$, $\theta$, and $\psi$ as data for obtaining the rotation matrix $R'(g_j^{-1})$ can be individually held in the memory. Furthermore, in the case where the same head-related transfer function can be used for the left and the right, the matrix $H_S(\omega)$ can be held for only one ear, and the matrix $R_{ref}$ for inverting the left and the right can also be held in advance. The product of the matrix $R_{ref}$ and the generated rotation matrix can be calculated to obtain the rotation matrix for the other ear.

Furthermore, in the actual computation of the vector $P_l(\omega)$, the product of each of the rotation matrices read from the tables is calculated to compute one rotation matrix $R'(g_j^{-1})$. The product of the matrix $H_S(\omega)$ of $1 \times K$, the rotation matrix $R'(g_j^{-1})$ of $K \times K$ common to the time-frequency bins $\omega$, and the vector $D'(\omega)$ of $K \times 1$ is then calculated for each time-frequency bin $\omega$ as indicated by an arrow A52 to obtain the vector $P_l(\omega)$.

Here, for example, in a case of holding the rotation matrix $R'(g_j^{-1})$ of each rotation angle in the tables, $360^3=46656000$ rotation matrices $R'(g_j^{-1})$ need to be held, assuming that the accuracy of the angle $\phi$, the angle $\theta$, and the angle $\psi$ of each rotation is one degree (1°).

On the other hand, in the case of holding the rotation matrix $R'(u(\phi))$, the rotation matrix $R'(a(\theta))$, and the rotation matrix $R'(u(\psi))$ of each rotation angle in the tables, just $360 \times 3=1080$ rotation matrices need to be held, in which the accuracy of the angle $\phi$, the angle $\theta$, and the angle $\psi$ of each rotation is one degree (1°).

Therefore, while the data in the order of $O(n^3)$ needs to be held to hold the rotation matrices $R'(g_j^{-1})$, just the data in the order of $O(n)$ is necessary to hold the rotation matrices $R'(u(\phi))$, the rotation matrices $R'(a(\theta))$, and the rotation matrices $R'(u(\psi))$. The amount of memory can be significantly reduced.

Moreover, the rotation matrices $R'(u(\phi))$ and the rotation matrices $R'(u(\psi))$ are diagonal matrices as indicated by arrow A51, and only diagonal components need to be held.

Furthermore, the rotation matrices $R'(u(\phi))$ and the rotation matrices $R'(u(\psi))$ are rotation matrices for rotation in the horizontal angle direction, and the rotation matrices $R'(u(\phi))$ and the rotation matrices $R'(u(\psi))$ can be obtained from the same common table. Therefore, the table of the rotation matrices $R'(u(\phi))$ and the table of the rotation matrices $R'(u(\psi))$ can be the same table. Note that in FIG. 16, the hatched parts of each of the rotation matrices represent elements that are not zero.

Furthermore, as for k and m belonging to the set Q illustrated in Formula (22) described above, the elements other than the elements in row k, column m among the elements in the rotation matrices $R'(a(\theta))$ are zero.

As a result, the amount of memory required to hold the data for obtaining the rotation matrices $R'(g_j^{-1})$ can be further reduced.

Hereinafter, the method of holding the table of the rotation matrices $R'(u(\phi))$ and the rotation matrices $R'(u(\psi))$ and the table of the rotation matrices $R'(a(\theta))$ in this way will be referred to as a third proposed method.

Here, the required amounts of memory in the third proposed method and the general method will be specifically compared. For example, assuming that the accuracy of the angle $\phi$, the angle $\theta$, and the angle $\psi$ is 36 degrees (36°), the numbers of rotation matrices $R'(u(\phi))$, rotation matrices $R'(a(\theta))$, and rotation matrices $R'(u(\psi))$ of each rotation angle are ten, and the number of directions $g_j$ of the rotation of the head is $M=10 \times 10 \times 10=1000$.

In the case where $M=1000$, the required amount of memory in the general method is memory=6400800 as described above.

On the other hand, the number of rotation matrices $R'(a(\theta))$ that need to be held in the third proposed method corresponds to the accuracy of the angle $\theta$, that is, ten, and the amount of memory required for holding the rotation matrices $R'(a(\theta))$ is memory(a)=$10 \times (J+1)(2J+1)(2J+3)/3$.

In addition, a common table can be used for the rotation matrices $R'(u(\phi))$ and the rotation matrices $R'(u(\psi))$, and the numbers of rotation matrices that need to be held correspond to the accuracy of the angle $\phi$ and the angle $\psi$, that is, ten, and only the diagonal components of the rotation matrices need to be held. Therefore, when the length of the vector $D'(\omega)$ is defined as K, the amount of memory required for holding the rotation matrices $R'(u(\phi))$ and the rotation matrices $R'(u(\psi))$ is memory(b)=$10 \times K$.

Furthermore, when the number of time-frequency bins $\omega$ is defined as W, the amount of memory required for holding the matrix $H_S(\omega)$ of $1 \times K$ for the left and right ears for each time-frequency bin $\omega$ is $2 \times K \times W$.

Therefore, the amount of memory required in the third proposed method in total is memory=memory(a)+memory(b)+2 KW.

Here, assuming that W equals to 100 and the maximum order J of the spherical harmonic function equals to 4, then $K=(4+1)^2=25$ is obtained. Therefore, the amount of memory required in the third proposed method is memory=$10 \times 5 \times 9 \times 11/3+10 \times 25+2 \times 25 \times 100=6900$, and it can be recognized that the amount of memory can be significantly reduced. It can be recognized that the amount of memory can be significantly reduced in the third proposed method compared to the required amount of memory in the second proposed method memory=170000.

In addition, the amount of operation for obtaining the rotation matrices $R'(g_j^{-1})$ is further required in the third proposed method in addition to the amount of operation in the second proposed method described above.

Here, the amount of operation calc(R') required for obtaining the rotation matrices $R'(g_j^{-1})$ is calc(R')=(J+1)(2J+1)(2J+3)/3×2 regardless of the accuracy of the angle φ, the angle θ, and the angle ψ, and when the order is J=4, the amount of operation is calc(R')=5×9×11/3×2=330.

Furthermore, the rotation matrices $R'(g_j^{-1})$ can be commonly used for each time-frequency bin ω. Therefore, if w=100, then the amount of operation per time-frequency bin ω is calc(R')/W=330/100=3.3.

As a result, the total amount of operation in the third proposed method is 218.3 that is a sum of the amount of operation calc(R')/W=3.3 required for deriving the rotation matrices $R'(g_j^{-1})$ and the operation calc/W=215 in the second proposed method described above. As can be understood from this, the amount of operation required for obtaining the rotation matrices $R'(g_j^{-1})$ in the amount of operation in the third proposed method is an amount of operation in a level that can be almost ignored.

In the third proposed method, the required amount of memory can be significantly reduced with approximately the same amount of operation as in the second proposed method. Particularly, the third proposed method is more effective when, for example, the accuracy of the angle φ, the angle θ, and the angle ψ is set to one degree (1°) or the like for practical use in the case of realizing the head tracking function.

<Configuration Example of Sound Processing Apparatus>

Next, a configuration example of a sound processing apparatus that uses the third proposed method to compute the drive signals of the headphone will be described. In such a case, the sound processing apparatus is configured as illustrated for example in FIG. 17. Note that in FIG. 17, the same reference signs are provided to the parts corresponding to the case of FIG. 12, and the description will be appropriately omitted.

Figure 17:
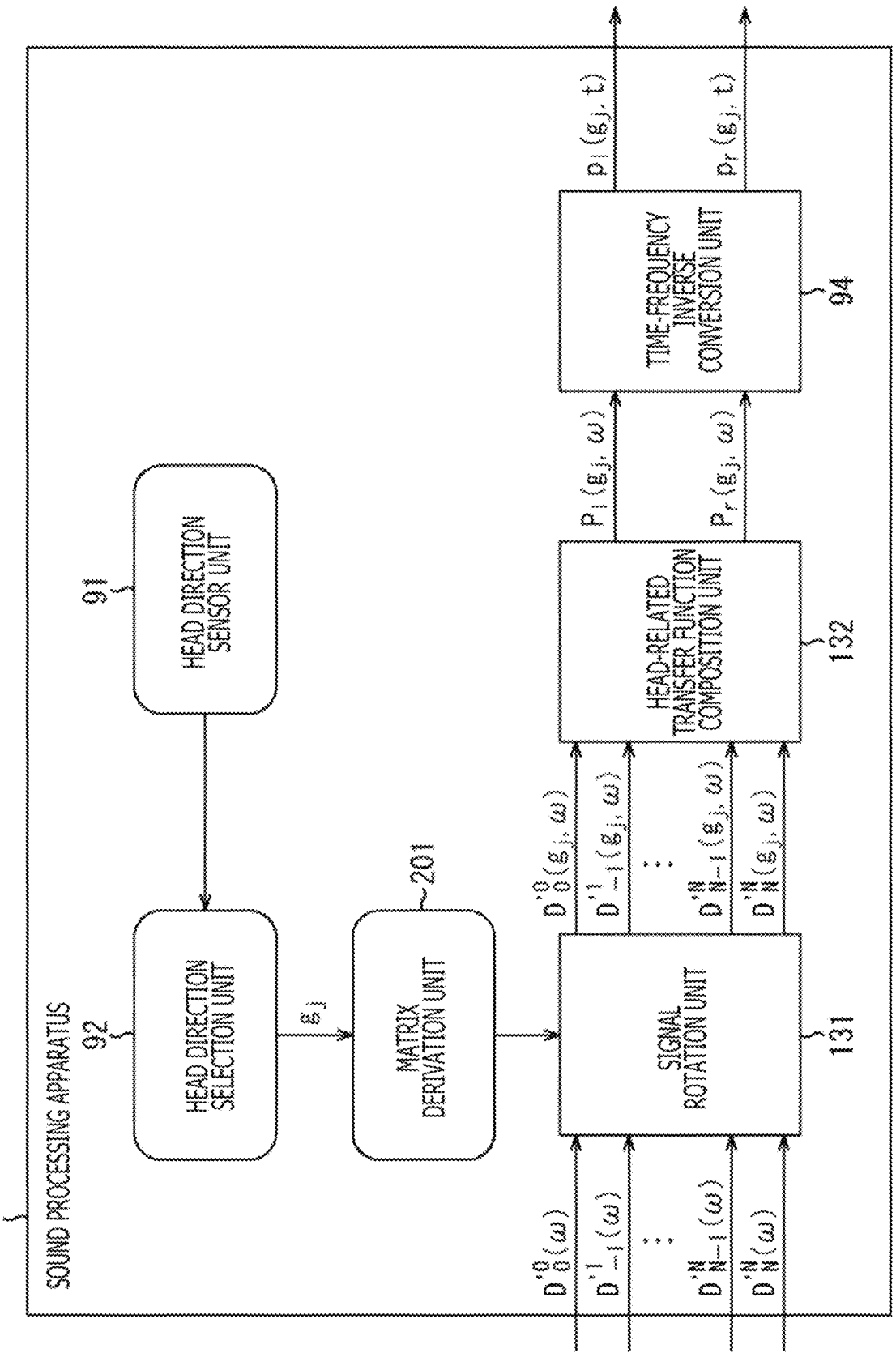
FIG. 17 depicts a configuration example of a sound processing apparatus according to the present technique.

The sound processing apparatus 121 illustrated in FIG. 17 includes the head direction sensor unit 91, the head direction selection unit 92, a matrix derivation unit 201, the signal rotation unit 131, the head-related transfer function composition unit 132, and the time-frequency inverse conversion unit 94.

The configuration of the sound processing apparatus 121 is different from the sound processing apparatus 121 illustrated in FIG. 12 in that the matrix derivation unit 201 is newly provided, and the configuration of the other part is similar to the sound processing apparatus 121 of FIG. 12.

The matrix derivation unit 201 holds in advance the table of the rotation matrices R'(u(φ)) and the rotation matrices R'(u(ψ)) and the table of the rotation matrices R'(a(θ)) described above. The matrix derivation unit 201 uses the held tables to generate (compute) the rotation matrix $R'(g_j^{-1})$ corresponding to the direction $g_j$ supplied from the head direction selection unit 92 and supplies the rotation matrix $R'(g_j^{-1})$ to the signal rotation unit 131.

<Description of Drive Signal Generation Process>

Figure 18:
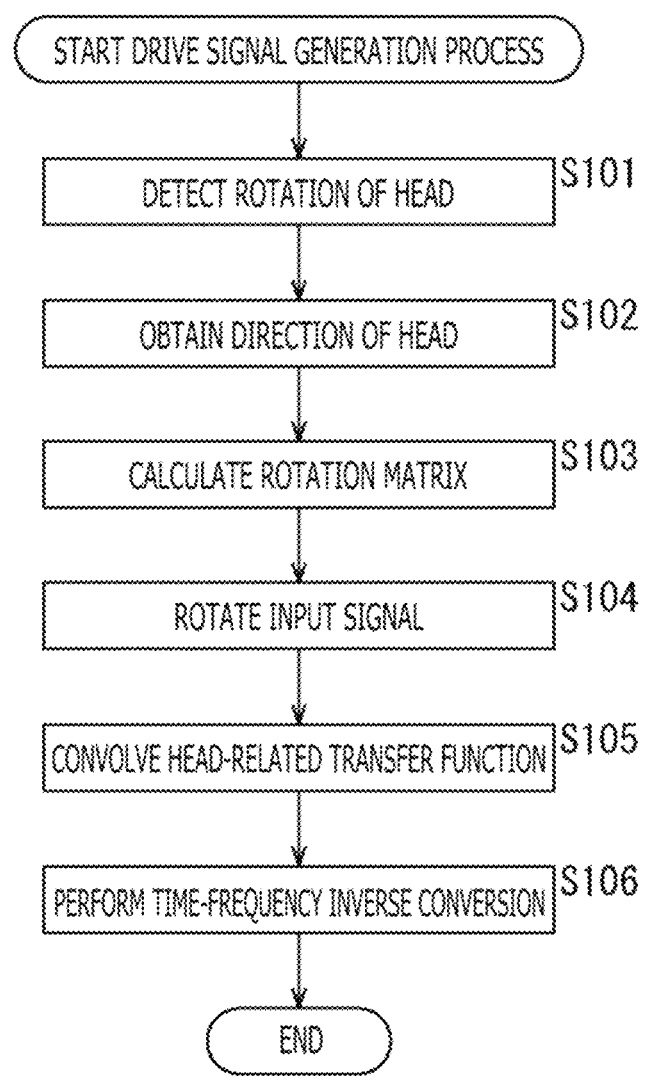
FIG. 18 is a flow chart describing a drive signal generation process.

Subsequently, a drive signal generation process executed by the sound processing apparatus 121 illustrated in FIG. 17 will be described with reference to a flow chart of FIG. 18. Note that the processes of step S101 and step S102 are similar to the processes of step S41 and step S42 of FIG. 13, and the description will not be repeated.

In step S103, the matrix derivation unit 201 computes the rotation matrix $R'(g_j^{-1})$ on the basis of the direction $g_j$ supplied from the head direction selection unit 92 and supplies the rotation matrix $R'(g_j^{-1})$ to the signal rotation unit 131.

That is, the matrix derivation unit 201 selects and reads the rotation matrix R'(u(φ)), the rotation matrix R'(a(θ)), and the rotation matrix R'(u(ψ)) of the angles including the angle φ, the angle θ, and the angle ψ corresponding to the direction $g_j$ from the tables held in advance.

Here, the angle θ is, for example, an angle of elevation indicating the head rotation direction of the listener indicated by the direction $g_j$, that is, the angle in the elevation angle direction of the head of the listener as viewed from a state in which the listener faces a reference direction such as the front. Therefore, the rotation matrix R'(a(θ)) is a rotation matrix for rotating the coordinates according to the angle of elevation indicating the head direction of the listener, that is, according to the rotation of the head in the elevation angle direction. Note that although the reference direction of the head is arbitrary in three axes of the angle φ, the angle θ, and the angle ψ, the reference direction in the following description is a direction of the head in a state in which the top of the head faces the vertical direction.

The matrix derivation unit 201 performs the calculation of Formula (29) described above, that is, obtains the product of the read rotation matrix R'(u(φ)), rotation matrix R'(a(θ)), and rotation matrix R'(u(ψ)), to compute the rotation matrix $R'(g_j^{-1})$.

When the rotation matrix $R'(g_j^{-1})$ is obtained, the processes of steps S104 to S106 are then executed, and the drive signal generation process ends. The processes are similar to the processes of steps S43 to S45 in FIG. 13, and the description will not be repeated.

In this way, the sound processing apparatus 121 computes the rotation matrix, rotates the input signal based on the rotation matrix, and convolves the input signal with the head-related transfer function in the spherical harmonic domain to compute the drive signals of the left and right headphones. This can significantly reduce the amount of operation in generating the drive signals of the headphone and can also significantly reduce the amount of memory required for the operation.

Modification 1 of Third Embodiment

<Configuration Example of Sound Processing Apparatus>

In addition, although the example of rotating the input signal is described in the third embodiment, the head-related transfer function may be rotated as in the case of modification 1 of the second embodiment. In such a case, the sound processing apparatus is configured as illustrated for example in FIG. 19. Note that in FIG. 19, the same reference signs are provided to the parts corresponding to the case in FIG. 14 or FIG. 17, and the description will be appropriately omitted.

Figure 19:
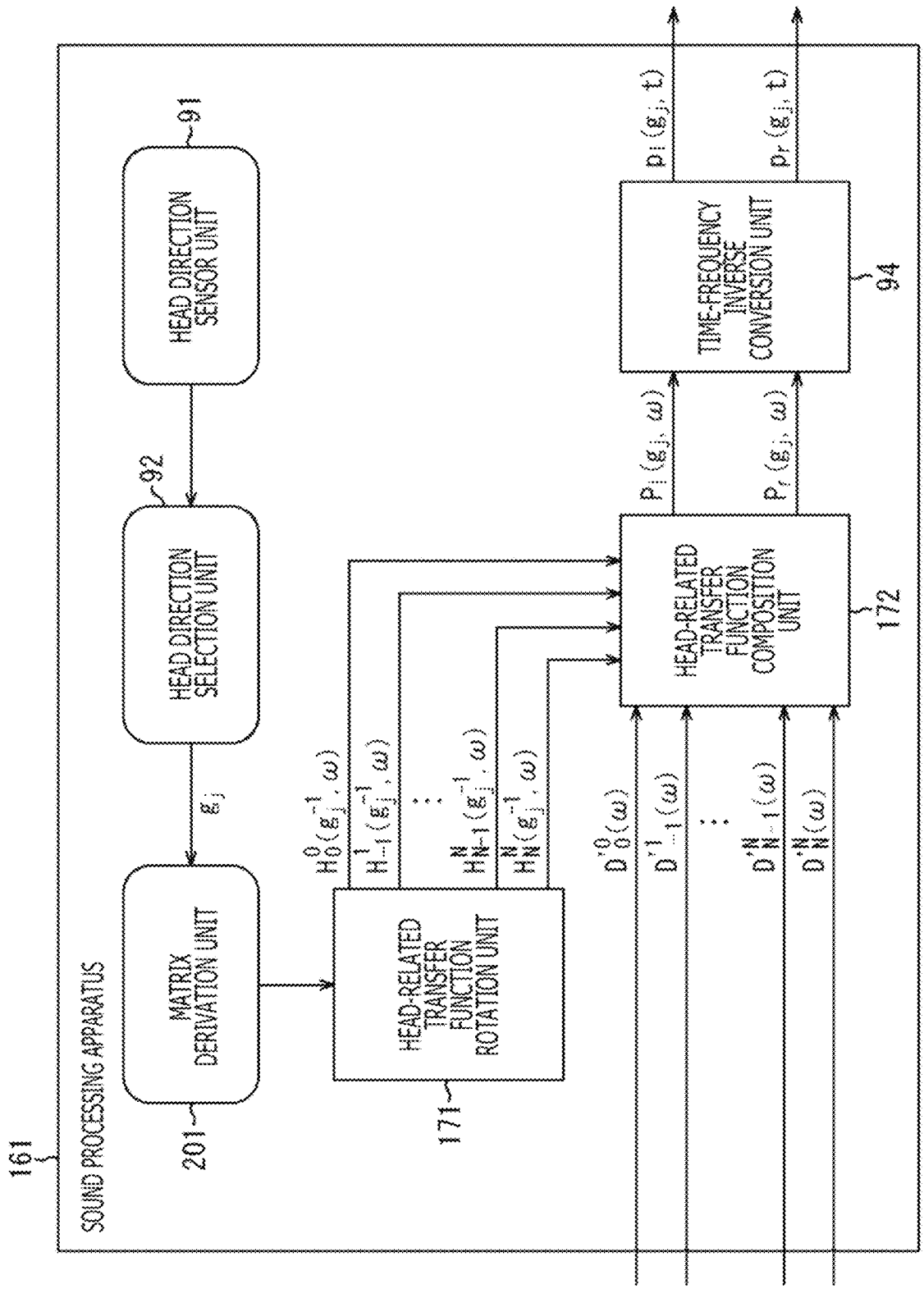
FIG. 19 depicts a configuration example of a sound processing apparatus according to the present technique.

The sound processing apparatus 161 illustrated in FIG. 19 includes the head direction sensor unit 91, the head direction selection unit 92, the matrix derivation unit 201, the head-related transfer function rotation unit 171, the head-related transfer function composition unit 172, and the time-frequency inverse conversion unit 94.

The configuration of the sound processing apparatus 161 is different from the sound processing apparatus 161 illustrated in FIG. 14 in that the matrix derivation unit 201 is newly provided, and the configuration of the other part is similar to the sound processing apparatus 161 of FIG. 14.

The matrix derivation unit 201 uses the held tables to compute the rotation matrix $R'(g_j^{-1})$ corresponding to the direction $g_j$ supplied from the head direction selection unit 92 and supplies the rotation matrix $R'(g_j^{-1})$ to the head-related transfer function rotation unit 171.

<Description of Drive Signal Generation Process>

Figure 20:
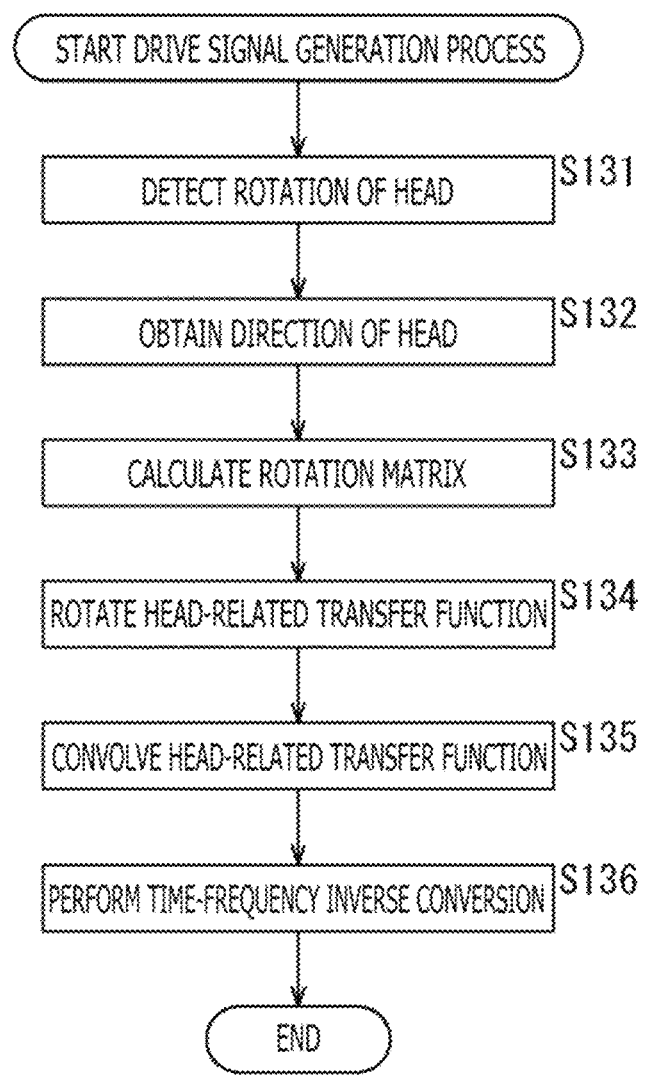
FIG. 20 is a flow chart describing a drive signal generation process.

Subsequently, a drive signal generation process executed by the sound processing apparatus 161 illustrated in FIG. 19 will be described with reference to a flow chart of FIG. 20. Note that the processes of step S131 and step S132 are similar to the processes of step S71 and S72 of FIG. 15, and the description will not be repeated.

In step S133, the matrix derivation unit 201 computes the rotation matrix $R'(g_j^{-1})$ on the basis of the direction $g_j$ supplied from the head direction selection unit 92 and supplies the rotation matrix $R'(g_j^{-1})$ to the head-related transfer function rotation unit 171. Note that in step S133, the process similar to step S103 of FIG. 18 is executed to compute the rotation matrix $R'(g_j^{-1})$.

When the rotation matrix $R'(g_j^{-1})$ is obtained, the processes of steps S134 to S136 are then executed, and the drive signal generation process ends. The processes are similar to the processes in steps S73 to S75 of FIG. 15, and the description will not be repeated.

In this way, the sound processing apparatus 161 computes the rotation matrix, rotates the head-related transfer function on the basis of the rotation matrix, and convolves the input signal with the head-related transfer function in the spherical harmonic domain to compute the drive signals of the left and right headphones. This can significantly reduce the amount of operation in generating the drive signals of the headphone and can also significantly reduce the amount of memory required for the operation.

Note that as in the second embodiment, modification 1 of the second embodiment, the third embodiment, and modification 1 of the third embodiment described above, the rotation matrix $R'(g_j^{-1})$ is a diagonal matrix when the angle is θ=0 in the example of using the rotation matrix $R'(g_j^{-1})$ to compute the drive signals of the headphone.

Therefore, for example, in a case where the angle is fixed at θ=0 or in a case where the tilt of the head of the listener in the direction of the angle θ is permitted on some level and the angle is handled as θ=0, the amount of operation in computing the drive signals of the headphone is further reduced.

Here, the angle θ is, for example, an angle (angle of elevation) in the up and down direction as viewed from the listener in the space, that is, the pitch direction. Therefore, in a case where the angle is θ=0, that is, the angle θ is zero degrees, the direction of the head of the listener is in a state in which the listener has not moved in the up and down direction from the state in which the listener faces the reference direction such as right in front.

For example, in a case where the angle is handled as θ=0 when the absolute value of the angle θ of the head of the listener is equal to or smaller than a predetermined threshold th in the example illustrated in FIG. 17, the matrix derivation unit 201 also supplies information indicating whether or not the angle is θ=0 to the signal rotation unit 131 along with the rotation matrix $R'(g_j^{-1})$.

More specifically, for example, the matrix derivation unit 201 compares the absolute value of the angle θ indicated by the direction $g_j$ and the threshold th on the basis of the direction $g_j$ supplied from the head direction selection unit 92. Then, in the case where the absolute value of the angle θ is equal to or smaller than the threshold th, the matrix derivation unit 201 handles that the angle is θ=0 to select the rotation matrix $R'(a(θ))$ to compute the rotation matrix $R'(g_j^{-1})$, computes the rotation matrix $R'(g_j^{-1})$ only from the product of the rotation matrix $R'(u(φ))$ and the rotation matrix $R'(u(ψ))$ without calculating the rotation matrix $R'(a(θ))$ that is an identity matrix, or handles the rotation matrix $R'(u(φ+ψ))$ as the rotation matrix $R'(g_j^{-1})$ to supply the rotation matrix $R'(g_j^{-1})$ and information indicating that the angle is θ=0 to the signal rotation unit 131.

When the information indicating that the angle is θ=0 is supplied from the matrix derivation unit 201, the signal rotation unit 131 calculates $R'(g_j^{-1})D'(ω)$ in Formula (26) described above only for the part of the diagonal component to compute the input signal $D'^m_n(g_j, ω)$. In addition, in a case where the information indicating that the angle is θ=0 is not supplied from the matrix derivation unit 201, the signal rotation unit 131 calculates $R'(g_j^{-1})D'(ω)$ in Formula (26) described above for all of the components to compute the input signal $D'^m_n(g_j, ω)$.

Similarly, for example, the matrix derivation unit 201 in the case of the sound processing apparatus 161 illustrated in FIG. 19 also compares the absolute value of the angle θ and the threshold th on the basis of the direction $g_j$ supplied from the head direction selection unit 92. Then, in the case where the absolute value of the angle θ is equal to or smaller than the threshold th, the matrix derivation unit 201 handles that the angle is θ=0 to compute the rotation matrix $R'(g_j^{-1})$ and supplies the rotation matrix $R'(g_j^{-1})$ and the information indicating that the angle is θ=0 to the head-related transfer function rotation unit 171.

Furthermore, when the information indicating that the angle is θ=0 is supplied from the matrix derivation unit 201, the head-related transfer function rotation unit 171 performs the calculation corresponding to $H_S(ω)R'(g_j^{-1})$ in Formula (26) described above only for the part of the diagonal component.

In this way, in the case where the rotation matrix $R'(g_j^{-1})$ is a diagonal matrix, the amount of operation can be further reduced by calculating only the diagonal component.

Fourth Embodiment

<Reduction of Orders in Each Time Frequency>

Incidentally, it is known that the order required in the spherical harmonic domain varies between the head-related transfer functions, and this is described in, for example, "Efficient Real Spherical Harmonic Representation of Head-Related Transfer Functions (Griffin D. Romigh et. al., 2015)" and the like.

For example, if the element of order n=N(ω) required in each time-frequency bin ω is known among the elements included in the matrix $H_S(ω)$ of the head-related transfer functions illustrated in Formula (26), the amount of operation can be further reduced.

Figure 21:
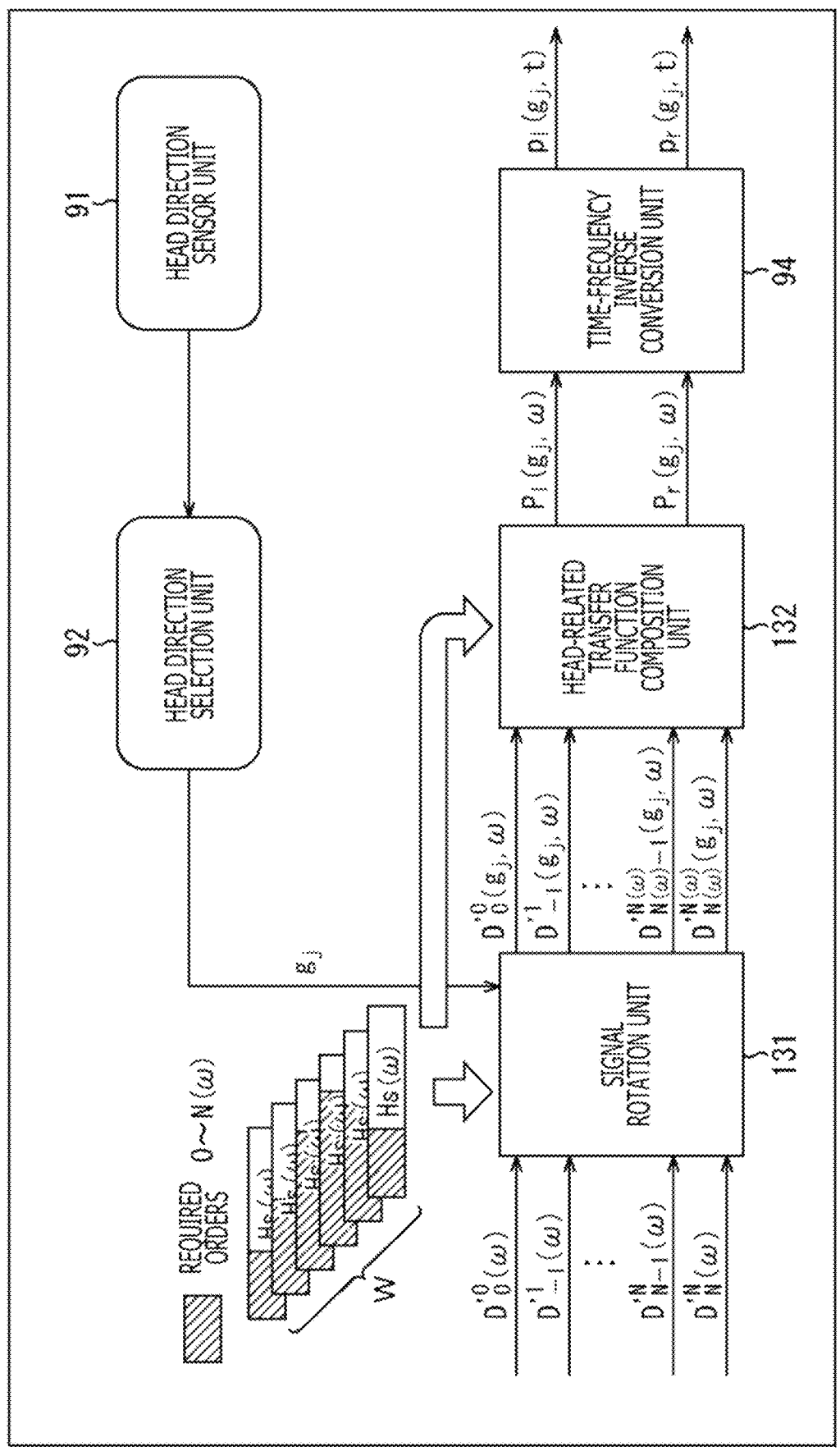
FIG. 21 is a diagram describing reduction in the amount of operation through reduction of orders.

For example, in the example of the sound processing apparatus 121 illustrated in FIG. 12, the signal rotation unit 131 and the head-related transfer function composition unit 132 can perform an operation of only each element of order n=0 to N(ω) as illustrated in FIG. 21. Note that in FIG. 21, the same reference signs are provided to the parts corresponding to the case of FIG. 12, and the description will not be repeated.

In the example, the sound processing apparatus 121 holds, at the same time, a database including information indicating the required order n and degree m for each time-frequency bin ω in addition to a database of the head-related transfer functions after the spherical harmonic function conversion, that is, the matrix $H_S(ω)$ of each time-frequency bin ω.

In FIG. 21, a rectangle provided with a character "$H_S(ω)$" represents the matrix $H_S(ω)$ of each time-frequency bin ω held in the head-related transfer function composition unit 132, and oblique line parts of the matrices $H_S(\omega)$ represent element parts of the required order n=0 to N($\omega$).

In this case, the information indicating the required order of each time-frequency bin $\omega$ is supplied to the signal rotation unit 131 and the head-related transfer function composition unit 132. The signal rotation unit 131 and the head-related transfer function composition unit 132 then perform, for each time-frequency bin $\omega$, the operations of step S43 and step S44 in FIG. 13 from the zeroth-order to the order n=N($\omega$) required in the time-frequency bin $\omega$ on the basis of the supplied information.

Specifically, for example, the signal rotation unit 131 performs, for each time-frequency bin $\omega$, the operation of obtaining $R'(g_j^{-1})D'(\omega)$ in Formula (26) from the zeroth-order to the order n=N($\omega$) and degree m=M($\omega$) required in the time-frequency bin $\omega$, that is, the operation of obtaining the product of the rotation matrix $R'(g_j^{-1})$ and the vector $D'(\omega)$ including the input signal $D'^m_n(\omega)$.

In addition, for each time-frequency bin $\omega$, the head-related transfer function composition unit 132 extracts only the elements from the zeroth-order to the order n=N($\omega$) and degree m=M($\omega$) required in the time-frequency bin $\omega$ among the held elements of the matrix $H_S(\omega)$ and sets the elements as the matrix $H_S(\omega)$ to be used in the operation. The head-related transfer function composition unit 132 then performs the calculation of obtaining the product of the matrix $H_S(\omega)$ and $R'(g_j^{-1})D'(\omega)$ only for the part of the required order to generate the drive signal.

As a result, the calculation of unnecessary orders can be eliminated in the signal rotation unit 131 and the head-related transfer function composition unit 132.

The method of performing the operation only for the required orders can also be applied to any of the first proposed method, the second proposed method, and the third proposed method described above.

For example, it is assumed in the third proposed method that the maximum value of the order n is 4, and the required order of a predetermined time-frequency bin $\omega$ is order n=N($\omega$)=2.

In such a case, the amount of operation in the usual third proposed method is 218.3 as described above. On the other hand, the amount of operation up to the order n=N($\omega$)=2 in the third proposed method is 56.3 in total, and it can be recognized that the amount of operation is reduced to 26% of the total 218.3 of the original amount of operation where the order n is 4.

Figure 22:
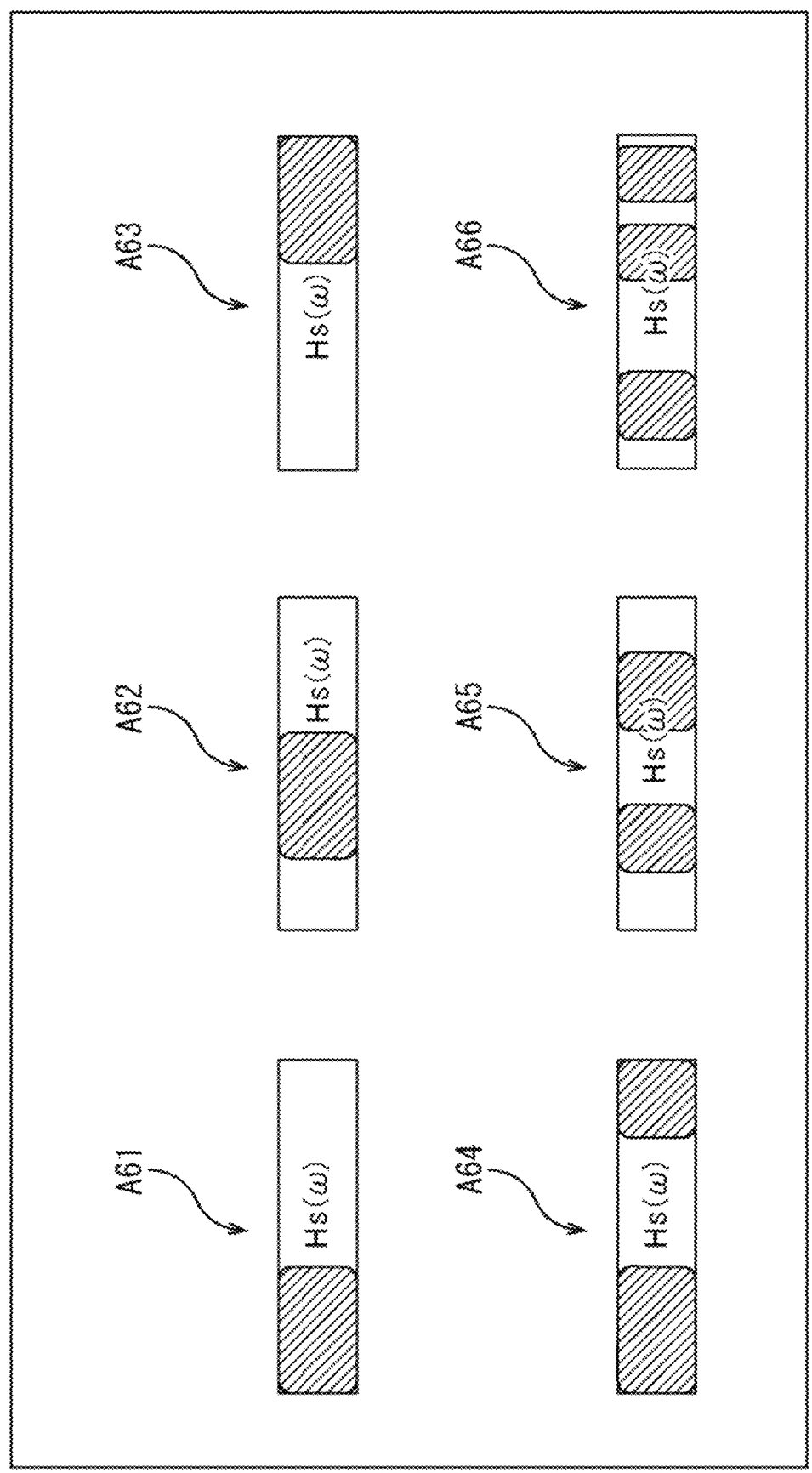
FIG. 22 is a diagram describing reduction in the amount of operation through the reduction of orders.

Note that although the elements of the matrix $H_S(\omega)$ and the matrix $H'(\omega)$ of the head-related transfer functions used in the calculation are the order n=0 to N($\omega$) here, elements of any part of the matrix $H_S(\omega)$ may be used as illustrated for example in FIG. 22. That is, elements of a plurality of discontinuous orders n may be the elements used in the calculation. Note that although the example of the matrix $H_S(\omega)$ is illustrated in FIG. 22, this is also similar in the matrix $H'(\omega)$.

In FIG. 22, rectangles provided with the character "$H_S(\omega)$" indicated by arrows A61 to A66 represent the matrices $H_S(\omega)$ of the predetermined time-frequency bins $\omega$ held in the head-related transfer function composition unit 132 and the head-related transfer function rotation unit 171. Furthermore, oblique line parts of the matrices $H_S(\omega)$ represent the element parts of the required order n and degree m.

For example, in the examples indicated by the arrows A61 to A63, parts of elements adjacent to each other in the matrices $H_S(\omega)$ are the element parts of the required orders, and the positions (domains) of the element parts of the matrices $H_S(\omega)$ are positions different among the examples.

On the other hand, in the examples indicated by the arrows A64 to A66, a plurality of parts including elements adjacent to each other in the matrices $H_S(\omega)$ are the element parts of the required orders. In these examples, the numbers, the positions, and the sizes of the parts including the required elements in the matrices $H_S(\omega)$ vary among the examples.

Here, FIG. 23 illustrates the amounts of operation and the required amounts of memory in the general method, the first to third proposed methods described above, and the case of further performing the operation only for the required orders n in the third proposed method.

In the example, the number of time-frequency bins $\omega$ is W=100, and the number of directions of the head of the listener is M=1000. The maximum value of the orders is J=0 to 5. In addition, the length of the vector $D'(\omega)$ is K=(J+1)$^2$=25, and the number of speakers L that is the number of virtual speakers is L=K. Furthermore, the numbers of rotation matrices $R'(u(\phi))$, rotation matrices $R'(a(\theta))$, and rotation matrices $R'(u(\psi))$ held in the tables are 10 individually.

In FIG. 23, a field of "ORDER J OF SPHERICAL HARMONIC FUNCTION" indicates the value of the maximum order n=J of the spherical harmonic function, and a field of "REQUIRED NUMBER OF VIRTUAL SPEAKERS" indicates the minimum number of virtual speakers required to properly reproduce the sound field.

Furthermore, a field of "AMOUNT OF OPERATION (GENERAL METHOD)" indicates the number of product-sum operations required to generate the drive signals of the headphone in the general method, and a field of "AMOUNT OF OPERATION (FIRST PROPOSED METHOD)" indicates the number of product-sum operations required to generate the drive signals of the headphone in the first proposed method.

A field of "AMOUNT OF OPERATION (SECOND PROPOSED METHOD)" indicates the number of product-sum operations required to generate the drive signals of the headphone in the second proposed method, and a field of "AMOUNT OF OPERATION (THIRD PROPOSED METHOD)" indicates the number of product-sum operations required to generate the drive signals of the headphone in the third proposed method. Furthermore, a field of "AMOUNT OF OPERATION (THIRD PROPOSED METHOD, REDUCTION (−2) OF ORDERS)" indicates the number of product-sum operations required to generate the drive signals of the headphone in the operation using the orders up to the order N($\omega$) in the third proposed method. The example is an example in which the highest two orders of the orders n are particularly reduced and not operated.

Here, the number of product-sum operations in each time-frequency bin $\omega$ is written in each field of the amount of operation in the general method, the first proposed method, the second proposed method, the third proposed method, and the case of performing the operation using the orders up to the order N($\omega$) in the third proposed method.

In addition, a field of "MEMORY (GENERAL METHOD)" indicates the amount of memory required to generate the drive signals of the headphone in the general method, and a field of "MEMORY (FIRST PROPOSED METHOD)" indicates the amount of memory required to generate the drive signals of the headphone in the first proposed method.

Similarly, a field of "MEMORY (SECOND PROPOSED METHOD)" indicates the amount of memory required to generate the drive signals of the headphone in the second proposed method, and a field of "MEMORY (THIRD PRO- POSED METHOD)" indicates the amount of memory required to generate the drive signals of the headphone in the third proposed method.

Note that a field provided with a sign "**" in FIG. 23 indicates that the calculation is performed by assuming that the order is n=0 because the order −2 is negative.

Figure 24:
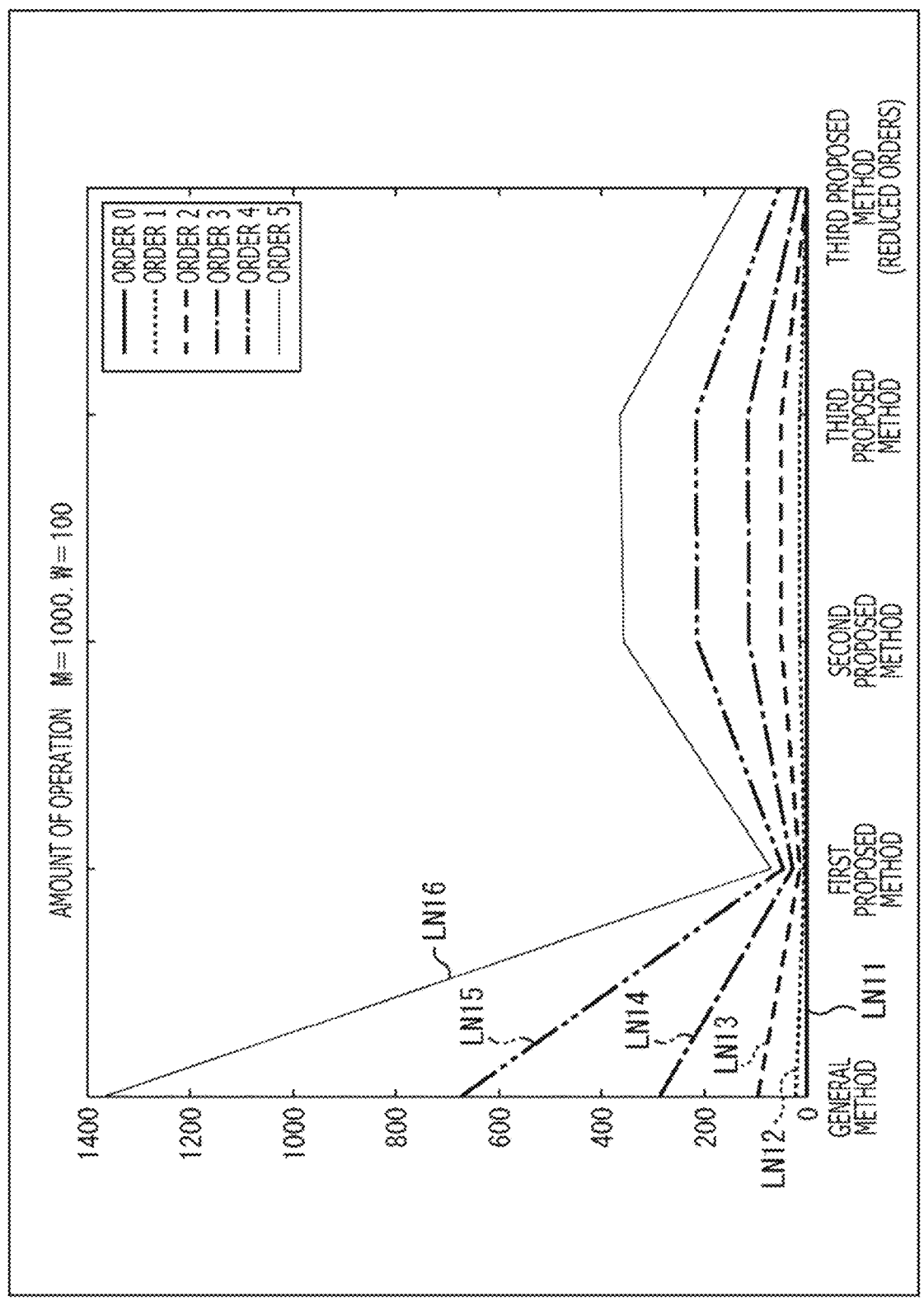
FIG. 24 is a diagram describing the amount of operation and the required amount of memory in each proposed method and the general method.

FIG. 24 further illustrates a graph of the amount of operation in each order in each proposed method illustrated in FIG. 23. Similarly, FIG. 25 illustrates a graph of the required amount of memory in each order in each proposed method illustrated in FIG. 23.

In FIG. 24, the vertical axis indicates the amount of operation, that is, the number of product-sum operations, and the horizontal axis indicates each method. In addition, polygonal lines LN11 to LN16 indicate the amounts of operation in the methods in the cases where the maximum order J is J=0 to 5 individually.

As can be understood from FIG. 24, the first proposed method and the method of reducing the orders in the third proposed method are particularly effective in reducing the amount of operation.

Furthermore, the vertical axis in FIG. 25 indicates the required amount of memory, and the horizontal axis indicates each method. In addition, polygonal lines LN21 to LN26 indicate the amounts of memory in the methods in the cases where the maximum order J is J=0 to 5 individually.

As can be understood from FIG. 25, the second proposed method and the third proposed method are particularly effective in reducing the required amount of memory.

Fifth Embodiment

<Generation of Binaural Signals in MPEG 3D>

Incidentally, HOA is prepared as a transmission path in an MPEG (Moving Picture Experts Groups) 3D standard, and a binaural signal conversion unit called H2B (HOA to Binaural) is prepared in a decoder.

More specifically, a sound processing apparatus 231 with a configuration illustrated in FIG. 26 generally generates binaural signals, that is, drive signals, in the MPEG 3D standard. Note that in FIG. 26, the same reference signs are provided to the parts corresponding to the case of FIG. 2, and the description will be appropriately omitted.

The sound processing apparatus 231 illustrated in FIG. 26 includes a time-frequency conversion unit 241, a coefficient composition unit 242, and the time-frequency inverse conversion unit 23. In the example, the coefficient composition unit 242 is the binaural signal conversion unit.

In H2B, the head-related transfer function is held in a form of an impulse response h(x, t), that is, a time signal, and an input signal of HOA that is a sound signal is also transmitted as a time signal, that is, a signal in the time domain, instead of the input signal $D'^{m}_{n}(\omega)$.

Hereinafter, the input signal in the time domain of HOA will be referred to as an input signal $d'^{m}_{n}(t)$. Note that n and m in the input signal $d'^{m}_{n}(t)$ indicate the order and the degree of the spherical harmonic function (spherical harmonic domain) as in the case of the input signal $D'^{m}_{n}(\omega)$, and t indicates time.

In H2B, the input signals $d'^{m}_{n}(t)$ of each order and degree are input to the time-frequency conversion unit 241, and the time-frequency conversion unit 241 performs time-frequency conversion of the input signals $d'^{m}_{n}(t)$. The input signals $D'^{m}_{n}(\omega)$ obtained as a result of the time-frequency conversion are supplied to the coefficient composition unit 242.

The coefficient composition unit 242 obtains products of the related transfer functions and the input signals $D'^{m}_{n}(\omega)$ for all time-frequency bins ω, for each order n and degree m of the input signals $D'^{m}_{n}(\omega)$.

Here, the coefficient composition unit 242 holds in advance a vector of coefficients including head-related transfer functions. The vector is expressed by products of a vector including the head-related transfer functions and a matrix of the spherical harmonic functions.

Furthermore, the vector including the head-related transfer functions is a vector including head-related transfer functions of arrangement positions of each virtual speaker as viewed from a predetermined direction of the head of the listener.

The coefficient composition unit 242 holds in advance a vector of coefficients and calculates products of the vector of the coefficients and the input signals $D'^{m}_{n}(\omega)$ supplied from the time-frequency conversion unit 241 to compute drive signals of the left and right headphones. The coefficient composition unit 242 supplies the drive signals to the time-frequency inverse conversion unit 23.

Here, the calculation in the coefficient composition unit 242 is calculation as illustrated in FIG. 27. More specifically, $P_l$ in FIG. 27 represents a drive signal $P_l$ of 1×1, and H represents a vector of 1×L including L head-related transfer functions in a predetermined direction defined in advance.

In addition, Y(x) represents a matrix of L×K including the spherical harmonic functions of each order, and D'(ω) represents a vector including the input signals $D'^{m}_{n}(\omega)$. In the example, the number of input signals $D'^{m}_{n}(\omega)$ of a predetermined time-frequency bin ω, that is, the length of the vector D'(ω), is K. Furthermore, H' represents a vector of coefficients obtained by calculating the products of the vector H and the matrix Y(x).

The coefficient composition unit 242 obtains the drive signal $P_l$ from the vector H, the matrix Y(x), and the vector D'(ω) as indicated by an arrow A71.

Here, the coefficient composition unit 242 holds the vector H' in advance, and as a result, the coefficient composition unit 242 obtains the drive signal $P_l$ from the vector H' and the vector D'(ω) as indicated by an arrow A72.

<Configuration Example of Sound Processing Apparatus>

However, the direction of the head of the listener is fixed to the preset direction in the sound processing apparatus 231, and the head tracking function cannot be realized.

Figure 28:
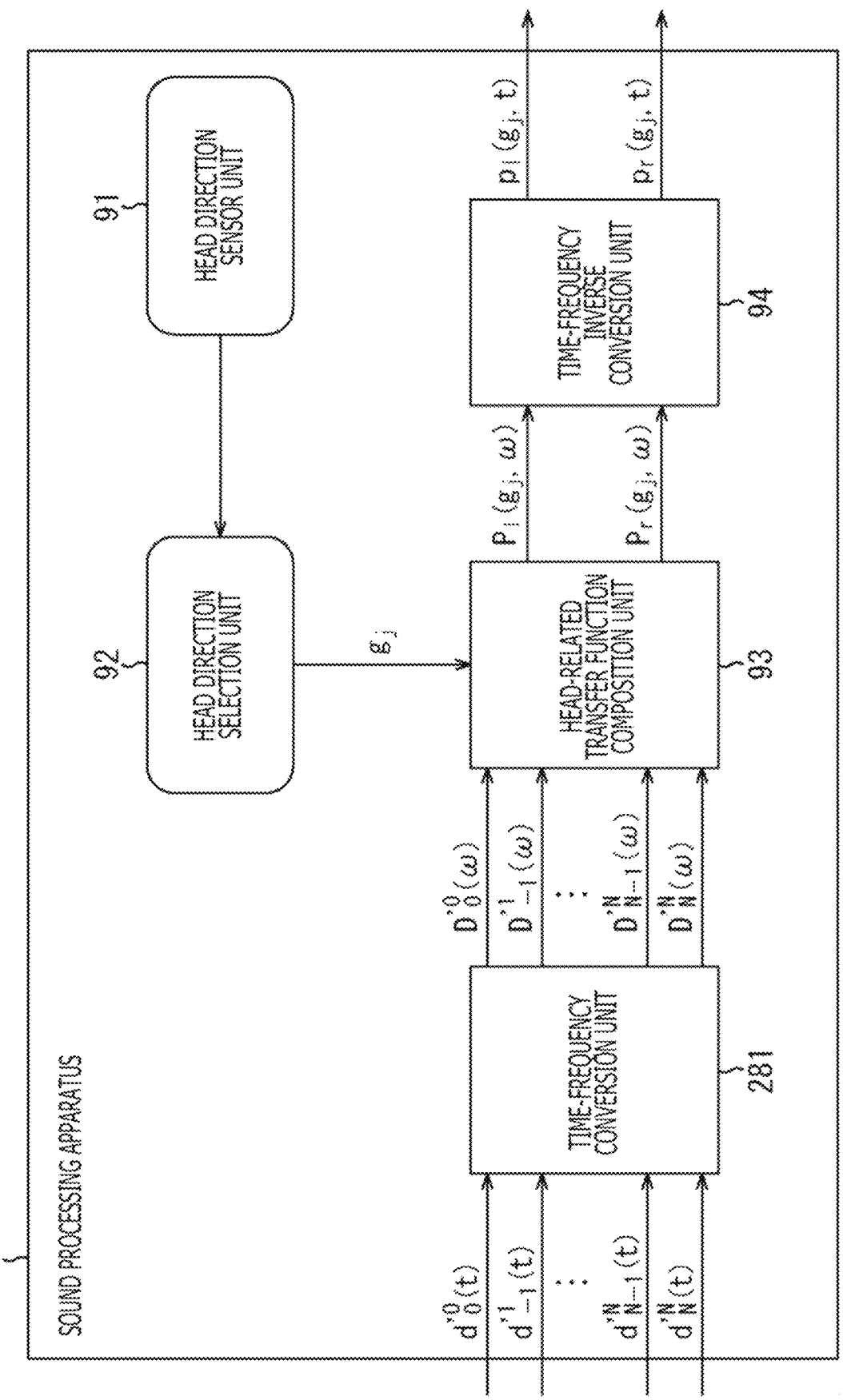
FIG. 28 depicts a configuration example of a sound processing apparatus according to the present technique.

Therefore, the sound processing apparatus is configured as illustrated for example in FIG. 28 in the present technique to also realize the head tracking function in the MPEG 3D standard and to allow more efficient reproduction of the sound. Note that in FIG. 28, the same reference signs are provided to the parts corresponding to the case of FIG. 8, and the description will be appropriately omitted.

A sound processing apparatus 271 illustrated in FIG. 28 includes the head direction sensor unit 91, the head direction selection unit 92, a time-frequency conversion unit 281, the head-related transfer function composition unit 93, and the time-frequency inverse conversion unit 94.

The configuration of the sound processing apparatus 271 is a configuration provided with the time-frequency conversion unit 281 in addition to the configuration of the sound processing apparatus 81 illustrated in FIG. 8.

In the sound processing apparatus 271, the input signals $d'^{m}_{n}(t)$ are supplied to the time-frequency conversion unit 281. The time-frequency conversion unit 281 performs time-frequency conversion of the supplied input signals $d'^{m}_{n}(t)$ and supplies the input signals $D'^{m}_{n}(\omega)$ in the spherical harmonic domain obtained as a result of the time-frequency conversion to the head-related transfer function composition unit 93. The time-frequency conversion unit 281 also performs time-frequency conversion of the head-related transfer functions as necessary. That is, in a case where the head-related transfer functions are supplied in a form of time signals (impulse responses), the time-frequency conversion unit 281 performs time-frequency conversion of the head-related transfer functions in advance.

Figure 29:
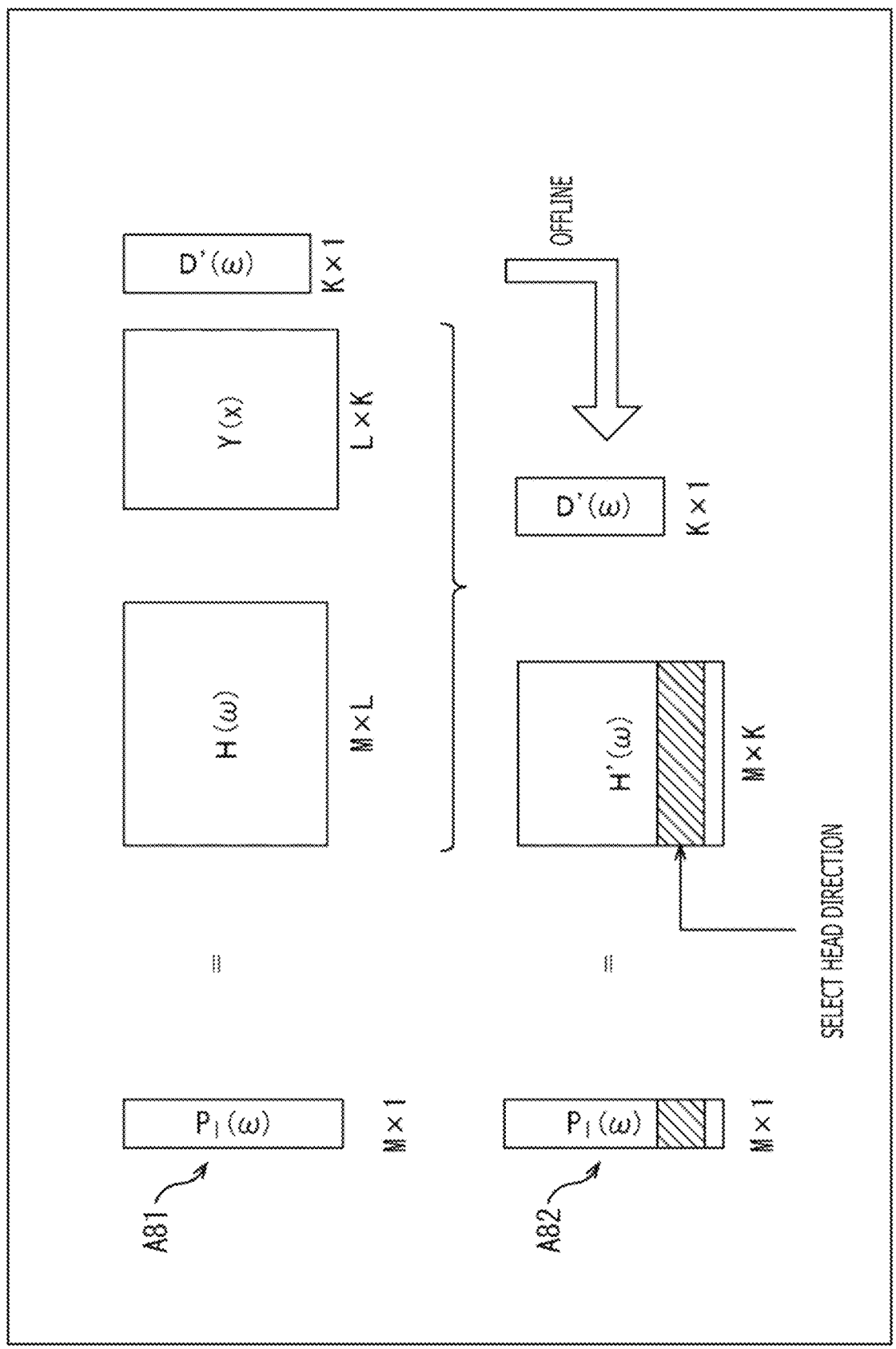
FIG. 29 is a diagram describing computation of drive signals by the sound processing apparatus according to the present technique.

The sound processing apparatus 271 performs an operation illustrated in FIG. 29 in the case of calculating the drive signal $P_l(g_j, \omega)$ of the left headphone, for example.

That is, after the conversion of the input signals $d'^m_n(t)$ into the input signals $D'^m_n(\omega)$ through the time-frequency conversion, the sound processing apparatus 271 performs a matrix operation of the matrix $H(\omega)$ of M×L, the matrix $Y(x)$ of L×K, and the vector $D'(\omega)$ of K×1 as indicated by an arrow A81.

Here, $H(\omega)Y(x)$ is the matrix $H'(\omega)$ as defined in Formula (16) described above, and the calculation indicated by the arrow A81 eventually is as indicated by an arrow A82. Particularly, the calculation of obtaining the matrix $H'(\omega)$ is performed offline, that is, in advance, and the matrix $H'(\omega)$ is held in the head-related transfer function composition unit 93.

When the matrix $H'(\omega)$ is obtained in advance in this way, the row corresponding to the direction $g_j$ of the head of the listener is selected from the matrix $H'(\omega)$ in the actual calculation of the drive signal of the headphone, and the product of the selected row and the vector $D'(\omega)$ including the input signal $D'^m_n(\omega)$ is obtained to compute the drive signal $P_l(g_j, \omega)$ of the left headphone. In FIG. 29, the part with oblique lines in the matrix $H'(\omega)$ represents the row corresponding to the direction $g_j$.

According to the generation method of the drive signals of the headphone by the sound processing apparatus 271, the amount of operation in generating the drive signals of the headphone can be significantly reduced, and the amount of memory required for the operation can also be significantly reduced as in the case of the sound processing apparatus 81 illustrated in FIG. 8. The head tracking function can also be realized.

Note that the time-frequency conversion unit 281 may be provided in the previous stage of the signal rotation unit 131 of the sound processing apparatus 121 illustrated in FIG. 12 or FIG. 17, or the time-frequency conversion unit 281 may be provided in the previous stage of the head-related transfer function composition unit 172 of the sound processing apparatus 161 illustrated in FIG. 14 or FIG. 19.

In addition, the reduction of orders can further reduce the amount of operation in the case where the time-frequency conversion unit 281 is provided in the previous stage of the signal rotation unit 131 of the sound processing apparatus 121 illustrated in FIG. 12, for example.

In this case, the information indicating the orders required in each time-frequency bin ω is supplied to the time-frequency conversion unit 281, the signal rotation unit 131, and the head-related transfer function composition unit 132, and the components perform an operation of only the required orders as in the case described with reference to FIG. 21.

Similarly, only the orders required in each time-frequency bin ω may be calculated in the case where the time-frequency conversion unit 281 is provided on the sound processing apparatus 121 illustrated in FIG. 17 or on the sound processing apparatus 161 illustrated in FIG. 14 and FIG. 19.

Sixth Embodiment

<Reduction of Required Amount of Memory Regarding Head-Related Transfer Functions>

Incidentally, the head-related transfer functions are filters formed according to the diffraction and the reflection of the head, the pinna, and the like of the listener, and the head-related transfer functions vary among individual listeners. Therefore, optimizing the head-related transfer functions for individuals is important in binaural reproduction.

However, holding the presumed head-related transfer functions of individuals by the amount corresponding to the listeners is not suitable in terms of the amount of memory. This also applies to the case of holding the head-related transfer functions in the spherical harmonic domain.

If the head-related transfer functions optimized for individuals are to be used in the reproduction system according to each of the proposed methods, the orders and degrees independent of individuals and the orders and degrees dependent on individuals can be designated in advance for each time-frequency bin ω or for all of the time-frequency bins ω, and the required parameters dependent on individuals can be reduced. Furthermore, in the estimation of the head-related transfer functions of the individual listeners based on the body shape or the like, the coefficients (head-related transfer functions) dependent on individuals in the spherical harmonic domain can be objective variables.

Hereinafter, an example of reducing the parameters dependent on individuals in the sound processing apparatus 121 illustrated in FIG. 12 will be specifically described. In addition, elements represented by products of the spherical harmonic functions of order n and degree m and the head-related transfer functions included in the matrix $H_S(\omega)$ will be referred to as head-related transfer functions $H'^m_n(x, \omega)$.

First, the orders and degrees dependent on individuals are the orders n and the degrees m with which the transfer characteristics significantly vary among individual users, that is, the head-related transfer functions $H'^m_n(x, \omega)$ vary among users. On the other hand, the orders and degrees independent of individuals are the orders n and the degrees m of the head-related transfer functions $H'^m_n(x, \omega)$ with which the difference in the transfer characteristics of individuals is sufficiently small.

Figure 30:
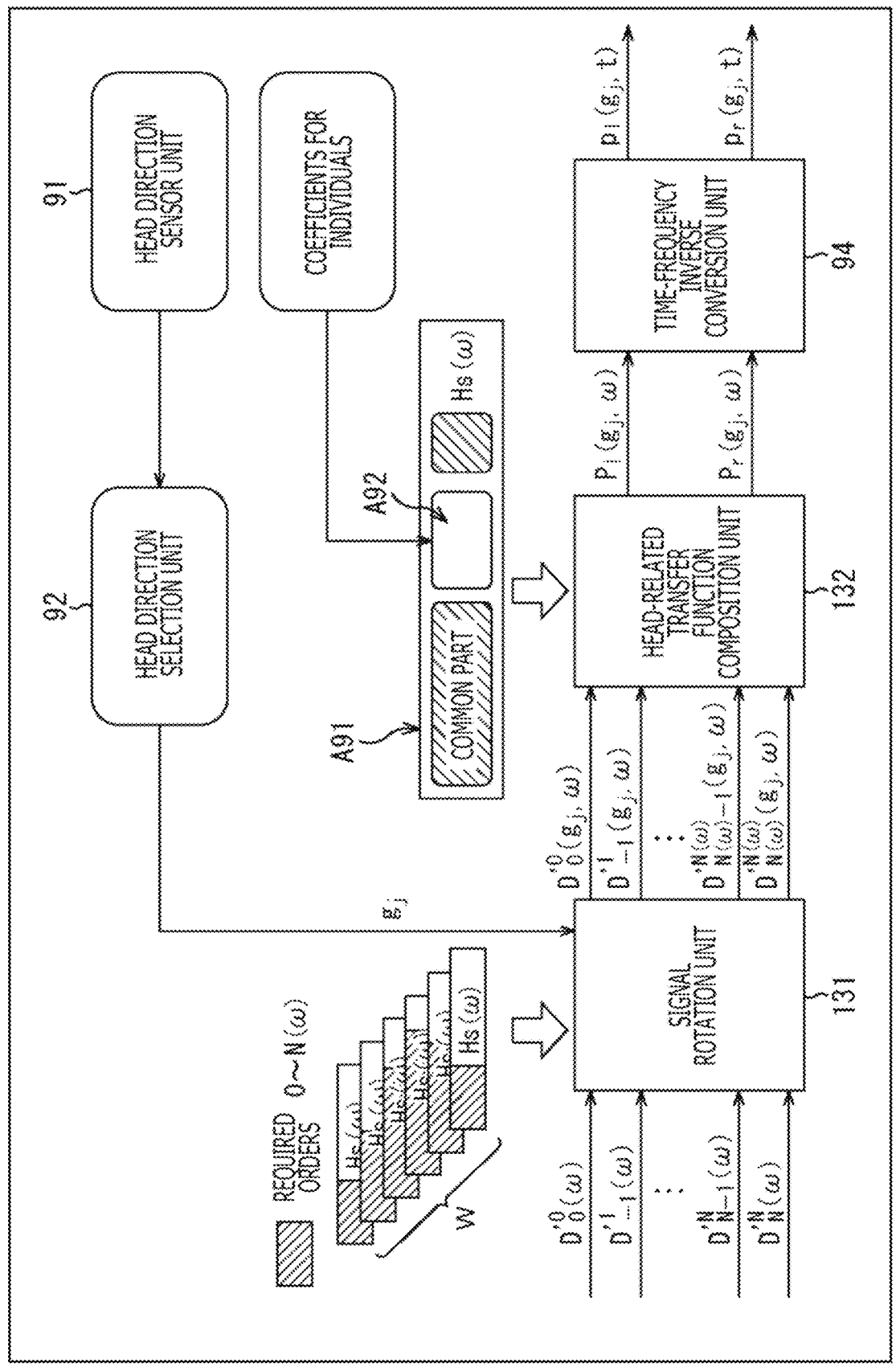
FIG. 30 is a diagram describing generation of a matrix of head-related transfer functions.

In this way, in the case of generating the matrices $H_S(\omega)$ from the head-related transfer functions of the orders and degrees independent of individuals and the head-related transfer functions of the orders and degrees dependent on individuals, the head-related transfer functions of the orders and degrees dependent on individuals are acquired by a certain method as illustrated in FIG. 30 in the example of the sound processing apparatus 121 as illustrated for example in FIG. 12. Note that in FIG. 30, the same reference signs are provided to the parts corresponding to the case of FIG. 12, and the description will be appropriately omitted.

In the example of FIG. 30, a rectangle provided with a character "$H_S(\omega)$" indicated by an arrow A91 represents the matrix $H_S(\omega)$ of the time-frequency bin ω, and the oblique line parts represent parts held in advance in the sound processing apparatus 121, that is, parts of the head-related transfer functions $H'^m_n(x, \omega)$ of the orders and degrees independent of individuals. On the other hand, the part indicated by an arrow A92 in the matrix $H_S(\omega)$ represents a part of the head-related transfer function $H'^m_n(x, \omega)$ of the orders and degrees dependent on individuals.

In the example, the head-related transfer functions $H'^m_n(x, \omega)$ of the orders and degrees independent of individuals indicated by the oblique line parts in the matrix $H_S(\omega)$ are the head-related transfer functions commonly used for all users. On the other hand, the head-related transfer functions $H'_n{}^m(x, \omega)$ of the orders and degrees dependent on individuals indicated by the arrow A92 are the head-related transfer functions that vary among the individual users, such as functions optimized for individual users.

The sound processing apparatus 121 acquires, from the outside, the head-related transfer functions $H'_n{}^m(x, \omega)$ of the orders and degrees dependent on individuals represented by a rectangle provided with a character "COEFFICIENTS FOR INDIVIDUALS." The sound processing apparatus 121 generates the matrix $H_S(\omega)$ from the acquired head-related transfer functions $H'_n{}^m(x, \omega)$ and the head-related transfer functions $H'_n{}^m(x, \omega)$ of the orders and degrees independent of individuals held in advance and supplies the matrix $H_S(\omega)$ to the head-related transfer function composition unit 132.

Note that in this case, the matrix $H_S(\omega)$ including only the elements of required orders is generated for each time-frequency bin $\omega$ on the basis of the information indicating the required orders $n=N(\omega)$ of the time-frequency bin $\omega$.

The signal rotation unit 131 and the head-related transfer function composition unit 132 then perform the operation of only required orders on the basis of the information indicating the required orders $n=N(\omega)$ of each time-frequency bin $\omega$.

Note that although the matrices $H_S(\omega)$ include the head-related transfer functions commonly used for all users and the head-related transfer functions that vary among the users in the example described here, all elements that are not 0 in the matrices $H_S(\omega)$ may vary among the users. In addition, the same matrix $H_S(\omega)$ may be commonly used for all users.

Furthermore, although the head-related transfer functions $H'_n{}^m(x, \omega)$ in the spherical harmonic domain are acquired to generate the matrices $H_S(\omega)$ in the example described here, the elements of the matrices $H(\omega)$ corresponding to the orders and degrees dependent on individuals, that is, the elements of the matrices $H(\omega)$, may be acquired to calculate $H(x, \omega)Y(x)$ to generate the matrices $H_S(\omega)$.

<Configuration Example of Sound Processing Apparatus>

Figure 31:
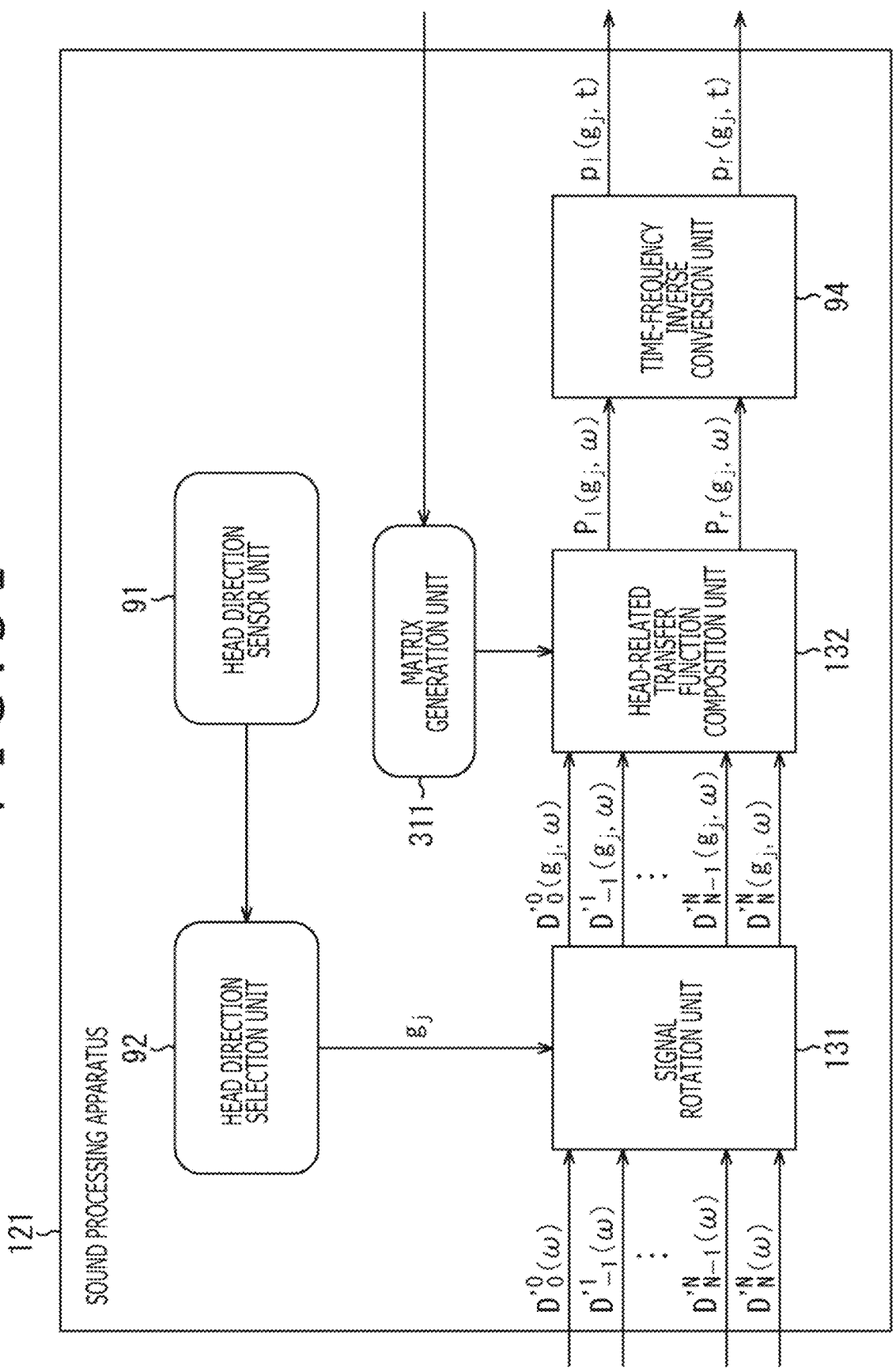
FIG. 31 depicts a configuration example of a sound processing apparatus according to the present technique.

In the case of generating the matrix $H_S(\omega)$ in this way, the sound processing apparatus 121 is configured as illustrated for example in FIG. 31. Note that in FIG. 31, the same reference signals are provided to the parts corresponding to the case of FIG. 12, and the description will be appropriately omitted.

The sound processing apparatus 121 illustrated in FIG. 31 includes the head direction sensor unit 91, the head direction selection unit 92, a matrix generation unit 311, the signal rotation unit 131, the head-related transfer function composition unit 132, and the time-frequency inverse conversion unit 94.

In the configuration of the sound processing apparatus 121 illustrated in FIG. 31, the matrix generation unit 311 is further provided on the sound processing apparatus 121 illustrated in FIG. 12.

The matrix generation unit 311 holds in advance the head-related transfer functions of the orders and degrees independent of individuals and acquires the head-related transfer functions of the orders and degrees dependent on individuals from the outside. The matrix generation unit 311 generates the matrix $H_S(\omega)$ from the acquired head-related transfer functions and the head-related transfer functions of the orders and degrees independent of individuals held in advance and supplies the matrix $H_S(\omega)$ to the head-related transfer function composition unit 132. The matrix $H_S(\omega)$ can also be referred to as a vector including the head-related transfer functions in the spherical harmonic domain as elements.

Note that the orders and degrees of the head-related transfer functions independent of individuals and the orders and degrees dependent on individuals may be different in each time frequency $\omega$ or may be the same.

<Description of Drive Signal Generation Process>

Figure 32:
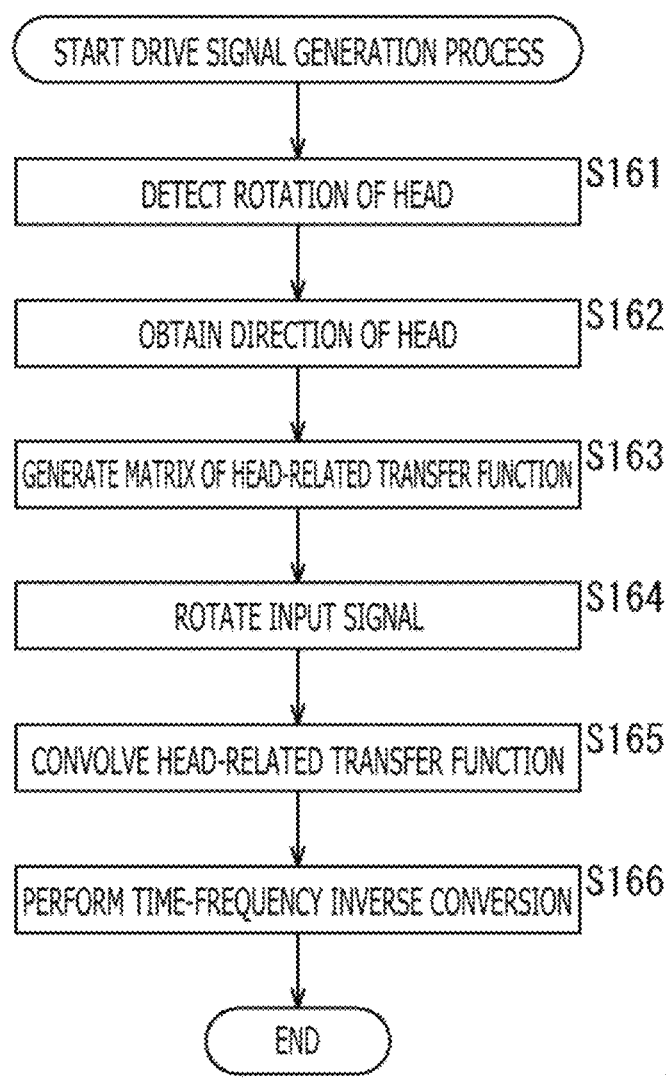
FIG. 32 is a flow chart describing a drive signal generation process.

Subsequently, a drive signal generation process executed by the sound processing apparatus 121 with the configuration illustrated in FIG. 31 will be described with reference to a flow chart of FIG. 32. The drive signal generation process is started when the input signal $D'_n{}^m(\omega)$ is supplied from the outside. Note that the processes of step S161 and step S162 are similar to the processes of step S41 and step S42 of FIG. 13, and the description will not be repeated.

In step S163, the matrix generation unit 311 generates the matrix $H_S(\omega)$ of the head-related transfer functions and supplies the matrix $H_S(\omega)$ to the head-related transfer function composition unit 132.

That is, the matrix generation unit 311 acquires, from the outside, the user's head-related transfer functions of the orders dependent on individuals regarding the listener, that is, the user, that listens the sound to be reproduced this time. For example, the user's head-related transfer functions are designated by an input operation of the user or the like and are acquired from an external apparatus or the like.

When the matrix generation unit 311 acquires the head-related transfer functions of the orders dependent on individuals, the matrix generation unit 311 generates the matrix $H_S(\omega)$ from the acquired head-related transfer functions and the head-related transfer functions of the orders independent of individuals held in advance and supplies the obtained matrix $H_S(\omega)$ to the head-related transfer function composition unit 132.

In this case, the matrix generation unit 311 generates the matrix $H_S(\omega)$ including only the elements of required orders for each time-frequency bin $\omega$ on the basis of the information indicating the required orders $n=N(\omega)$ of each time-frequency bin $\omega$ held in advance.

When the matrix $H_S(\omega)$ of each time-frequency bin $\omega$ is generated, processes of steps S164 to S166 are then executed, and the drive signal generation process ends. The processes are similar to the processes of steps S43 to S45 of FIG. 13, and the description will not be repeated. However, the operation is performed only for the elements of required orders in steps S164 and S165 on the basis of the information indicating the required orders $n=N(\omega)$ of each time-frequency bin $\omega$.

In this way, the sound processing apparatus 121 convolves the input signals with the head-related transfer functions in the spherical harmonic domain to compute the drive signals of the left and right headphones. This can significantly reduce the amount of operation in generating the drive signals of the headphone and can also significantly reduce the amount of memory required for the operation.

Particularly, the sound processing apparatus 121 acquires the head-related transfer functions of the orders dependent on individuals from the outside to generate the matrix $H_S(\omega)$. Therefore, not only the amount of memory can be further reduced, but also the head-related transfer functions suitable for individual users can be used to appropriately reproduce the sound field.

Note that the technique of acquiring the head-related transfer functions of the orders dependent on individuals from the outside to generate the matrix $H_S(\omega)$ is applied to the sound processing apparatus 121 in the example described here. However, the example is not limited to this, and the technique may be applied to the sound processing apparatus 81, the sound processing apparatus 121 illustrated in FIG. 17, the sound processing apparatus 161 illustrated in FIG. 14 and FIG. 19, the sound processing apparatus 271, or the like described above. In that case, unnecessary orders may be eliminated.

Seventh Embodiment

<Configuration Example of Sound Processing Apparatus>

Figure 33:
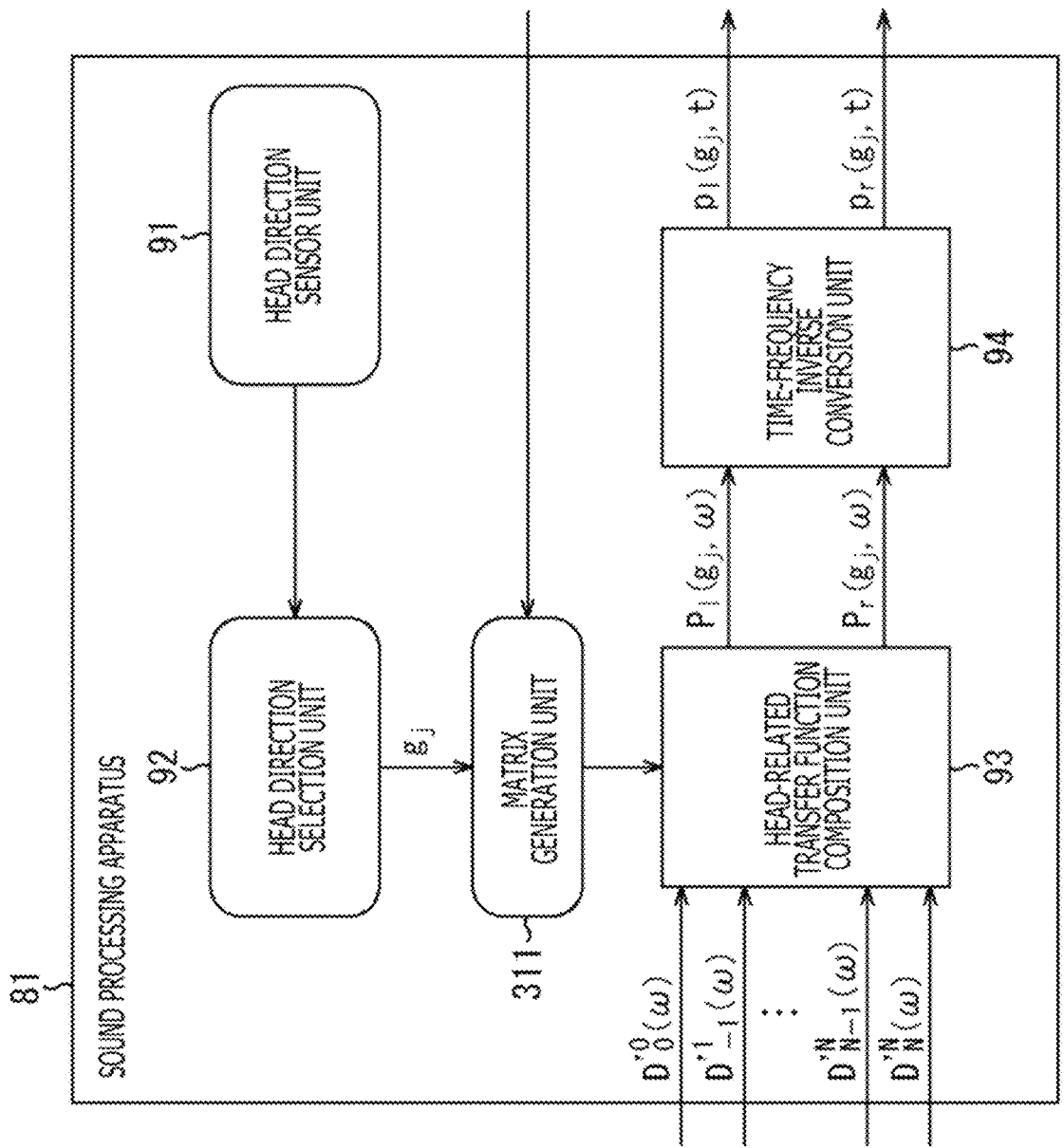
FIG. 33 depicts a configuration example of a sound processing apparatus according to the present technique.

For example, in a case where the sound processing apparatus 81 illustrated in FIG. 8 uses the head-related transfer functions of the orders dependent on individuals to generate the row corresponding to the direction $g_j$ in the matrix H'($\omega$) of the head-related transfer functions, the sound processing apparatus 81 is configured as illustrated in FIG. 33. Note that in FIG. 33, the same reference signs are provided to the parts corresponding to the case of FIG. 8 or FIG. 31, and the description will be appropriately omitted.

In the configuration of the sound processing apparatus 81 illustrated in FIG. 33, the matrix generation unit 311 is further provided on the sound processing apparatus 81 illustrated in FIG. 8.

In the sound processing apparatus 81 of FIG. 33, the matrix generation unit 311 holds in advance the head-related transfer functions of the orders independent of individuals included in the matrix H'($\omega$).

On the basis of the direction $g_j$ supplied from the head direction selection unit 92, the matrix generation unit 311 acquires, from the outside, the head-related transfer functions of the orders dependent on individuals regarding the direction $g_j$. The matrix generation unit 311 generates the row corresponding to the direction $g_j$ in the matrix H'($\omega$) from the acquired head-related transfer functions and the head-related transfer functions of the orders independent of individuals regarding the direction $g_j$ held in advance and supplies the row to the head-related transfer function composition unit 93. The row corresponding to the direction $g_j$ in the matrix H'($\omega$) obtained in this way is a vector including the head-related transfer functions regarding the direction $g_j$ as elements. The matrix generation unit 311 may also acquire the head-related transfer functions of the orders dependent on individuals in the reference direction in the spherical harmonic domain and generate the matrix $H_S(\omega)$ from the acquired head-related transfer functions and the head-related transfer functions of the orders independent of individuals regarding the reference direction held in advance. The matrix generation unit 311 may further generate the matrix $H_S(\omega)$ regarding the direction $g_j$ from the product of the matrix $H_S(\omega)$ and the rotation matrix regarding the direction $g_j$ supplied from the head direction selection unit 92 and supply the matrix $H_S(\omega)$ regarding the direction $g_j$ to the head-related transfer function composition unit 93.

Note that the matrix generation unit 311 generates the row corresponding to the direction $g_j$ in the matrix H'($\omega$) including only the elements of the required orders on the basis of the information indicating the required orders n=N($\omega$) of each time-frequency bin $\omega$ held in advance.

<Description of Drive Signal Generation Process>

Figure 34:
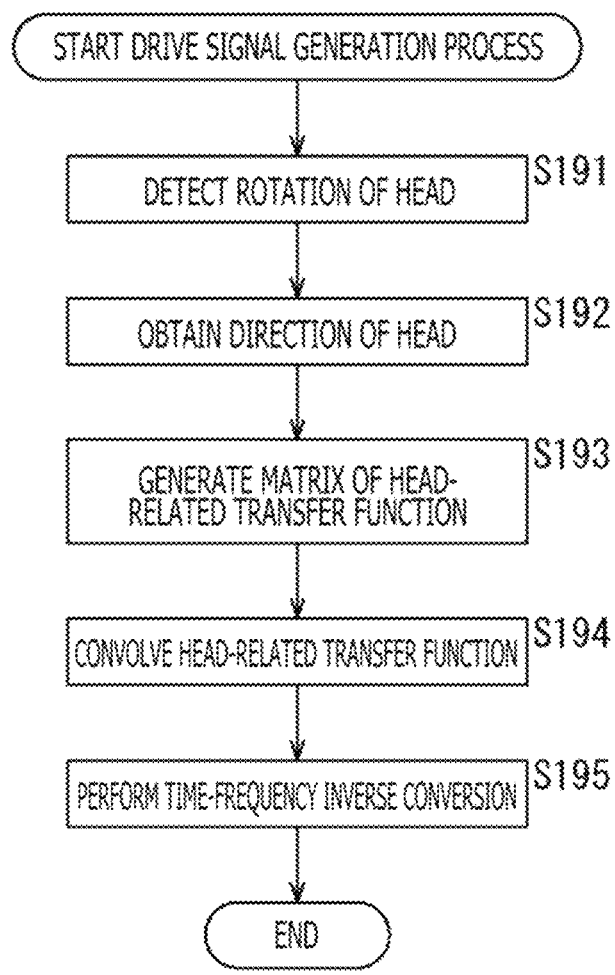
FIG. 34 is a flow chart describing a drive signal generation process.

Subsequently, a drive signal generation process executed by the sound processing apparatus 81 with the configuration illustrated in FIG. 33 will be described with reference to a flow chart of FIG. 34. The drive signal generation process is started when the input signal $D'^m_n(\omega)$ is supplied from the outside.

Figure 9:
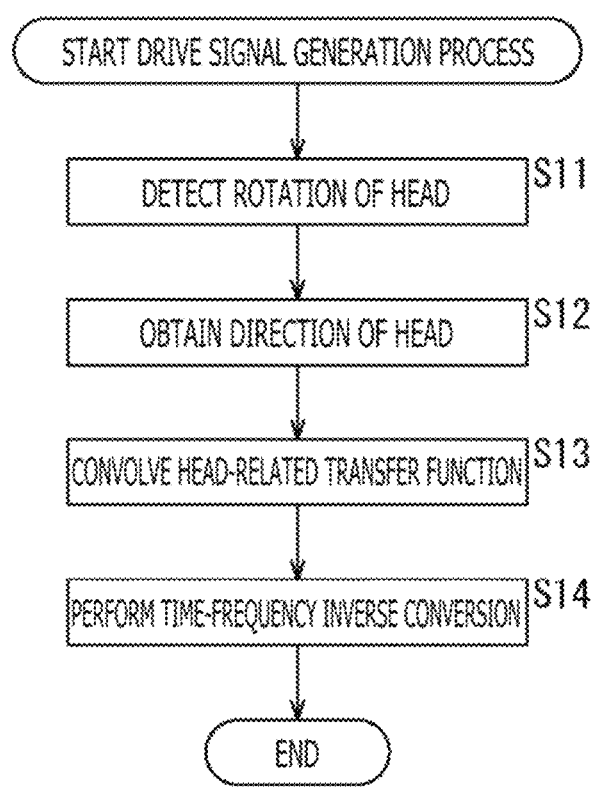
FIG. 9 is a flow chart describing a drive signal generation process.

Note that the processes of step S191 and step S192 are similar to the processes of step S11 and step S12 of FIG. 9, and the description will not be repeated. However, the head direction selection unit 92 supplies the obtained direction $g_j$ of the head of the listener to the matrix generation unit 311 in step S192.

In step S193, the matrix generation unit 311 generates the matrix H'($\omega$) of the head-related transfer functions on the basis of the direction $g_j$ supplied from the head direction selection unit 92 and supplies the matrix H'($\omega$) to the head-related transfer function composition unit 93.

That is, the matrix generation unit 311 acquires, from the outside, the head-related transfer functions of the orders dependent on individuals prepared in advance, regarding the direction $g_j$ of the head of the listener, that is, the user, that listens the sound to be reproduced this time. In this case, the matrix generation unit 311 acquires only the head-related transfer functions of the required orders for each time-frequency bin $\omega$ on the basis of the information indicating the required orders n=N($\omega$) of each time-frequency bin $\omega$.

The matrix generation unit 311 also acquires only the elements of the required orders indicated by the information indicating the required orders n=N($\omega$) of each time-frequency bin $\omega$ from the row corresponding to the direction $g_j$ of the matrix H'($\omega$) including only the elements of the orders independent of individuals held in advance.

Then, on the basis of the acquired head-related transfer functions of the orders dependent on individuals and the head-related transfer functions of the orders independent of individuals acquired from the matrix H'($\omega$), the matrix generation unit 311 generates, for each time-frequency bin $\omega$, the row including only the elements of the required orders and corresponding to the direction $g_j$ of the matrix H'($\omega$), that is, a vector including the head-related transfer functions corresponding to the direction $g_j$. The matrix generation unit 311 supplies the row to the head-related transfer function composition unit 93.

When the process of step S193 is executed, the processes of step S194 and step S195 are then executed, and the drive signal generation process ends. However, the processes are similar to the processes of step S13 and step S14 of FIG. 9, and the description will not be repeated.

In this way, the sound processing apparatus 81 convolves the input signals with the head-related transfer functions in the spherical harmonic domain to compute the drive signals of the left and right headphones. This can significantly reduce the amount of operation in generating the drive signals of the headphone and can also significantly reduce the amount of memory required for the operation. In other words, the sound can be more efficiently reproduced.

Particularly, the head-related transfer functions of the orders dependent on individuals are acquired from the outside, and the row including only the elements of the required orders and corresponding to the direction $g_j$ of the matrix H'($\omega$) is generated. Therefore, not only the amount of memory and the amount of operation can be further reduced, but also the head-related transfer functions suitable for individual users can be used to appropriately reproduce the sound field.

<Configuration Example of Computer>

Incidentally, the series of processes can also be executed by hardware or can be executed by software. In the case where the series of processes are executed by software, a program included in the software is installed on a computer. Here, examples of the computer include a computer incorporated into dedicated hardware and a general-purpose personal computer that can execute various functions by installing various programs.

Figure 35:
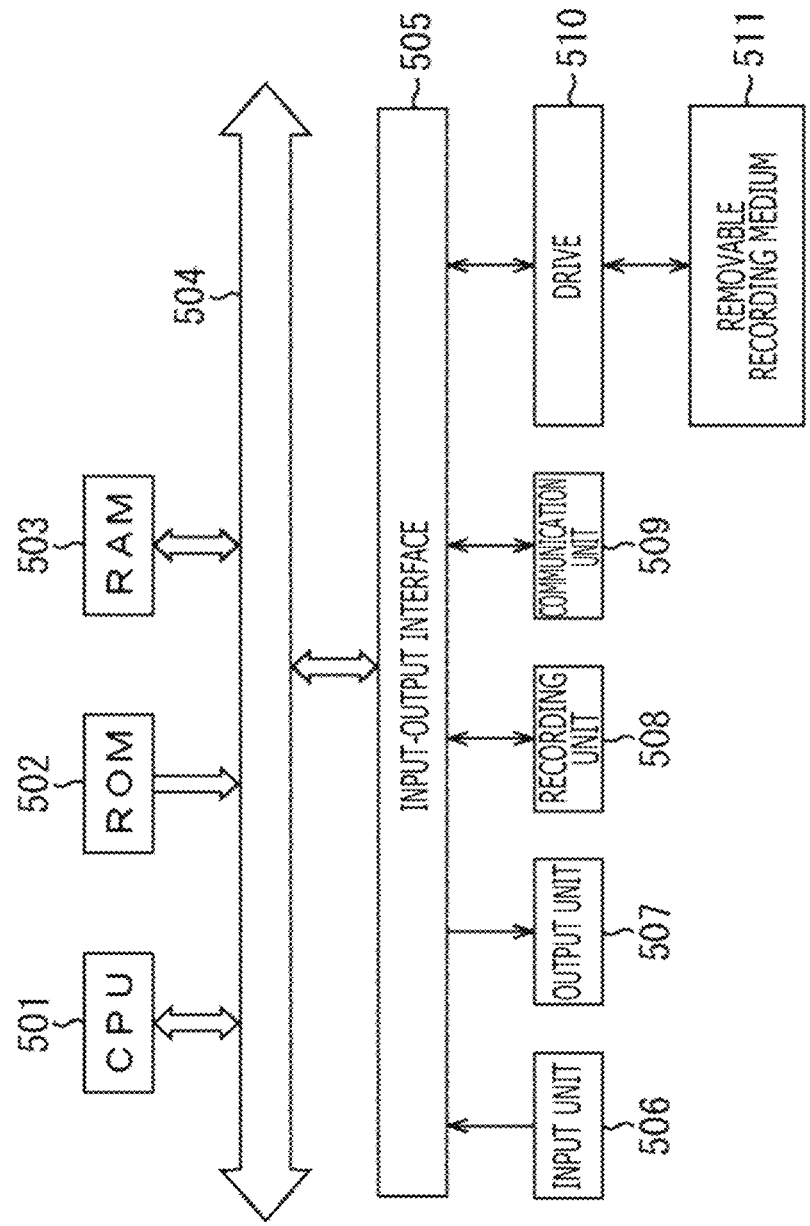
FIG. 35 depicts a configuration example of a computer.

FIG. 35 is a block diagram illustrating a configuration example of hardware of a computer that uses a program to execute the series of processes described above.

In the computer, a CPU (Central Processing Unit) 501, a ROM (Read Only Memory) 502, and a RAM (Random Access Memory) 503 are connected to each other by a bus 504.

An input-output interface 505 is further connected to the bus 504. An input unit 506, an output unit 507, a recording unit 508, a communication unit 509, and a drive 510 are connected to the input-output interface 505.

The input unit 506 includes a keyboard, a mouse, a microphone, an imaging element, and the like. The output unit 507 includes a display, a speaker, and the like. The recording unit 508 includes a hard disk, a non-volatile memory, and the like. The communication unit 509 includes a network interface and the like. The drive 510 drives a removable recording medium 511, such as a magnetic disk, an optical disk, a magneto-optical disk, and a semiconductor memory.

In the computer configured in this way, the CPU 501 loads, on the RAM 503, a program recorded in the recording unit 508 through the input-output interface 505 and the bus 504 and executes the program to execute the series of processes described above, for example.

The program executed by the computer (CPU 501) can be provided by, for example, recording the program in the removable recording medium 511 as a package medium or the like. The program can also be provided through a wired or wireless transmission medium, such as a local area network, the Internet, and digital satellite broadcasting.

In the computer, the removable recording medium 511 can be mounted on the drive 510 to install the program on the recording unit 508 through the input-output interface 505. The program can also be received by the communication unit 509 through a wired or wireless transmission medium and installed on the recording unit 508. Furthermore, the program can be installed in advance in the ROM 502 or the recording unit 508.

Note that the program executed by the computer may be a program for executing the processes in chronological order described in the present specification or may be a program for executing the processes in parallel or at a necessary timing such as when the program is invoked.

Furthermore, the embodiments of the present technique are not limited to the embodiments described above, and various changes can be made without departing from the scope of the present technique.

For example, the present technique can be configured as cloud computing in which a plurality of apparatuses take charge and cooperate to process one function through a network.

In addition, one apparatus can execute each step described in the flow charts, or a plurality of apparatuses can take charge and execute each step.

Furthermore, in the case where one step includes a plurality of processes, one apparatus can execute the plurality of processes included in one step, or a plurality of apparatuses can take charge and execute the processes.

In addition, the advantageous effects described in the present specification are exemplary only and not limiting, and there may be other advantageous effects.

Furthermore, the present technique can also be configured as follows.

(1)
A sound processing apparatus including:
a head direction acquisition unit that acquires a head direction of a user listening to sound;
a rotation matrix generation unit that selects two first rotation matrices on a basis of the head direction from a plurality of first rotation matrices for rotation in a first direction held in advance, selects one second rotation matrix on a basis of the head direction from a plurality of second rotation matrices for rotation in a second direction held in advance, and generates a third rotation matrix on a basis of the selected two first rotation matrices and the selected one second rotation matrix; and
a head-related transfer function composition unit that composes an input signal in a spherical harmonic domain, a head-related transfer function in the spherical harmonic domain, and the third rotation matrix to generate a headphone drive signal in a time-frequency domain.

(2)
The sound processing apparatus according to (1), in which
the second rotation matrix is a rotation matrix for rotation in an elevation angle direction, and
on the basis of the rotation of the head of the user in the elevation angle direction indicated by the head direction, the rotation matrix generation unit selects the second rotation matrix for rotation equivalent to the rotation in the elevation angle direction.

(3)
The sound processing apparatus according to (2), in which
the rotation matrix generation unit selects the second rotation matrix by determining that the rotation in the elevation angle direction is zero degrees in a case where an absolute value of the rotation of the head of the user in the elevation angle direction is equal to or smaller than a predetermined threshold.

(4)
The sound processing apparatus according to (2), in which
the rotation matrix generation unit generates the third rotation matrix only from the two first rotation matrices in a case where an absolute value of the rotation of the head of the user in the elevation angle direction is equal to or smaller than a predetermined threshold.

(5)
The sound processing apparatus according to any one of (1) to (4), in which
the head-related transfer function composition unit obtains a product of the third rotation matrix and the input signal and obtains a sum of products of the product and the head-related transfer function to generate the headphone drive signal.

(6)
The sound processing apparatus according to any one of (1) to (4), in which
the head-related transfer function composition unit obtains a product of the third rotation matrix and the head-related transfer function and obtains a sum of products of the product and the input signal to generate the headphone drive signal.

(7)
The sound processing apparatus according to any one of (1) to (6), further including:
a head direction sensor unit that detects the rotation of the head of the user, in which the head direction acquisition unit acquires a detection result of the head direction sensor unit to acquire the head direction of the user.

(8) The sound processing apparatus according to any one of (1) to (7), further including:
a time-frequency inverse conversion unit that performs time-frequency inverse conversion of the headphone drive signal.

(9) A sound processing method including the steps of:
acquiring a head direction of a user listening to sound;
selecting two first rotation matrices on a basis of the head direction from a plurality of first rotation matrices for rotation in a first direction held in advance, selecting one second rotation matrix on a basis of the head direction from a plurality of second rotation matrices for rotation in a second direction held in advance, and generating a third rotation matrix on a basis of the selected two first rotation matrices and the selected one second rotation matrix; and
composing an input signal in a spherical harmonic domain, a head-related transfer function in the spherical harmonic domain, and the third rotation matrix to generate a headphone drive signal in a time-frequency domain.

(10) A program causing a computer to execute a process including the steps of:
acquiring a head direction of a user listening to sound;
selecting two first rotation matrices on a basis of the head direction from a plurality of first rotation matrices for rotation in a first direction held in advance, selecting one second rotation matrix on a basis of the head direction from a plurality of second rotation matrices for rotation in a second direction held in advance, and generating a third rotation matrix on a basis of the selected two first rotation matrices and the selected one second rotation matrix; and
composing an input signal in a spherical harmonic domain, a head-related transfer function in the spherical harmonic domain, and the third rotation matrix to generate a headphone drive signal in a time-frequency domain.

REFERENCE SIGNS LIST

81 Sound processing apparatus, 91 Head direction sensor unit, 92 Head direction selection unit, 93 Head-related transfer function composition unit, 94 Time-frequency inverse conversion unit, 131 Signal rotation unit, 132 Head-related transfer function composition unit, 171 Head-related transfer function rotation unit, 172 Head-related transfer function composition unit, 201 Matrix derivation unit, 281 Time-frequency conversion unit, 311 Matrix generation unit

The invention claimed is:

1. A sound processing apparatus comprising:
a head direction acquisition unit that acquires a head direction of a user listening to sound;
a rotation matrix generation unit that selects two first rotation matrices on a basis of the head direction from a plurality of first rotation matrices for rotation in a first direction held in advance, selects one second rotation matrix on a basis of the head direction from a plurality of second rotation matrices for rotation in a second direction held in advance, and generates a third rotation matrix on a basis of the selected two first rotation matrices and the selected one second rotation matrix; and
a head-related transfer function composition unit that composes an input signal in a spherical harmonic domain, a head-related transfer function in the spherical harmonic domain, and the third rotation matrix to generate a headphone drive signal in a time-frequency domain.

2. The sound processing apparatus according to claim 1, wherein
the second rotation matrix is a rotation matrix for rotation in an elevation angle direction, and
on the basis of the rotation of the head of the user in the elevation angle direction indicated by the head direction, the rotation matrix generation unit selects the second rotation matrix for rotation equivalent to the rotation in the elevation angle direction.

3. The sound processing apparatus according to claim 2, wherein
the rotation matrix generation unit selects the second rotation matrix by determining that the rotation in the elevation angle direction is zero degrees in a case where an absolute value of the rotation of the head of the user in the elevation angle direction is equal to or smaller than a predetermined threshold.

4. The sound processing apparatus according to claim 2, wherein
the rotation matrix generation unit generates the third rotation matrix only from the two first rotation matrices in a case where an absolute value of the rotation of the head of the user in the elevation angle direction is equal to or smaller than a predetermined threshold.

5. The sound processing apparatus according to claim 1, wherein
the head-related transfer function composition unit obtains a product of the third rotation matrix and the input signal and obtains a sum of products of the product and the head-related transfer function to generate the headphone drive signal.

6. The sound processing apparatus according to claim 1, wherein
the head-related transfer function composition unit obtains a product of the third rotation matrix and the head-related transfer function and obtains a sum of products of the product and the input signal to generate the headphone drive signal.

7. The sound processing apparatus according to claim 1, further comprising:
a head direction sensor unit that detects the rotation of the head of the user, wherein
the head direction acquisition unit acquires a detection result of the head direction sensor unit to acquire the head direction of the user.

8. The sound processing apparatus according to claim 1, further comprising:
a time-frequency inverse conversion unit that performs time-frequency inverse conversion of the headphone drive signal.

9. A sound processing method comprising the steps of:
acquiring a head direction of a user listening to sound;
selecting two first rotation matrices on a basis of the head direction from a plurality of first rotation matrices for rotation in a first direction held in advance, selecting one second rotation matrix on a basis of the head direction from a plurality of second rotation matrices for rotation in a second direction held in advance, and generating a third rotation matrix on a basis of the selected two first rotation matrices and the selected one second rotation matrix; and
composing an input signal in a spherical harmonic domain, a head-related transfer function in the spherical harmonic domain, and the third rotation matrix to generate a headphone drive signal in a time-frequency domain.

10. At least one non-transitory computer-readable storage medium encoded with executable instruction that, when executed by at least one processor, causes the at least one processor to perform a method comprising:
  acquiring a head direction of a user listening to sound;
  selecting two first rotation matrices on a basis of the head direction from a plurality of first rotation matrices for rotation in a first direction held in advance, selecting one second rotation matrix on a basis of the head direction from a plurality of second rotation matrices for rotation in a second direction held in advance, and generating a third rotation matrix on a basis of the selected two first rotation matrices and the selected one second rotation matrix; and
  composing an input signal in a spherical harmonic domain, a head-related transfer function in the spherical harmonic domain, and the third rotation matrix to generate a headphone drive signal in a time-frequency domain.

* * * * *